(12) United States Patent
Murman et al.

(10) Patent No.: US 7,257,603 B2
(45) Date of Patent: Aug. 14, 2007

(54) PREVIEW MODE

(75) Inventors: Derek Murman, Redmond, WA (US);
Edward H. Wayt, Seattle, WA (US);
Jeffrey Bisset, Redmond, WA (US);
Jing Wu, Sammamish, WA (US); Kim Cameron, Bellevue, WA (US); Max L. Benson, Redmond, WA (US); Jie Liu, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 353 days.

(21) Appl. No.: 10/435,712

(22) Filed: May 8, 2003

(65) Prior Publication Data

US 2004/0225682 A1 Nov. 11, 2004

(51) Int. Cl.
*G06F 17/30* (2006.01)
(52) U.S. Cl. .................. 707/104.1; 707/101; 707/102; 707/201; 715/501.1
(58) Field of Classification Search ............... 707/1, 707/10, 103 R, 104.1, 102, 201; 709/203, 709/226, 217, 218, 219, 248; 715/501.1
See application file for complete search history.

(56) References Cited

U.S. PATENT DOCUMENTS

| | | | |
|---|---|---|---|
| 4,999,766 A | | 3/1991 | Peters et al. |
| 5,893,116 A | * | 4/1999 | Simmonds et al. ......... 707/201 |
| 6,185,574 B1 | | 2/2001 | Howard et al. |
| 6,202,085 B1 | | 3/2001 | Benson et al. |
| 6,269,406 B1 | | 7/2001 | Dutcher et al. |
| 6,343,287 B1 | | 1/2002 | Kumar et al. |
| 6,381,734 B1 | * | 4/2002 | Golde et al. ................ 717/165 |
| 6,496,837 B1 | | 12/2002 | Howard et al. |
| 6,523,042 B2 | | 2/2003 | Milleker et al. |
| 6,523,046 B2 | | 2/2003 | Liu et al. |
| 6,542,515 B1 | | 4/2003 | Kumar et al. |
| 6,651,047 B1 | | 11/2003 | Weschler, Jr. |

(Continued)

OTHER PUBLICATIONS

Steen et al., Master Thesis in Computer Engineering; Integrating ABB Aspect Directory with Microsoft Active Directory; 76 pages.
Steen et al. "Integrating ABB Aspect Directory with Microsoft Active Directory", Thesis Paper, The Department of Computer Science and Electronics, Malardalens Hogeskola University, 2001, pp. 44-58.
Robertson, et al., "Polyarchy Visualization: Visualizing Multiple Intersecting Hierarchies", CHI 2002, Minneapolis, MN, USA, Apr. 20-25, 2002, 8 pages.
Zhou, "Directory Integration and the Metadirectory", 1999, pp. 1-12.

*Primary Examiner*—Shahid Al Alam
(74) *Attorney, Agent, or Firm*—Lee & Haynes, PLLC

(57) ABSTRACT

Various exemplary metadirectories, systems and/or methods include or allow for executing a software module on an execution engine, emitting semantic information based on the executing, and analyzing the executing using the semantic information. An exemplary execution engine includes an input for receiving software modules, an output for emitting semantic information, and an output for outputting generated output information. Upon execution, an exemplary software module may cause processing of information in a metadirectory and emitting of semantic information pertaining to the processing. Various exemplary metadirectories, systems and/or methods emit and/or store semantic information in a self-defining language, an extensible language, and/or a markup language. Other exemplary metadirectories, systems, and/or methods are also disclosed.

24 Claims, 27 Drawing Sheets

U.S. PATENT DOCUMENTS

| | | |
|---|---|---|
| 6,757,720 B1 | 6/2004 | Weschler, Jr. |
| 6,823,336 B1 | 11/2004 | Srinivasan et al. |
| 6,859,217 B2 | 2/2005 | Robertson et al. |
| 6,990,513 B2 | 1/2006 | Belfiore et al. |
| 2002/0030703 A1 | 3/2002 | Robertson et al. |
| 2002/0059425 A1 | 5/2002 | Belfiore et al. |
| 2002/0156792 A1 | 10/2002 | Gombocz et al. |
| 2003/0105654 A1 | 6/2003 | MacLeod et al. |
| 2003/0131025 A1 | 7/2003 | Zondervan et al. |
| 2003/0140210 A1 | 7/2003 | Testardi |
| 2004/0064502 A1 | 4/2004 | Yellepeddy et al. |
| 2004/0230559 A1 | 11/2004 | Newman et al. |

\* cited by examiner

Exemplary Scenario

Exemplary Screen Shot ← 1000

Exemplary Screen Shot

Exemplary Screen Shot    1200

Fig. 12

Exemplary Screen Shot ← 1300

Exemplary Screen Shot   ← 1400

Exemplary Screen Shot 1500

Exemplary Screen Shot — 1600

Exemplary Screen Shot 1700

Exemplary Screen Shot ← 1800

Exemplary Screen Shot ← 1900

Exemplary Screen Shot   — 2000

Exemplary Screen Shot — 2100

Exemplary Screen Shot 2200

Exemplary Screen Shot 2300

Exemplary Screen Shot — 2400

Exemplary Screen Shot  — 2500

PREVIEW MODE

CROSS-REFERENCE TO RELATED APPLICATIONS

The instant application is related to co-pending U.S. patent application Ser. No. 10/434,725, entitled "Attribute Value Selection for Entity Objects," by Kim Cameron, Max L. Benson, Matthias Leibmann, Edward H. Wayt, Kevin Miller and James Booth; U.S. patent application Ser. No. 10/435,113, entitled "Declarative Rules for Metadirectory" by Kim Cameron, Max L. Benson, and James Booth; U.S. patent application Ser. No. 10/434,726, entitled "Relational Directory," by Kim Cameron, James Booth, Matthias Leibmann, Max L. Benson and Mark Brown; U.S. patent application Ser. No. 10/435,720, entitled "Associating and Using Information in a Metadirectory," by Max L. Benson; U.S. patent application Ser. No. 10/434,411, entitled "Automated Information Management and Related Methods," by Max L. Benson, Stephen Siu, and James Booth; U.S. patent application Ser. No. 10/435,708, entitled "Rules Customization and Related Methods," by Max L. Benson, Michael Jerger, Edward H. Wayt, Kenneth Mark, Kim Cameron, Matthias Leibmann, and Jing Wu; all of which are filed concurrently herewith, assigned to the assignee of the present invention, and incorporated herein by reference for all that they teach and disclose.

TECHNICAL FIELD

The subject matter relates generally to synchronizing information and more specifically to administration of synchronizing processes that aim to synchronize information from a plurality of information sources.

BACKGROUND

Often a company stores important information in various data sources. For example, a human resources department may store information about employees in a human resources data source wherein the information is arranged or organized according to a human resources specific information structure or hierarchy and a finance department may store information about employees, clients, suppliers, etc., in a finance department data source wherein the information is arranged or organized according to a finance department information structure or hierarchy. In this example, some common information may exist in both data sources. Thus, a need for synchronizing the information arises.

A synchronizing process typically implements rules and/or specifications to adequately harmonize information in various data sources. Further, such a process may rely on an engine capable of executing software and a storage capable of storing the information, as appropriate. In general, a synchronizing process replicates information from various data sources in a central storage, wherein the replicated information has some degree of integrity. To achieve this task, information from the various data sources are either pushed or pulled into the synchronizing process. In addition, information may be pulled or pushed out of such a central storage to various data sources. Maintaining efficiency and information integrity in such an environment can become a daunting task. Various exemplary methods, devices and/or systems described below are directed to meeting this task.

SUMMARY

Various exemplary metadirectories, systems and/or methods include or allow for executing a software module on an execution engine, emitting semantic information based on the executing, and analyzing the executing using the semantic information. An exemplary execution engine includes an input for receiving software modules, an output for emitting semantic information, and an output for outputting generated output information. Upon execution, an exemplary software module may cause processing of information in a metadirectory and emitting of semantic information pertaining to the processing. Various exemplary metadirectories, systems and/or methods emit and/or store semantic information in a self-defining language, an extensible language, and/or a markup language. Other exemplary metadirectories, systems, and/or methods are also disclosed.

BRIEF DESCRIPTION OF THE DRAWINGS

FIG. 12 is an exemplary screen shot generated by an exemplary metadirectory showing a Source Object Details window.

DETAILED DESCRIPTION

Overview

Various exemplary devices, systems and/or methods described herein reference an information environment that includes a metadirectory. While a metadirectory may be used to explain, various exemplary devices, systems and/or methods may be applied generally to information environments wherein synchronization of information is desired or required. In general, information should be identifiable in an information environment, for example, through use of an identifier, and preferably an immutable or trackable identifier. In some instances, information is structured or organized in a hierarchy. For example, a directory may organize entities (e.g., and attributes, etc.) in a hierarchy.

Various exemplary devices, systems and/or methods described herein pertain to an engine that can execute instructions and emit semantic information wherein the semantic information pertains to the execution of the instructions and optionally values and/or other results thereof. Such an exemplary engine, and services related thereto which handle the semantic information, are not limited to information environments. For example, such an exemplary engine and/or services related thereto may provide a user insight into execution of instructions and/or other results thereof.

Various exemplary screen shots are shown herein. Such screen shots demonstrate various features of services, such as, but not limited to, user interfaces. Such user interfaces may be passive and/or active as appropriate.

Various Exemplary Devices, Systems and/or Methods

Figure 1:
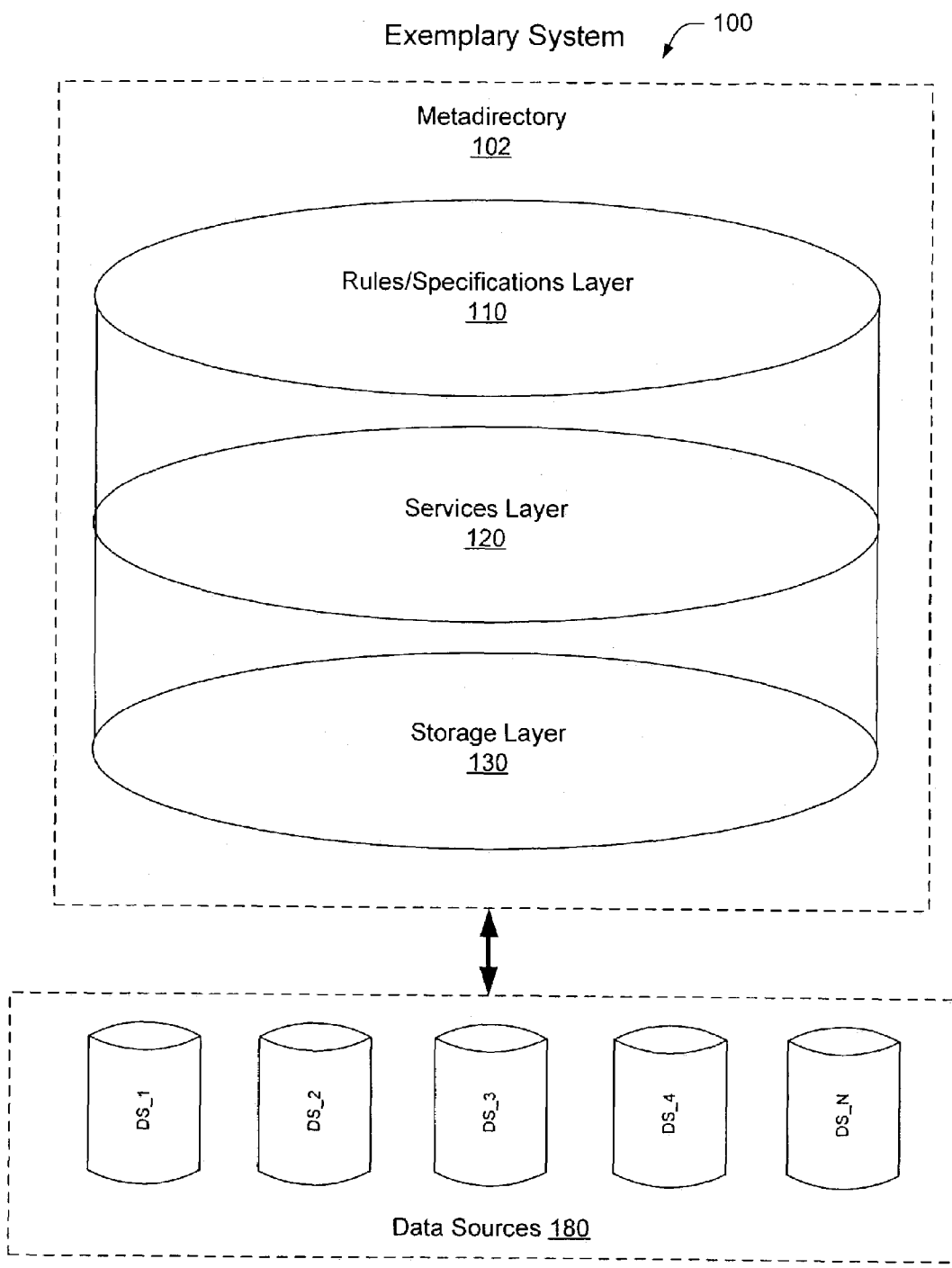
FIG. 1 is a diagram of an exemplary system that includes metadirectory and a plurality of data sources.

FIG. 1 shows an exemplary system 100 that includes an exemplary metadirectory 102 capable of communicating information to and/or from a plurality of data sources 180 (e.g., DS_1, DS_2, DS_3, DS_4 . . . DS_N). The data sources 180 may be disparate or associated. For example, the data source DS_1 may have a directory that includes one or more entries associated with a directory of the data source DS_3. A disparate data source does not have directory entries associated with a directory of another data source; however, a disparate data source may still be served by the exemplary metadirectory 102.

The exemplary metadirectory 102 includes a rules and/or specifications layer 110, a services layer 120 and a storage layer 130. The rules and/or specifications layer 110 may include rules and/or specifications that form or define one or more protocols, APIs, schemata, services, hierarchies, etc. The services layer 120 typically includes service modules capable of execution on an execution engine. An execution engine may rely on an operating system, a virtual machine, a compiler, a runtime engine, etc. For example, service modules may include code and/or script suitable for execution on a virtual machine, a computer, etc. Typically, such code and/or script apply or follow rules and/or specifications set forth in a rules and/or specifications layer. Further, an exemplary metadirectory may allow for distribution of service modules to data sources wherein the service modules may execute on an engine of such data sources. The storage layer 130 allows for storage of information such as information having a high level of integrity. However, a storage layer may also allow for storage of information having a lesser level of integrity. For example, a storage layer may allow for scratch or buffer area that, in turn, may aid in processing information to achieve a certain level of information integrity.

Overall, the exemplary metadirectory 102 can provide an overarching view of one or more directories as used in one or more data sources 180. Such an exemplary metadirectory may consolidate information as contained in multiple directories in a centralized manner, manage relationships between directories and allow for information to flow between directories, as appropriate.

Figure 2:
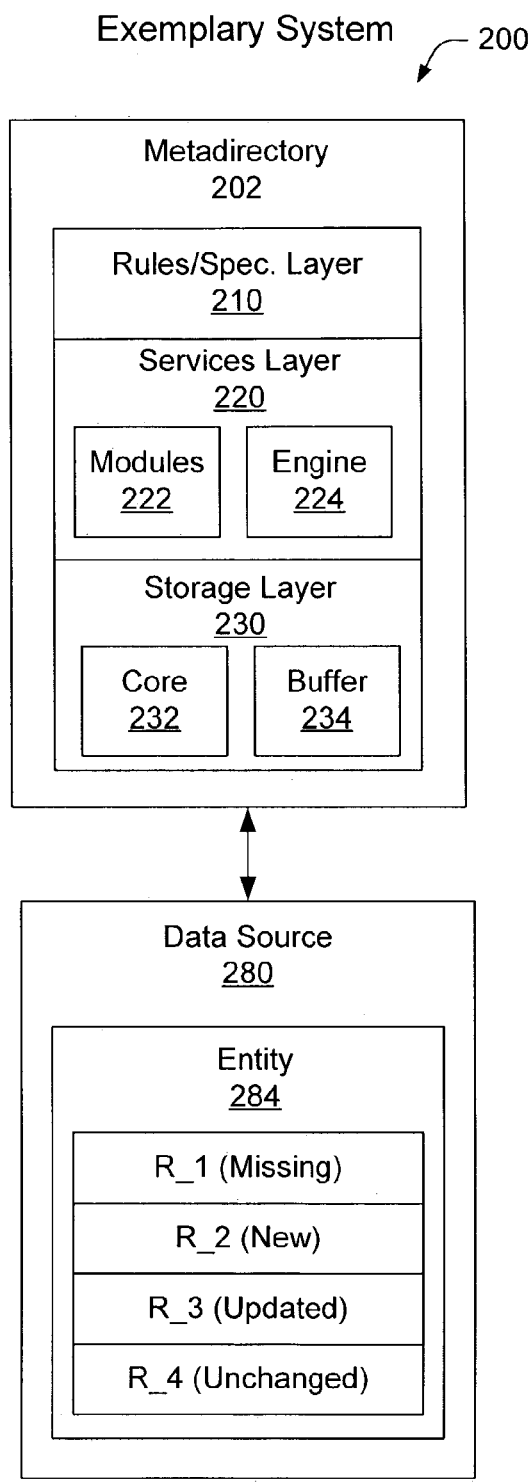
FIG. 2 is a block diagram of an exemplary system that includes a metadirectory and a data source.

FIG. 2 shows an exemplary system 200 that includes an exemplary metadirectory 202 and a data source 280. The metadirectory 202 includes a rules and/or specification layer 210, a services layer 220 and a storage layer 230. The services layer 220 includes service modules 222 and an engine 224. The storage layer 230 includes core area 232 and buffer area 234, which optionally serves as a scratch pad. The data source 180 includes an information entity 284 having one or more informational records and in this instance four records R_1, R_2, R_3 and R_4. The records have associated operations, operation commands or operation indicators. For example, the record R_1 is labeled as "missing", which may indicate that the record R_1 was deleted and hence, the associated operation for record R_1 may be "delete". The record R_2 is labeled as "new", which may indicate that the record R_1 was added and hence, the associated operation for record R_2 may be "add". The record R_3 is labeled as "update", which may indicate that a change has occurred to the record R_3 and hence, the associated operation for record R_3 may be "update" or "modify". The record R_4 is labeled as "unchanged", which may indicate that no changes have occurred to the record R_4 and hence, the associate operation for record R_4 may be "unchanged". Again, as described in the Background section, a directory typically allows for basic operations such as add, delete and modify.

Figure 3:
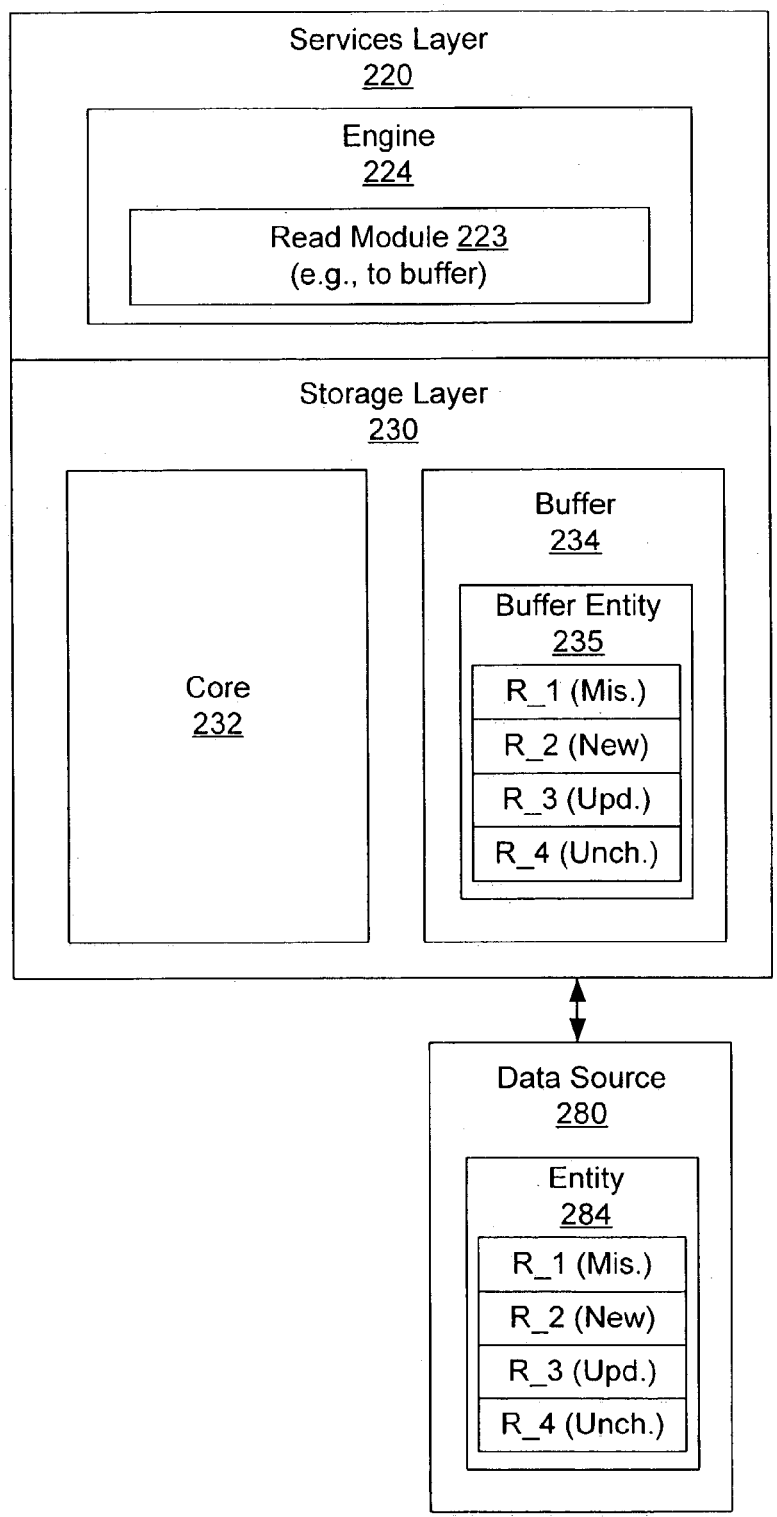
FIG. 3 is a block diagram of an exemplary scenario that includes a services module for communicating information from a data source to a storage layer of an exemplary metadirectory.

FIG. 3 aims to show the exemplary system 200 of FIG. 2 in operation. According to this mode of operation, a read module 226 executes on the service engine 224 to thereby cause information of the data source 180 to be written to the buffer area 234 of the storage layer 230. In this instance, the exemplary system 200 operates in a pull mode, whereby the metadirectory pulls information from a data source. Of course, a push mode is also possible, for example, where a data source initiates communication of information from the data source to a storage layer of a metadirectory.

In this example, the buffer area 234 now contains a buffered informational entity 235 that includes the records R_1, R_2, R_3 and R_4 and associated operations, operation commands and/or other operation indicators. As described herein, various exemplary metadirectories, systems and/or methods can offer services not found in traditional metadirectories by associating operations with directory information in a metadirectory storage layer. Further, where required or desired, one or more record values are also associated with records and operations.

In this and/or other examples, an informational entity, whether in a data source or in a metadirectory, may exist as an object associated with a hierarchical level of a directory and/or a metadirectory. Such an entity typically has naming information such as a distinguished name (DN), a globally unique identifier (GUID), an entity type (e.g., an object type), which may all be single valued. Further, an entity may have an entity class (e.g., an object class as an ordered list of string values) which may be considered distinct from attributes. At a lower level, an entity may include one or more attributes wherein each attribute may have one or more values.

In the exemplary system 200, the records (R_1, R_2, R_3 and R_4) in the entity 284 were associated with change information. In this instance, the records may correspond to attributes. However, change information may exist at more than one level. For example, at an attribute level change information may include add, update, delete, unchanged, etc., whereas, at an entity level (e.g., an object level), change information may include change types: add, update, delete (e.g., deleted by a data source), delete-add (e.g., old entity deleted, new entity with same name created), obsolete (e.g., entity no longer is reported by a data source), no-change, old DN, new DN, etc. In this example of entity level change types, all of the change types except no-change can include an entity rename.

Change information may also exist at other levels, for example, at an entity class level wherein an update can optionally include an entity class change. At the attribute level, already mentioned, a change may occur as well as a change in value. For example a change at the attribute level may include an operation command to add, update, delete, no-change, etc., whereas, at the value level, a change may include an operation command to add, delete, etc.

An entity, as shown below, may exist as an object that includes one or more attributes wherein the attributes have one or more values. Of course, attributes may also have a type indicator (e.g., string, integer, etc.). For example, an object for an employee "JohnS" may include the following attribute names and values:

| Attr Name: | Manager "MaryJ" |
| --- | --- |
| Attr Name: | Office "40/6062" |
| Attr Name: | Telephone "(425)-882-8080, (425)-706-7789" |
| Attr Name: | Email "bigjohn" |

Such an object may be part of a tree hierarchy, for example, a branch of a company, state, organization, etc., information hierarchy or structure.

Rules and/or specifications may define a schema or schemata that govern organization or structure for data storage, whether relational, object-oriented, etc. A schema may refer to a visualization of a data storage structure and/or to a formal text-oriented description of data storage. As described herein, an exemplary metadirectory includes a schema for defining entities (e.g., objects) that include additional information. Additional information may be delta information, error information, state information, etc. In particular, various exemplary metadirectories, systems and/ or methods include objects defined to include delta information, error information and/or state information. Again, delta information may include one or more attribute names, one or more attribute values and/or one or more operation commands (e.g., add, delete, modify, etc.). Of course, where appropriate other information such as but not limited to attribute type may be included in a metadirectory object definition. Such metadirectory object definitions typically apply to objects stored in a buffer of a metadirectory storage layer (e.g., buffer entities) and may apply to objects stored in a core of a metadirectory storage layer (e.g., core entities).

Various exemplary metadirectories, systems and/or methods refer to a staged object, which may be a type of buffer entity. A staged object is generally an object defined by a metadirectory wherein information pertaining to the object is stored in a storage of the metadirectory, typically a buffer area. Sometimes, the buffer area is referred to as a connector space or a connector namespace. Information pertaining to objects defined by a metadirectory and stored in a buffer (e.g., a connector space) may be representations of objects in a data source. Each object represented in a buffer (e.g., a connector space) typically has an anchor. All objects represented in a buffer (e.g., a connector space) typically have the two distinguishing attributes: (i) a Globally Unique Identifier (GUID) and (ii) a distinguished name (DN).

Objects represented in a buffer (e.g., a connector space) may also have an anchor attribute. An anchor attribute uniquely identifies an object in a data source. The anchor may represent a link between a staged object and its representation in a data source. Various exemplary metadirectories assume that the anchor of an object never changes over the lifetime of an object and thus such exemplary metadirectories may use an anchor to locate a corresponding representation of an object in a buffer (e.g., a connector space).

For the example shown in FIG. 3, the buffered entity 235 may exist as an object in an object class "oc: users" with a distinguished name "dn: JohnS, XYX Corp" wherein the records R_1, R_2, R_3 and R_4 correspond to attributes Manager, Office, Telephone and Email, respectively and their values. Of course, associated operations and values where appropriate also exist in the storage layer 230. Such additional information (e.g., operation information, values, etc.) may exist on an object or in association with an object;

in either instance, an object definition may include additional information. Various exemplary metadirectories store information pertaining to an object in a database. As such, additional information associated with the object is typically stored in the same database and optionally in a related database. As described herein, various exemplary metadirectories store at least some additional information in a column of a database according to a binary data type. Of course, some additional information may be more appropriately stored as XML text, etc. (see, e.g., error information described below).

Various exemplary metadirectories, systems and/or methods that include associating additional information via storing such information directly on an object can avoid a need for cross-referencing such information. In a traditional metadirectory changes and error information are stored separately from objects, for example in an event viewer or a log file, thereby necessitating a cross-referencing of information when troubleshooting. Again, "storing on an object" refers to defining the object to include the additional information and/or associating the additional information with information (e.g., names, values, etc.) pertaining to the object.

Referring to the operations associated with records R_1, R_2, R_3 and R_4, R_1 is associated with a delete operation, R_2 is associated with an add operation, R_3 is associated with an update operation and R_4 is associated with an unchanged indicator. Individual record deltas may be defined for each of these records or an entity (or object) delta may be defined for the entity (or object). For example, individual record deltas may be defined as below:

R_1_Δ: delete, attr name "Manager"
R_2_Δ: add, attr name "Office", attr value "40/6062"
R_3_Δ: update, attr name "Telephone", attr value 1 "(425)-882-8081"
R_4_Δ: unchanged, attr name "Email"

In this example, the record deltas contain all of the operational and value information typically required to manage an entity or object of a disparate directory. Where associated directories exist in a plurality of data sources, information may change in an asynchronous manner or in a synchronous manner wherein rules are required to adequately manage the information from the various data sources. In either case, record deltas can allow for services and benefits not found in traditional metadirectories. Various exemplary metadirectories, systems and/or methods described herein include record deltas stored in a storage layer of an exemplary metadirectory. Such record deltas include operation and value information as appropriate associated with records of one or more directories.

While various examples include data sources having entities wherein operation history is known, other examples exist wherein operation history is discovered. For example, a data source may communicate directory information to an exemplary metadirectory wherein the information does not indicate whether a particular entity or record has been added, deleted, modified, etc. If the exemplary metadirectory includes historical directory information for the particular directory, then the exemplary metadirectory may discover operation information, for example, based on a comparison between the communicated information and the stored historical information for the directory.

In instances where only changed information about a directory is communicated to a metadirectory, such a communication may be referred to as a delta import. Given a particular scope, a communication that communicates all directory information within that scope to a metadirectory is generally referred to as a full import. For example, information may exist in a partition in a data source. A partition is typically a logical volume of data in a buffer area or in a data source. The type of communication between a data source and a metadirectory may depend on data source capabilities. For example, some data sources may not be able to track changes and hence must rely on full import communications with a metadirectory, noting that full import communications may in some instances include change information.

Figure 4:
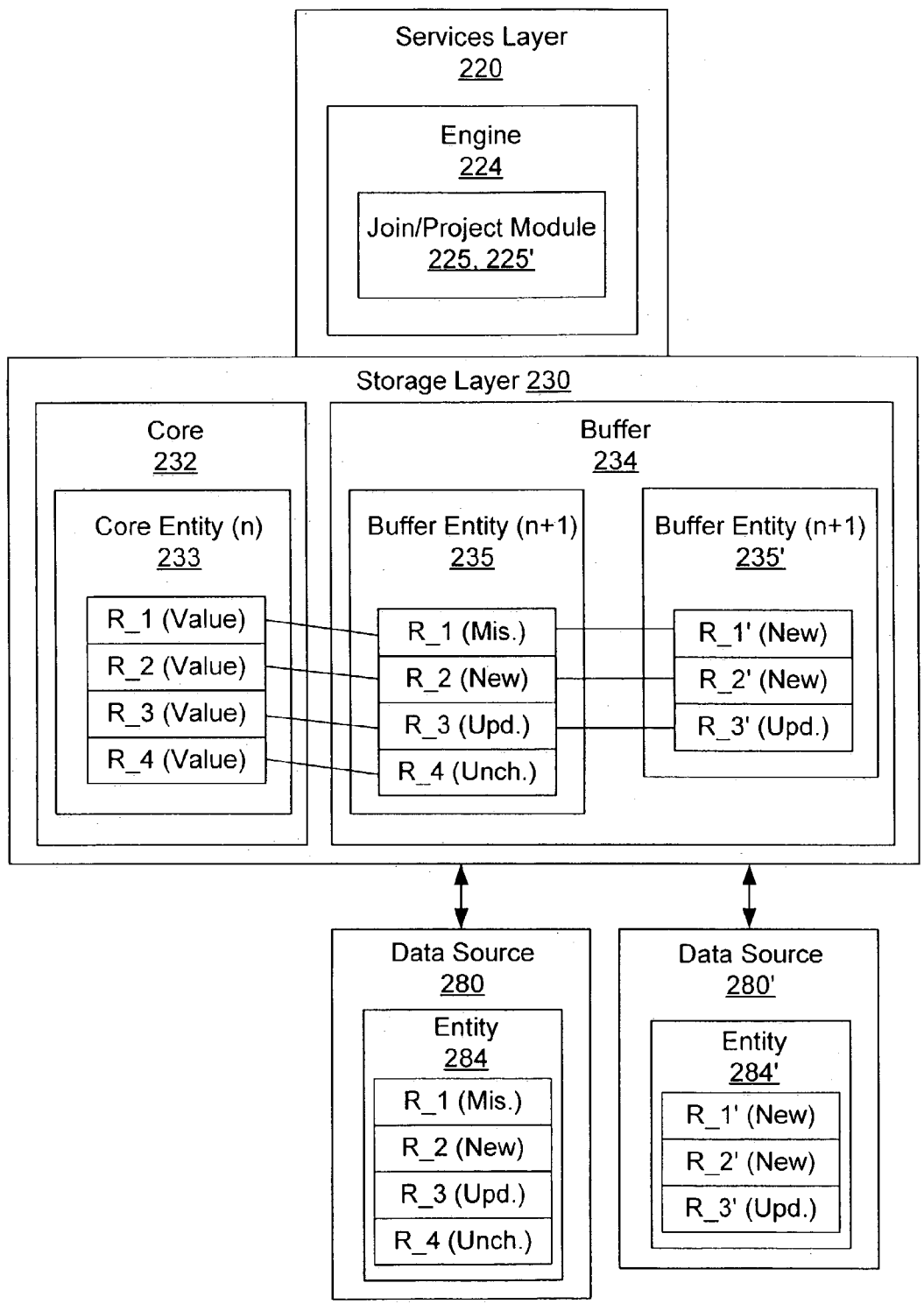
FIG. 4 is a block diagram of an exemplary scenario that includes a plurality of data sources, an exemplary services layer and an exemplary storage layer wherein a join and/or project service module executes on a service engine.

FIG. 4 shows an exemplary scenario 400 that aims to show the exemplary system 200 of FIG. 2 in operation. According to this mode of operation, a join and/or a project module 225, 225' executes on the service engine 224 to thereby cause joining and/or other processing of information in the buffer area 234 and in the core area 232 of the storage layer 230.

In this example, information from two different data sources 280, 280' have been read into the buffer area 234. The data source 280 includes an entity 284 with four records (R_1, R_2, R_3 and R_4) and the data source 280' includes an entity 284' with three records (R_', R_2' and R_3'). These entities and/or records are read into the buffer area 234 via execution of one or more read modules (e.g., as described with respect to FIG. 3). The corresponding buffer entities 235, 235' also indicate that the information contained in these entities is for an instance denoted "n+1". In contrast, the core area 232 includes a core entity 233 wherein the information in the core entity 233 is denoted for an instance "n". Thus, the information in the buffer entities 235, 235' may be considered more recent than the information in the core entity 233.

With respect to differences between join processes and project processes, join processes are generally appropriate when a core entity includes information that corresponds to information in a buffer entity. For example, if the buffer entity 235 has an associated and particular distinguished name, a join process may aim to associate the buffer entity 235, or information therein, with a core entity, should a core entity exist that has an associated and same distinguished name. A join process may occur based on other manners of information matching as well. However, in general, some match of information must occur between a buffer entity and a core entity for a join process to proceed. In contrast, a project process "projects" information from a buffer entity (e.g., in a buffer area) to a core area to enable further processing to occur. For example, if the information in the buffer entity 235 has no analog or matching information in the core area 232, then a project process may create appropriate indicia in the core area 232 wherein the indicia allows for further processing. Such indicia may include a shell, an entity, a file, a defined object, records, etc. In general, join processes and project processes do not allow attribute values to be written, i.e., flow, from a buffer area 234 to a core area 232. The exemplary flow scenario 500, discussed with reference to FIG. 5, typically provides for such an exchange of information between the buffer area 234 and the core area 232.

Referring again to the exemplary scenario 400 of FIG. 4, some form of correspondence is established between the two buffer entities 235, 235' and a core entity 233. Such a correspondence may be formed on a record-by-record and/or other bases, as appropriate. Note that in this example, a correspondence is also established between the two buffer entities 235, 235'. While correspondence lines are shown between the buffer entity 235 and the core entity 233, such correspondence may exist directly and/or indirectly between the buffer entity 235' and the core entity 233. If some form of correspondence has been established between information in the buffer area 234 and information (e.g., shell, entity, file, etc.) in the core area 232, then information at a more detailed level may flow from the buffer area 232 to the core area 232.

Figure 5:
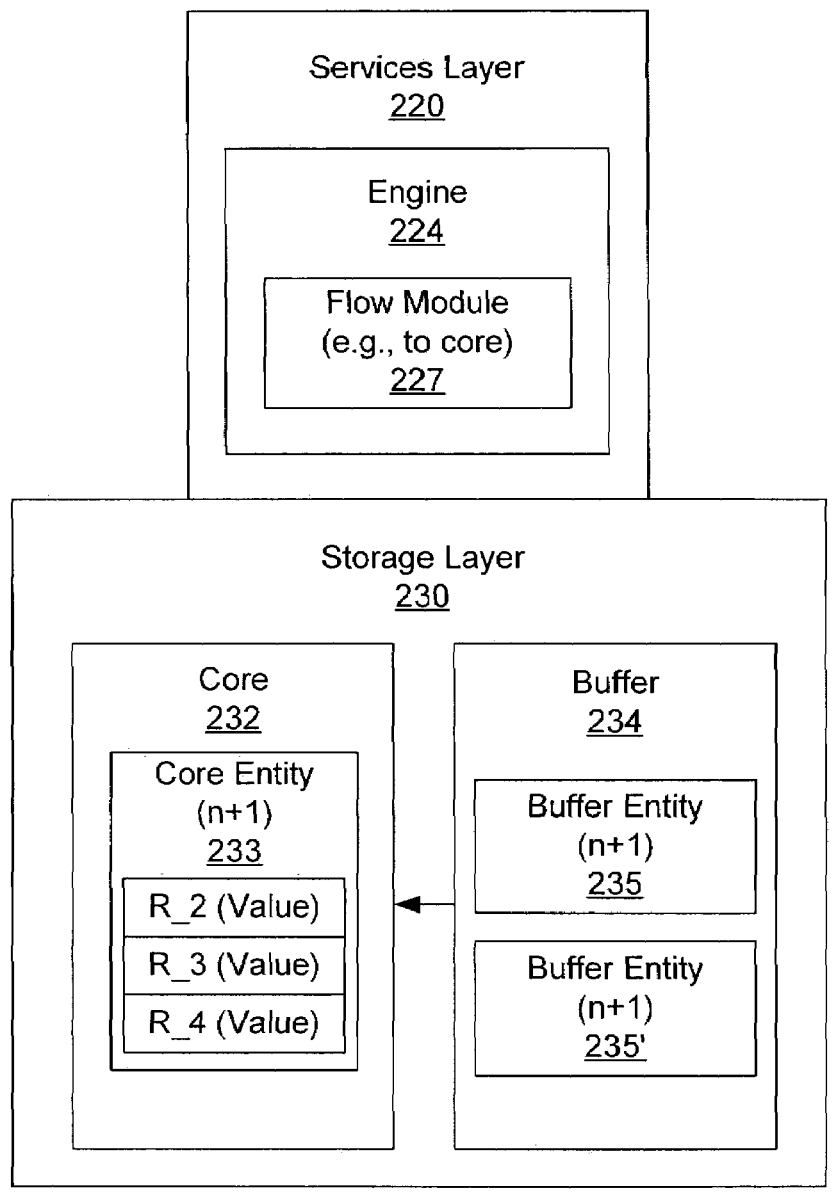
FIG. 5 is a block diagram of an exemplary scenario that includes an exemplary services layer and an exemplary storage layer wherein a flow service module executes on a service engine.

FIG. 5 shows an exemplary scenario 500 that aims to show the exemplary system 200 of FIG. 2 in operation. According to the scenario 500, a flow module 227 executes on the service engine 224 in a services layer 220. Execution of the flow module 227 causes appropriate information to flow (e.g., to be communicated, written, etc.) from the buffer area 234 to the core area 232. More specifically, appropriate information from one or more buffer entities 235, 235' flows to a corresponding entity (e.g., the core entity 233) in the core area 232. A determination as to what constitutes "appropriate" information may occur based on application of rules and/or specifications. In general, service modules can apply rules and/or specification and/or execute according to rules and/or specifications. For example, a service module may, upon execution, apply a rule to information in the buffer entitiy 235 and to information in the buffer entity 235' to determine precedence as to information based on a data source (e.g., the data sources 280, 280'). Such a determination may occur during any particular process. For example, such a determination may occur during a join process and/or during a flow process. In general, synchronization processes include an ability to determine what information should and should not be stored in a core area of an exemplary metadirectory.

Figure 6:
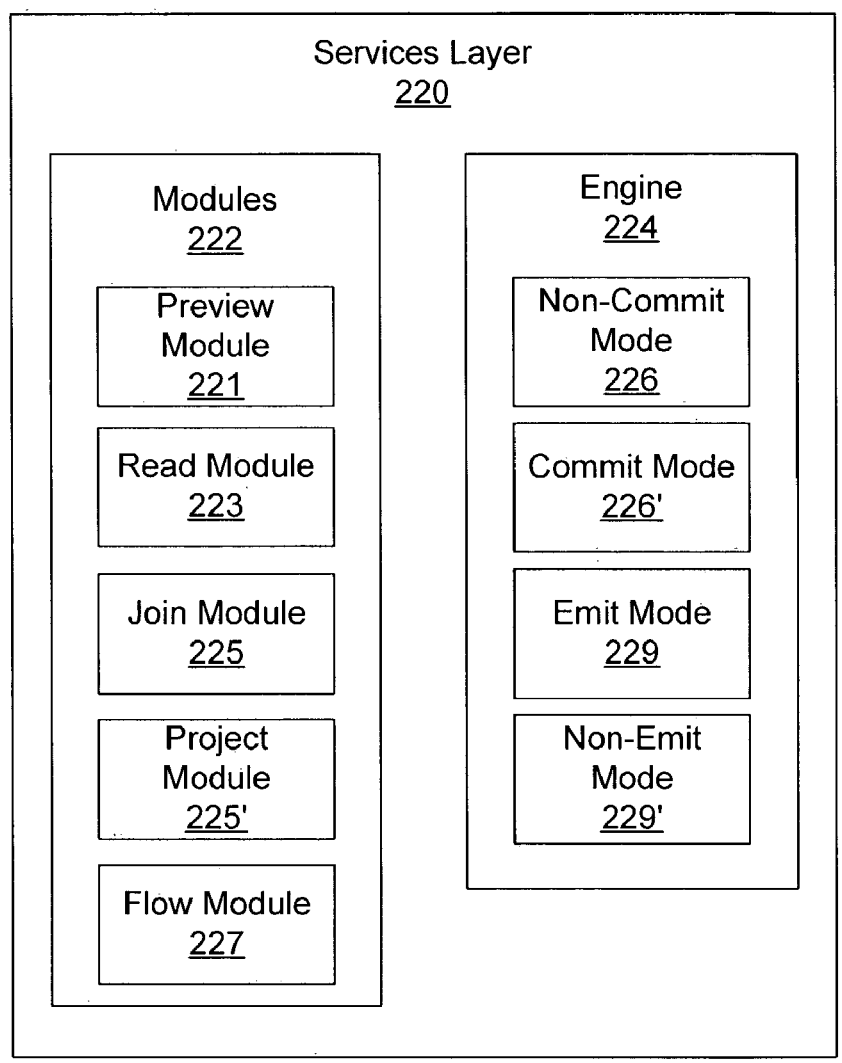
FIG. 6 is a block diagram of an exemplary services layer that includes a plurality of modules and an engine capable of emitting semantic information.

FIG. 6 shows an exemplary scenario 600 that includes an exemplary services layer 220 that includes a plurality of modules 222 and an engine 224. Of course, a services layer may include more than one type of engine, for example, depending on the types of modules that need to be executed. In this example, the engine 224 has particular features referred to herein as a non-commit mode 226, a commit mode 226', an emit mode 229 and a non-emit mode 229'. In general, various exemplary preview services rely on an exemplary engine that can operate in the emit mode 229; however, as an option, the engine 224 may also execute modules in a non-emit mode 229'. With respect to the non-commit mode 226 and the commit mode 226', various exemplary preview services are particularly useful in a non-commit mode 226, wherein output information is not committed, for example, to a core area. Various exemplary preview services may execute in conjunction with an engine in a commit mode; however, in such a situation, there is no opportunity to prevent output information from being committed. Hence, use of an exemplary preview service may provide for forensic, "after-the-fact" analysis of committed output information. The various exemplary engine modes 226, 226', 229, 229' are optionally triggered (e.g., switched on or off) via instructions in service modules. Further, such modes may rely on software included in one or more modules, which may not be shown explicitly in the exemplary scenarios.

Figure 7:
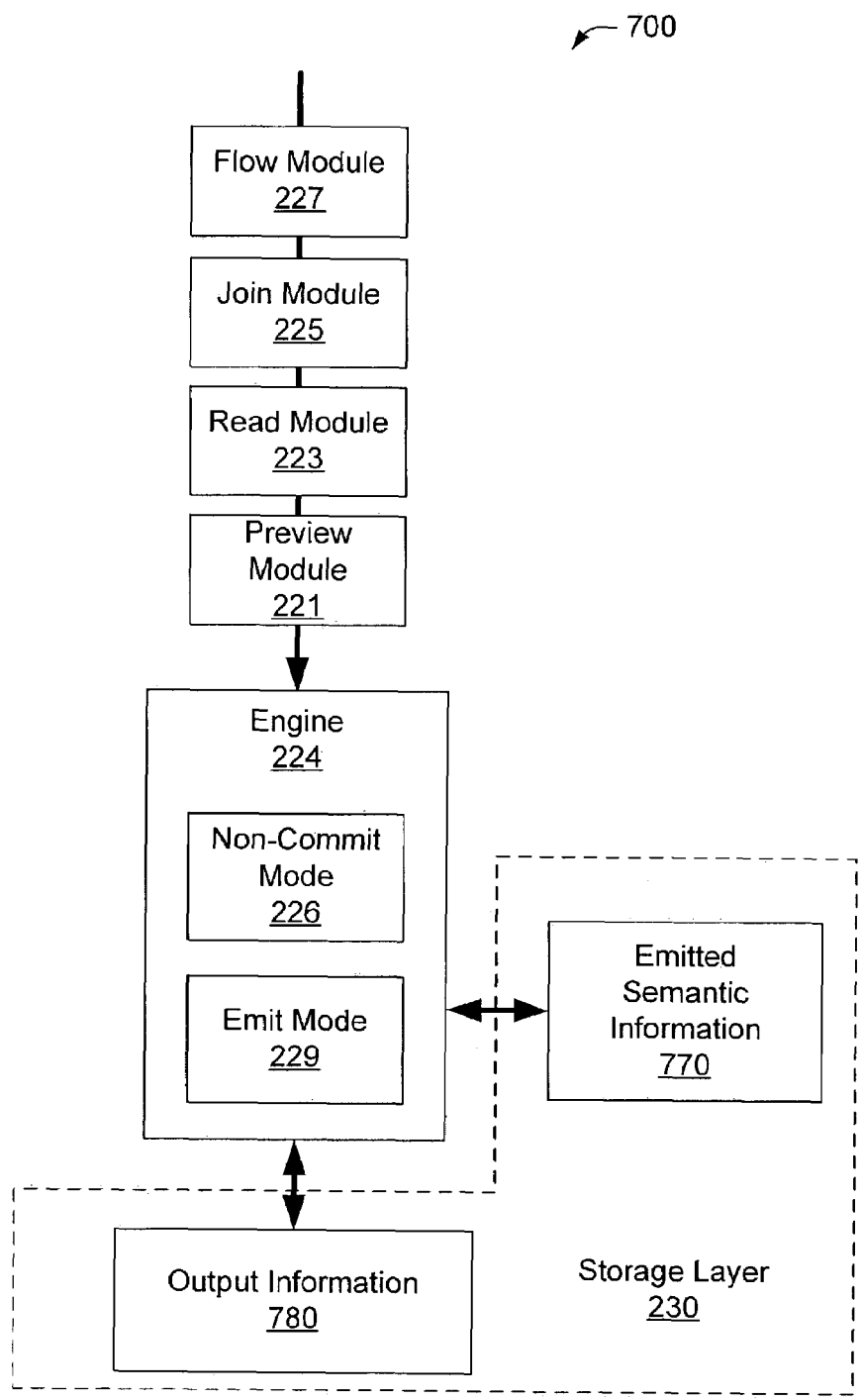
FIG. 7 is a block diagram of an exemplary scenario wherein service modules are executed on a service engine capable of emitting semantic information to a storage layer and capable of generating output information.
Figure 8:
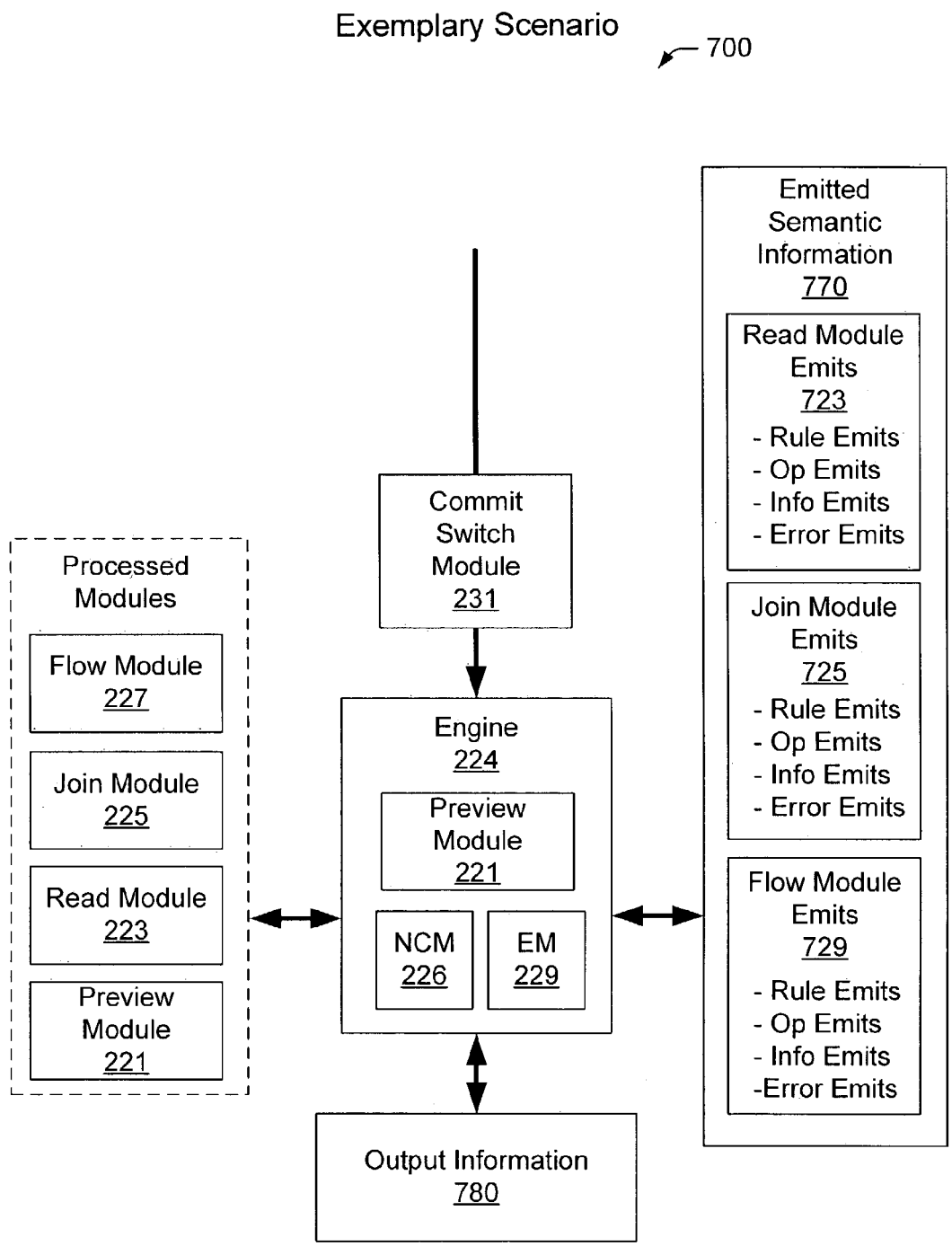
FIG. 8 is a block diagram of an exemplary scenario wherein some service modules have been executed on a service engine, which has thereby emitted semantic information to a storage layer and generated possibly some output information.

In the exemplary scenarios of FIGS. 6, 7 and 8, an exemplary execution engine 224 functions in the non-commit mode 226 and the emit mode 229. In general, this may be referred to as a "preview mode", particularly where instructions are available to preview non-committed results and/or other relevant information. The emit mode 229 causes the engine 224 to emit semantic information, for example, semantic information germane to execution of a services module. Semantic information may include, for example, what functions were requested in a command, function values, errors, etc. Further, semantic information may be local, global, private, public, etc. Emitted information is typically emitted according to a specified syntax. For example, at least some emitted information may be emitted in an extensible markup language (XML) that may include markup tags and information as strings, integers, binary, etc. For example, the string "phonenum" placed within markup tags could indicate that the information that followed was a phone number. Hence, emitted information may be processed, for example, by a module executing on an engine. Such emitted information may be stored and/or displayed (e.g., like an HTML file). For example, depending on how a module executes, the phone number, could be stored, displayed, and/or dialed. In general, XML is referred to as "extensible" because markup symbols may be created and self-defined. Thus, an exemplary metadirectory optionally includes an engine capable of emitting semantic information. Such an exemplary metadirectory optionally emits semantic information in a self-defining language, such as, but not limited to, XML. Further, an exemplary metadirectory optionally includes an engine capable of executing emitted semantic information. For example, upon execution, a service module may cause an engine to read and execute emitted semantic information.

Referring to the exemplary modules 222, a preview module 221 may (e.g., upon execution) instruct the engine 224 to operate in the emit mode 229 and the non-commit mode 226. Further, the preview module 221 may instruct the engine 224 to read and/or execute emitted semantic information, wherein the emitted semantic information is optionally in a self-defining language.

FIG. 7 shows an exemplary scenario 700 wherein a stack of service modules (e.g., 221, 223, 225, 227) execute on an engine 224 operating in the non-commit mode 226 and the emit mode 229. According to the scenario 700, the engine 224 may be set to the emit mode 229 and to the non-commit mode 226, may operate only in the emit mode 229 and/or be set to operate in the emit mode 229 or non-emit mode 229' and/or the non-commit mode 226 or commit mode 226' upon instruction by a service module and/or a user. For example, the preview module 221 may include an instruction that sets the engine 224 to operate in emit mode 229 and in the non-commit mode 226. Of course, an engine that operates in an emit mode may emit semantic information that can be used by an exemplary "viewing" service (e.g., preview or other service) at any point in time (e.g., prior to commit, after commit, during execution, etc.).

In the emit mode 229, the engine 224 can emit semantic information 770 to a storage in, for example, a storage layer 230. The engine 224 may also generate output information 780, which may be stored in the storage layer 230. Output information 780 generally includes all information germane to updating one or more entries in a metadirectory. The engine 224 typically generates output information 780 regardless of the mode of operation. Often, such output information is committed upon execution of a commit command (e.g., when the engine operates in the commit mode 226'). In the exemplary scenario 700, a commit switch module may include a commit command that may cause the engine 224 to commit the output information 780, at an appropriate time (e.g., after preview and/or analysis).

In the scenario 700, the service modules are ordered to perform processes relevant to a synchronization process. For example, such a synchronization process may aim to keep selected information in multiple data sources in agreement. In an exemplary metadirectory, a synchronization process includes an attribute flow precedence that may combine similar information into a final version for storage in a core area, wherein such information may then be exported from the core area to appropriate data sources. Hence, the scenario 700 only includes service modules for performing aspects of a synchronization process up to and including flow of information from a buffer area to a core area.

FIG. 8 shows the exemplary scenario 700 in a particular state of operation. In particular, various service modules have been executed to some appropriate degree using the engine 224, which has operated in the non-commit mode 226 (e.g., "NCM") and the emit mode 229 (e.g., "EM"). As a consequence, emitted semantic information 770 has been generated. For example, upon execution of the read module 223, the engine 224 emitted semantic information 723. Such emitted information may relate to rules, operations, information, errors, etc. Similarly, upon execution of the join module 225, the engine 224 emitted semantic information 725. Such emitted information may relate to rules, operations, information, errors, etc. Further, upon execution of the flow module 227, the engine 224 emitted semantic information 727. Such emitted information may relate to rules, operations, information, errors, etc. Note that the commit switch module 231 has not yet been executed by the engine 224. Hence, the generated output information 780 has not been committed to the exemplary metadirectory. Of course, depending on various results, a user may choose not to commit output information.

As shown in FIG. 8, currently executing on the engine 224 is the preview module 221, which may have executed, at least to some degree, at an early point in time (e.g., to set the engine 224 to emit mode 229). In this example, the preview module 221 allows the engine 224 to use the,emitted semantic information 770, the output information 780 and/or any service module, including those already executed. Again, the preview module 221 is executing prior to execution of a commit command (e.g., the commit switch module 231) which would act to commit the output information 780 to the exemplary metadirectory. Various exemplary screens, pages and/or user interfaces relevant to an exemplary preview service are discussed in detail further below with respect to an exemplary metadirectory.

The exemplary preview module 221 may allow a user to preview any and/or all processes prior to a commit. Of course, if a commit command is executed, and the emitted semantic information 770 is still available, a user may perform metadirectory forensics to potentially uncover processes and related information that generated a particular outcome (e.g., a committed set of output information). In general, a preview service is used prior to a commit command, for example, in a manner somewhat analogous to a "print preview" command in document processing software.

The preview module 221 may also allow for user interaction. For example, a user may "roll-back" through the processes and enter new information. Thereafter, the user may "roll-forward" through the processes to determine how emitted semantic information and/or output information changed in response to the new information. Again, such services provide for a rich analysis of information in an exemplary metadirectory. Such services may be forward looking and/or backward looking (e.g., forensic). In some instances, upon execution, a service module may seek emitted semantic information. For example, prior to execution of a particular command, the service may seek emitted semantic information related to that command to determine if the command should be executed. Of course, many possible scenarios exist wherein emitted semantic information may be used in a recursive manner.

Overall, the exemplary metadirectory scenario 700 demonstrates how an exemplary services layer that emits semantic information may be used to perform a rich analysis of metadirectory processes (e.g., test runs that test services in response to changes to a single object, multiple objects, rules, specifications, etc.). Using such an exemplary services layer, administrators can see effects of a configuration change before actually applying the change.

Figure 9:
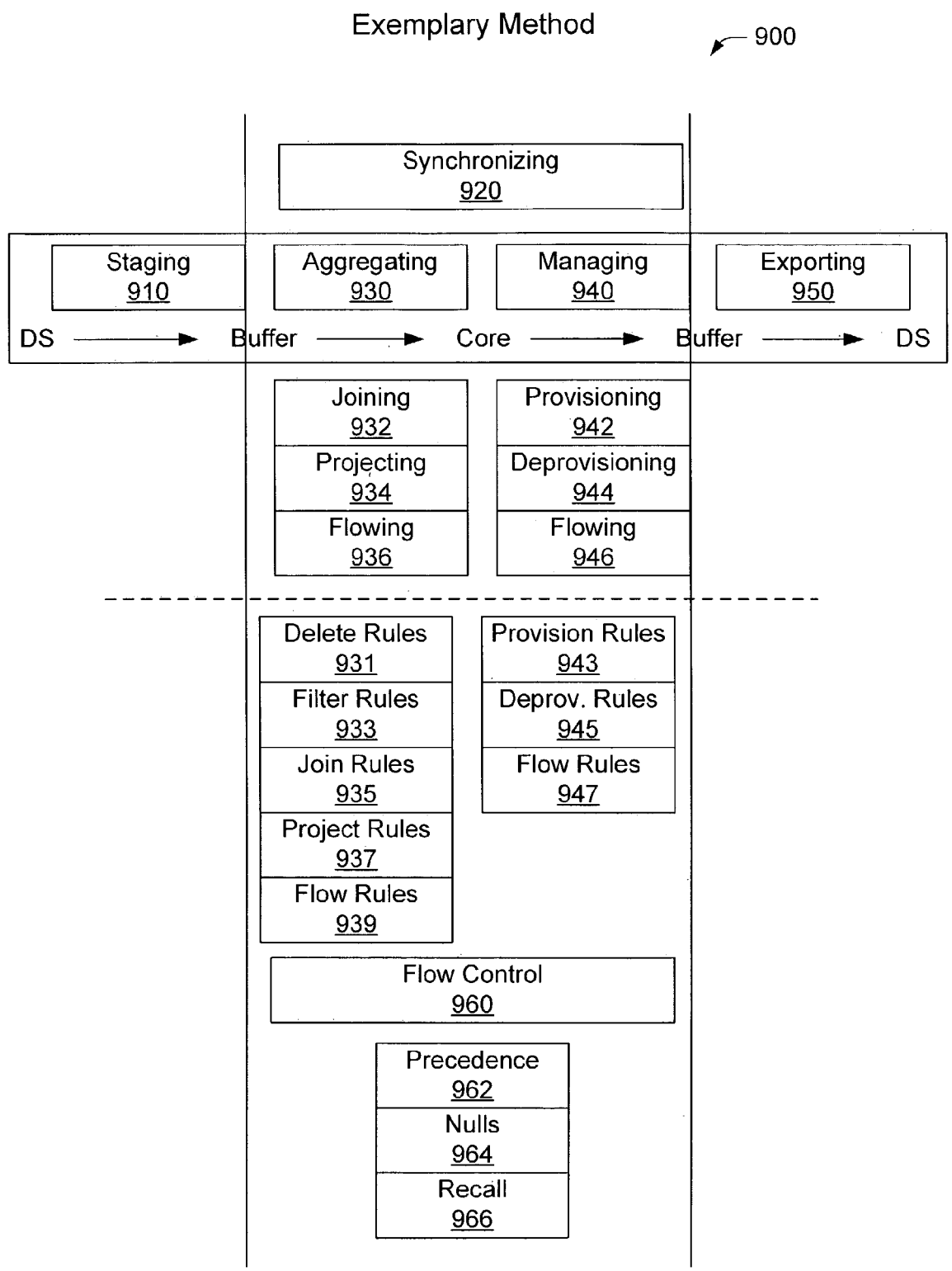
FIG. 9 is a block diagram of an exemplary method of processing information in an exemplary metadirectory.

To more particularly describe some exemplary features for an exemplary metadirectory capable of emitting semantic information, a description of an exemplary metadirectory method is given. FIG. 9 shows an exemplary method 900 wherein directory information travels from left to right with respect to various processes. The exemplary method 900 includes three main processes staging 910, synchronizing 920 and exporting 950. Staging 910 includes communicating directory information from one or more data sources (DS) to a metadirectory. Synchronizing 920 includes aggregating 930 information and/or account managing 940 information with respect to a core area and a buffer area of a metadirectory. Exporting 950 includes communicating directory information from a metadirectory to one or more data sources (DS).

Aggregating 930 may include sub-processes such as joining 932, projecting 934 and flowing 936. Aggregating 930 acts to aggregate information in a metadirectory wherein the information pertains to one or more directories used in one or more data sources. Aggregating 930 may further rely on various rules, such as, but not limited to, delete rules 931, filter rules 933, join rules 935, project rules 937 and flow rules 939. Joining 932 may aid in aggregating 930. Joining 932 typically aims to join information. Joining 932 may join information in a buffer area, in a core area and/or between a buffer and a core area. For example, joining 932 may establish a link between an object in a core area and an object in a buffer area. Such a process may also act to establish a link between an object in a core area and/or a buffer area and an object in one or more data sources. Joining 932 may operate automatically and/or interactively according to rules and/or specifications and/or according to an administrator's commands. Further, joining 932 does not necessarily include any changing of attribute values. Joining 932 operates primarily to establish links or relationships between entities, records, etc. (e.g., storage layer entities).

Projecting 934 can operate to create storage layer entity in a core on the basis of a storage layer entity in a buffer; projecting 934 may also act to establish a link between the created and the already existing storage layer entity. Projecting 934 may be performed as an object-level operation. Projecting 934 does not necessarily include any changing of attribute values.

Flowing 936 can operate to change directory information in core area of an exemplary metadirectory. Flowing 936 typically relies on a link established between an entity in a buffer and an entity in a core. Further, flowing 936 generally operates at the level of attribute values. Another flowing process 946 may act to change directory information in a buffer based on information in a core.

Account managing 940 in this instance is used to refer to managing aggregated information in a metadirectory. Account managing 940 may be initiated by any change to information in an entity in a core of the metadirectory, sometimes with the exception of a deletion. In general, account managing 940 evaluates whether changes to a core entity require updates to a buffer entity. A buffer entity that requires and/or receives changes may be flagged to aid in exporting 950. Exporting 950 is typically a push process that relies on flagged buffer entities to update directory information in one or more data sources. Managing 940 may include sub-processes such as provisioning 942, deprovisioning 944 and flowing 946. Managing 940 may also rely on various rules, such as, but not limited to, provision rules 943, deprovision rules 945 and flow rules 947.

Provisioning 942 may be triggered when changes are applied to one or more entities in core area of an exemplary metadirectory. Provisioning 942 may create a buffer entity and optionally a link between a core entity and the created buffer entity. Provisioning 942 may rename a entity, a record, etc., particularly one that resides in a buffer area of an exemplary metadirectory. Provisioning 942 may disconnect a link between a core entity and a buffer entity.

Deprovisioning 944 may determines how a metadirectory processes certain buffer entities. For example, deprovisioning 944 may keep a buffer entity in a buffer area or delete it from a buffer area. Of course, deprovisioning 944 may flag a buffer entity as "deleted," which may subsequently initiate a delete operation on the entity. Flowing 946, as already mentioned, may act to change directory information in a buffer based on information in a core of a metadirectory.

Exporting 950 may examine entities in a buffer area of a metadirectory (e.g., for those flagged as pending export) and then act to communicate update information to one or more data sources, as appropriate.

Synchronizing 920 may also rely on flow control 960 wherein features such as precedence 962, nulls 964 and recall 966 are involved.

The various processes described in the exemplary method 900 may be considered services of an exemplary metadirectory. As such, the various processes may exist as service modules suitable for execution on a service engine. Further, such a service engine may operate permanently or optionally in an emit mode, wherein the engine emits semantic information germane to execution of service modules and/or other related information. The various processes may also be used to define information states.

Various exemplary uses of a service, described below, may rely on emitted semantic information. In some of these examples, a preview service is used to examine processes related to an object in a metadirectory. For example, such a service may allow a user to see how rules will process a single object in an exemplary metadirectory by displaying all rules that were attempted or applied during any part of a synchronization process. A user interface may allow a user to select an available rule or process (e.g., joining, projecting, flowing) and then preview results generated by that rule or process. Such a service can allow a user to catch any errors in rules and/or processes prior to committing results (e.g., output information) to a core, or exporting from a core to a buffer.

In one example, a user may run a preview service with respect to an object defined in an exemplary metadirectory and thereby do any of the following:

(i) apply rules to an object that has been staged (e.g., read) to the buffer (e.g., a connector space or connector namespace);

(ii) apply rules to an object that failed to join, and to view any associated error;

(iii) apply rules to an object that has an import delta (e.g., information indicating that something has changed in a data source);

(iv) apply rules to an object that failed due to provisioning errors or schema violations;

(v) reapply rules to objects that are already synchronized;

(vi) test a new rules extension; and (vii) other tests and/or observations related to an object.

In general, an exemplary preview service includes user interface (UI) instructions that allow a user to see various aspects of previewed processes. For example, such a UI can allow a user to see a sequence of actions that would occur if an entity was synchronized with current attribute values. Further, an exemplary preview service may allow a user to modify or insert attribute values to test synchronization; and synchronize an entity being previewed; modify rules in the context of a preview mode. An exemplary preview service can allow an administrator to test and examine a synchronization process from a buffer area (e.g., a connector space) to a core area (e.g., a metaverse) and out to a buffer area, for example, with linked entities.

A user may desire to use an exemplary preview service with respect to various scenarios, for example, to diagnose synchronization process errors. In this scenario, an administrator desires to diagnose an error that has occurred during a synchronization process. In a traditional metadirectory service, an administrator can typically view only limited details regarding an error; in general, such limited details do not provide the context of the events in the synchronization process leading up to the error. In contrast, an exemplary preview service can allow an administrator to view information related to all relevant processes and/or sub-processes of a synchronization process, including those that lead up to an error and optionally all of attribute values and rules applied. Such an exemplary service can provide a complete picture about what was occurring at the time of an error and can assist an administrator in troubleshooting rules involved.

In another scenario, an administrator desires to diagnose unexpected synchronization results. In this scenario, an administrator has detected unexpected synchronization results. For example, consider no detection of any formal errors, but rather rules that were expected to be applied did not get applied or rules that were not expected to be applied to an entity were applied.

Similar to the error troubleshooting scenario, in this case, an administrator can view details of all of the rules that were applied to an entity, as well as rules that were not applied to an entity. An exemplary preview service can display attribute values being processed and status for each rule, which can give an administrator a complete picture of why an expected rule was not applied or just the opposite.

In yet another scenario, an administrator desires to test synchronization rules before running a "committed" synchronization process or before committing any synchronization results. In this scenario, an administrator desires to test some rules changes. An exemplary preview service can be used to perform a "what if?" process. For example, an administrator may configure various rules for a management agent (e.g., a service module for a particular data source) that participates in a synchronization process and then select an entity to test the rules and/or management agent. An exemplary preview service can use the newly configured rule and cause display of results. If these results are not favorable (e.g., exhibiting desired behavior), the administrator can adjust the rules and preview the entity again. In each trial, the exemplary preview service or processes do not commit the entity changes. This may save an administrator from having to clean areas each time or somehow trigger a change of an entity of interest.

In another scenario, an administrator desires to understand better a synchronization process. In this scenario, an exemplary preview service can show results in the exact order that a metadirectory engine will process an entity and the relevant rules. Thereby, an administrator can get an accurate view of how the configured rules are processed. In many instances, there are subtle implications of certain rules and such an exemplary preview service can allow for a non-destructive way to investigate these during a development process.

Various exemplary preview services described herein can allow for previewing single entities at a time and/or determining the effects of a synchronization process based on the changes introduced by a single entity object. Various other exemplary preview services described herein can allow for previewing more than one entity and/or determining the effects of a synchronization process based on changes introduced by one or more entities. Again, such exemplary preview services can allow an administrator to "preview" the effects of an entire run without committing the output information.

An exemplary preview service can allow for display of various "pages" of information. Individual pages that may be viewed through use of such an exemplary preview service typically relate to various sub-process of a synchronization process for an entity. For example, each page may be dedicated to a specific sub-process of a synchronization process and such pages may appear in the same order rules and/or engines execute the processes (e.g., including sub-processes).

With respect to various example pages discussed below, various results only show the rules that were attempted or applied during a synchronization process. Any rules that would not be evaluated for a selected entity because of rules configuration or the types changes for the entity are not included in these results.

Example pages of an exemplary preview service may include the following pages, noting that it is possible for some to appear multiple times depending on circumstances: Start Preview; Source Object Details; Connector Filter; Object Deletion Rule; Attribute Recall and Repopulation; Join and Projection; Metaverse Object Type; Import Attribute Flow; Provisioning Summary (e.g., Connector Add; Connector Rename; and Connector Deprovisioned); and Connector Updates (e.g., Object Details (this is the DN of the connected object); Export Attribute Flow; Connector Filter; and Connector Deprovisioning).

Various aspects of each of these pages are discussed below. Again, some pages can appear multiple times depending on the scenario and may provide a cascade of pages.

Start Preview

The Start Preview page may be displayed as an initial dialog page that appears when a user selects an exemplary preview service from, for example, a Search Connector Space page or from a properties dialog page for an entity in a buffer are (e.g., a buffer entity or a connector space object). From this page, a user can select the preview mode to generate and see results of synchronization.

Figure 10:
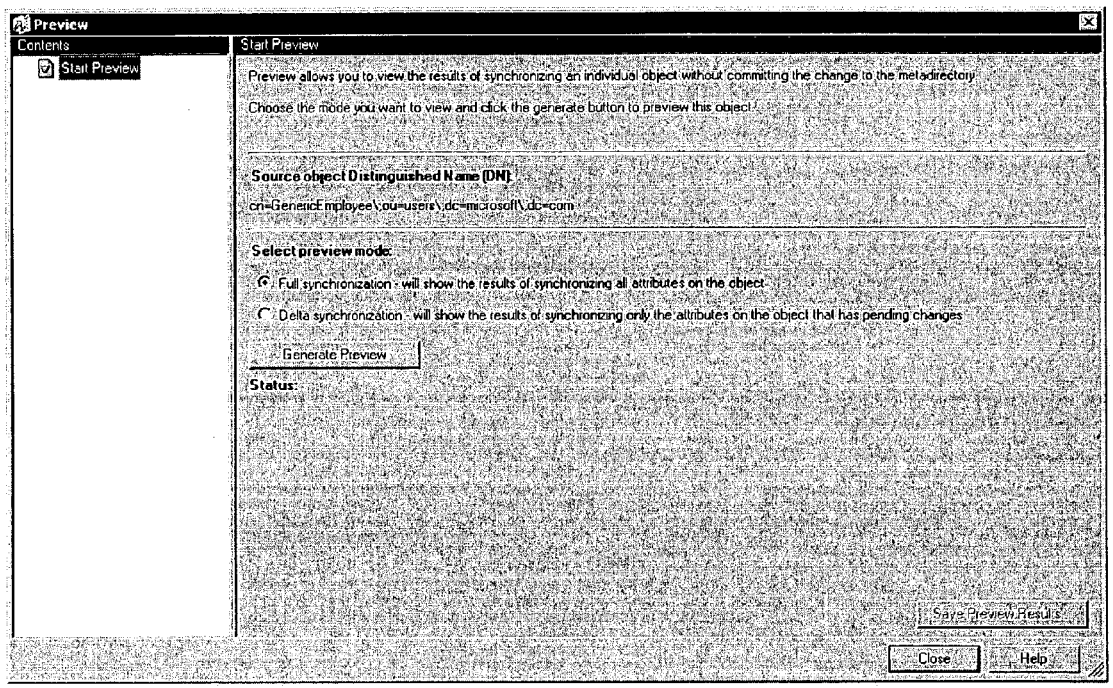
FIG. 10 is an exemplary screen shot generated by an exemplary metadirectory showing a Start Preview window.

FIG. 10 shows an exemplary screen shot 1000 generated by an exemplary metadirectory that includes a preview service (e.g., a preview module). The screen shot 1000 further exhibits an exemplary user interface. The screen shot 1000 shows a "Contents" window and a "Start Preview" window. The Contents window allows a user to select from "Start Preview" (current view).

In the example of FIG. 10, the preview service allows a user to view the results of a synchronizing process for an individual object without committing any changes to the metadirectory. Per the screen shot 1000, a user may select a particular preview mode via a radio button and then click a "Generate Preview". The available preview modes include "Full", which will show results for synchronizing all attributes associated with the object (i.e., all of the attributes defined for the object), and "Delta", which will show results for synchronizing only attributes that have pending changes. A source object distinguished name (DN) is also presented to allow a user to correctly identify a selected object (e.g., optionally an anchor for non-LDAP systems). Also, a status indicator, in this instance indicating successful synchronizing, is displayed. Further, a button is available to allow a user to save the preview results.

With respect to the status indicator, it may display the final result for the synchronization of the selected object. The possible results are:

Synchronization successful: this status indicates that the synchronization of the object completed without any errors.

Synchronization successful (No Delta): this status indicates that the synchronization of the object completed without any errors, however, there were no changes to process, so no synchronization rules were applied. This will only appear for Delta Synchronization of an object with no pending changes.

Synchronization error encountered: This status indicates that the synchronization of the object encountered an error which would result in the transaction being rolled back and logged. There will be additional information displayed for the error:

Error Type: This will display the error type reported from the execution engine (e.g., rules and/or synchronization).

Error Details: This text field will report the error information details.

Figure 11:
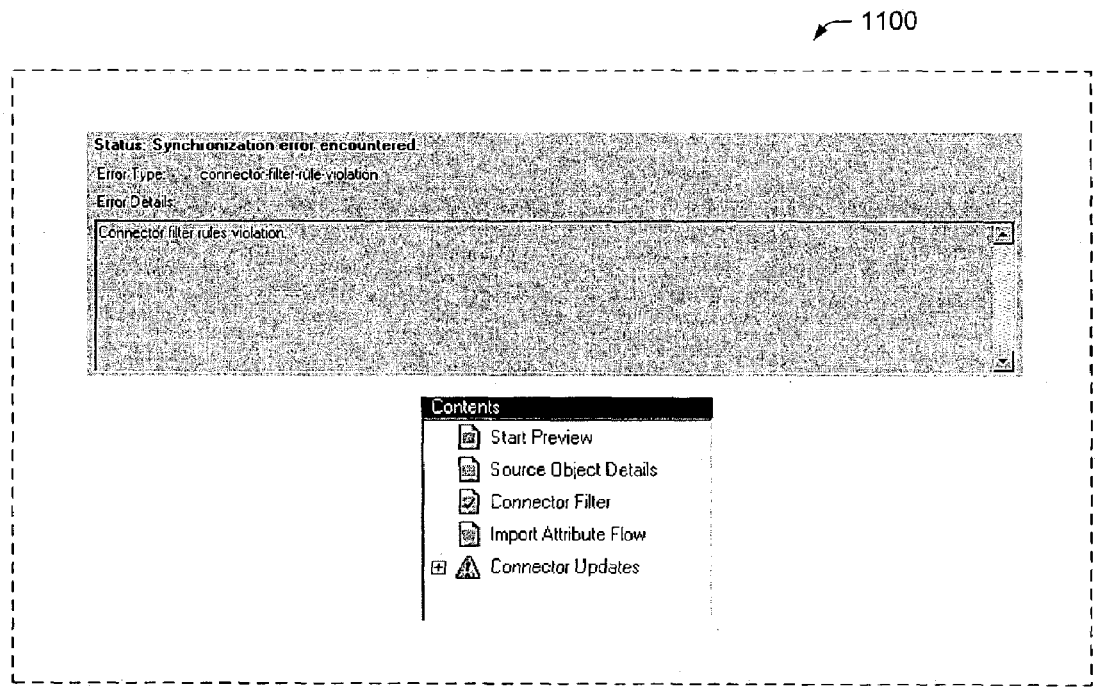
FIG. 11 is an exemplary screen shot generated by an exemplary metadirectory showing a synchronization error window.

With respect to synchronization errors, FIG. 11 shows an exemplary screen shot 1100 generated by an exemplary metadirectory that includes a preview service (e.g., a preview module). The screen shot 1100 further exhibits an exemplary user interface. The screen shot 1100 lists an error type "connector-filter-rule-violation". When such an error occurs, an associated node in a tree where the error occurred may be displayed with a warning icon. A user may desire to save preview results. For example, a user may choose to save the preview results in XML to a file from a preview page.

Source Object Details

Figure 12:
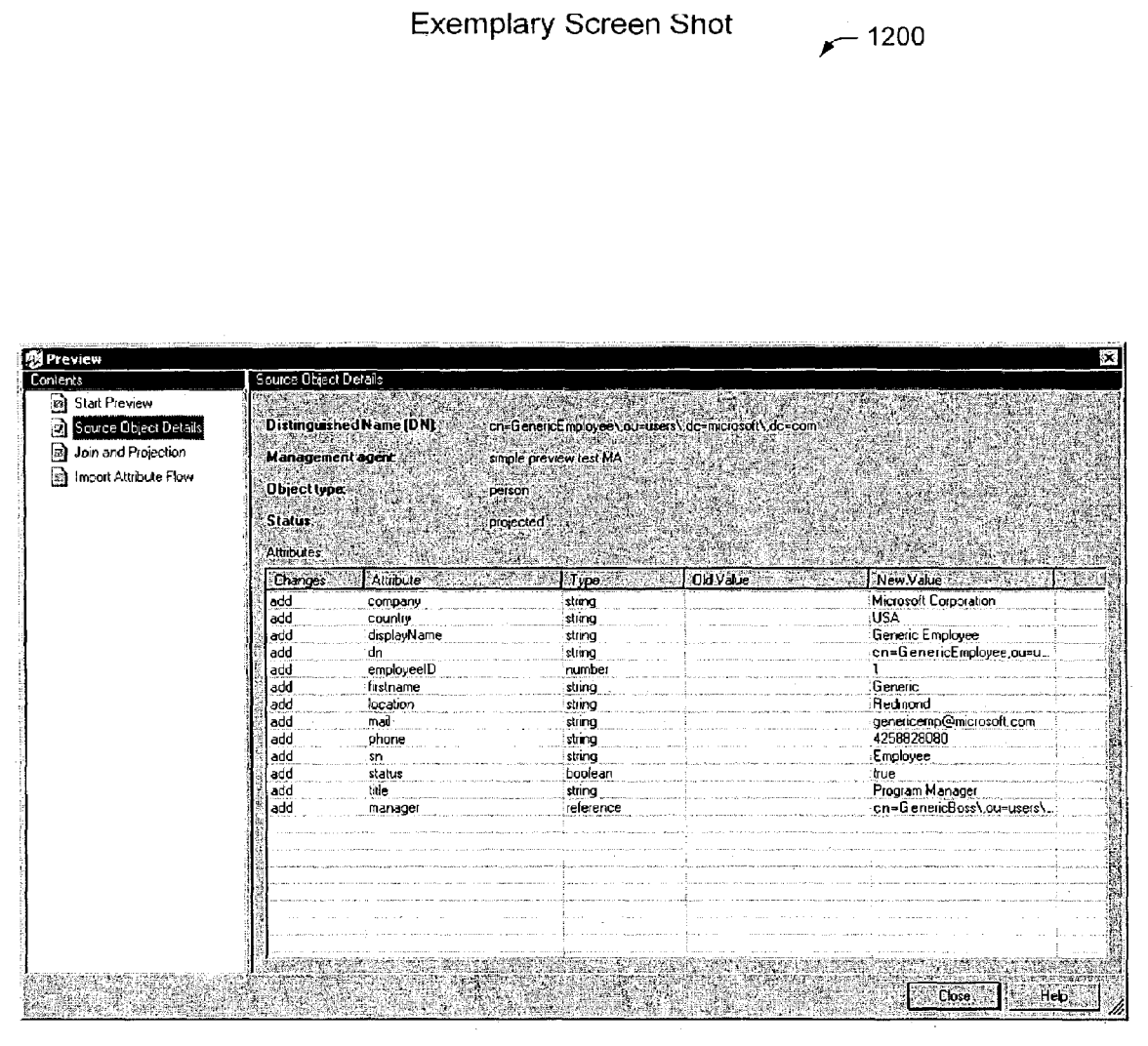

A Source Object Details page can display the details of a buffer entity (e.g., a connector space object) being previewed. FIG. 12 shows an exemplary screen shot 1200 generated by an exemplary metadirectory that includes a preview service (e.g., a preview module). The screen shot 1200 further exhibits an exemplary user interface. The information displayed in the screen shot 1200 pertains to the object identified by the distinguished name "cn=GenericEmployee\,ou=users\,dc=Microsoft\,dc=com", which was the object identified in the screen shot 1000. In this example, a user has selected Source Object Details in the Contents window. The adjacent window is therefore identified as "Source Object Details". The Source Object Details window displays the distinguished name for the object, the management agent for the data source "simple preview test MA", the object type, "person", and the status, "projected".

The Source Object Details window includes a plurality of columns that contain information associated with the identified object. A first column indicates change information in the form of an operation command (e.g., add, delete, modify, none, etc.). In this instance, all attributes (e.g., second column) have been added; hence, the first column lists "add"

for all attributes of the identified object. As already mentioned, the second column lists the attribute name for all of the attributes of the identified object. The attribute type is listed in a third column, which indicates that some attribute values are string values, some are reference, some are number and some are Boolean. A fourth column, entitled "Old Values" does not contain any values, which indicates that no old values exist for the identified object or its attributes. A fifth column is entitled "New Values", which lists the "new" values for the attributes of the identified object. Other, including different, user selectable columns or set columns may be shown. Also of note, in this instance, the DN has the same value as the attribute named "dn".

Connector Filter (Import and Export)

Figure 13:
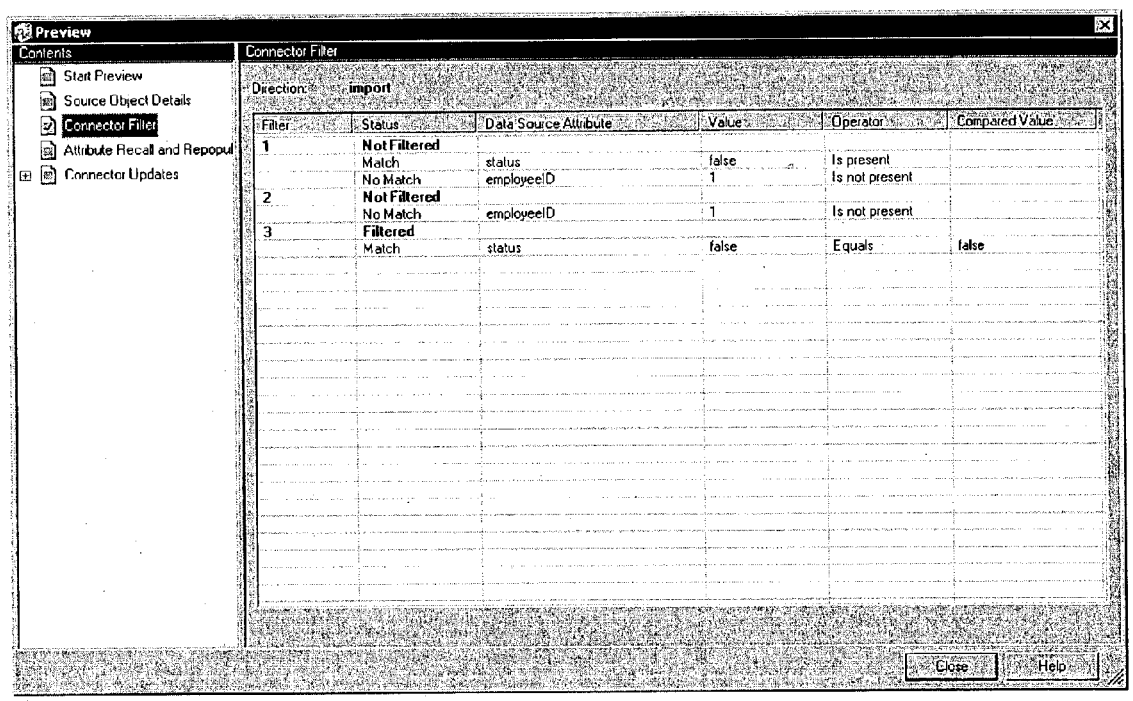
FIG. 13 is an exemplary screen shot generated by an exemplary metadirectory showing a Connector Filter window.

If a Connector filter rule is configured it may be evaluated whenever there are modifications on an object of the type matching the rule, which may be evaluated for both import and export processes. Import and export processes may be displayed in a UI as a "Direction." FIG. 13 shows an exemplary screen shot 1300 generated by an exemplary metadirectory that includes a preview service (e.g., a preview module). The screen shot 1300 further exhibits an exemplary user interface. In the screen shot 1300 Direct is indicated as "import". In an import direction, a Connector Filter is applied to a buffer entity (e.g., a connector space object) to determine: (i) for disconnectors—if the object matches the filter, it will remain a disconnector (in this case Join and Projection rules will not be evaluated for this object); and (ii) for connectors—if the object matches the filter, it will be disconnected from the core area (e.g., metaverse space). Again, a disconnector does not have a link to an entity in a core area.

For an export direction, any applicable Connector Filter is evaluated against Export Attribute Flow changes on an entity. For example, a process may reject any attempt to Export flow attribute changes that would trigger a Connector Filter match on an entity—which will create an error. A correct way to instigate an entity disconnection may be via a Provisioning Rules Extension.

In the example screen shot 1300, the columns contain the following information:

Filter: shows the number of the filter being evaluated. This will match to the order of the filters defined in a management agent's property pages.

Status: This column displays two different pieces of result information. The status of the evaluation of this filter as a whole (in bold) and the status of the individual filter conditions.

The possible values for the Filter status are:

Not Filtered: means that not all of the conditions of this filter were matched and as a result does not apply to this object.

Filtered: means that all of the conditions of this filter were met and as a result the buffer entity or connector space object becomes or remains as filtered disconnector.

Error: this means that there was an error with this subprocess. Details may be displayed in the status bar. If there is a Rules Extension exception, a Stack Trace button may be enabled.

Possible values for the Condition status are:

No Match: means that this condition was evaluated without error, but was not a match.

Match: means that this condition was evaluated without error and was a match.

Error: this means that there was an error evaluating this condition. The details will be displayed in the status bar. If there is a Rules Extension exception, a Stack Trace button may be enabled.

Of further note, a filter may contain multiple conditions. Such conditions cannot be evaluated until one condition returns "No Match". At that point, rules execution may proceed to the next Filter and ignore any remaining conditions for this filter.

Data Source Attribute: displays the attributes for this entity or object type used for the condition.

Value: the value of the attribute for the object being evaluated.

Operator: the operator being used for the comparison operation.

Compared Value: the value is configured in the filter condition. This is what the "value" on the attribute is compared against to determine if it is a match.

Object Deletion Rule

Figure 14:
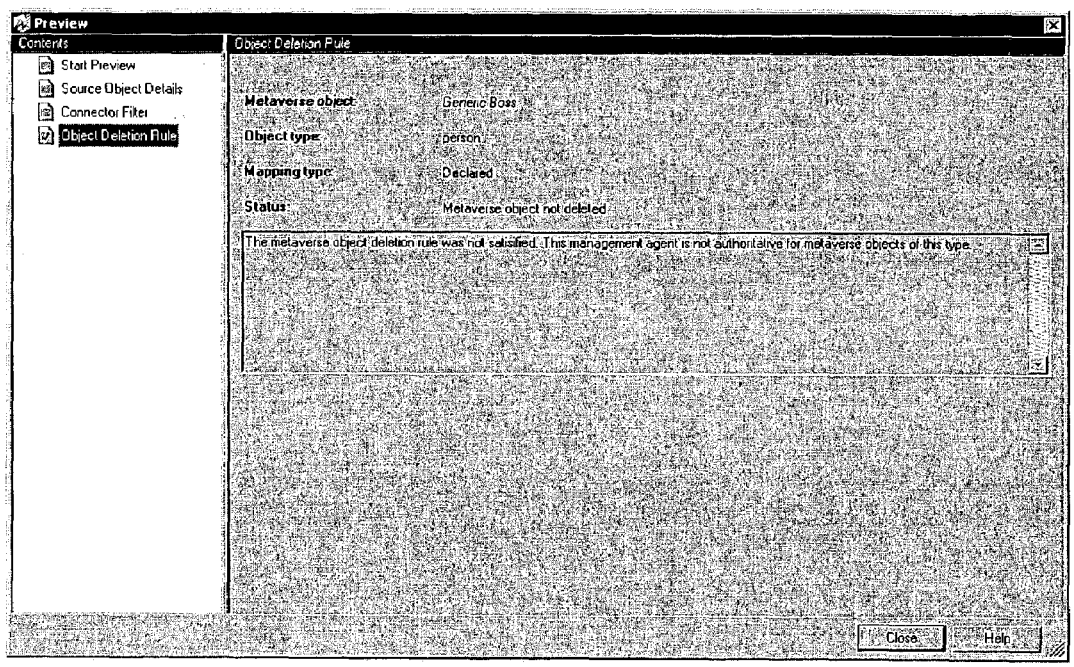
FIG. 14 is an exemplary screen shot generated by an exemplary metadirectory showing a Object Deletion Rule window.

An Object Deletion Rule page may be displayed by an exemplary preview service in cases where a selected object is being disconnected either because it is a pending a Delete process or because a Connector Filter rule is now satisfied and the object is disconnected from a core area (e.g., a metaverse space). FIG. 14 shows an exemplary screen shot 1400 generated by an exemplary metadirectory that includes a preview service (e.g., a preview module). The screen shot 1400 further exhibits an exemplary user interface. As with various other screen shot windows, the exemplary screen shot 1400 includes a contents window and an Object Deletion Window, both within a Preview window. Of course, various other arrangements are possible with respect to such window, in this case and/or for other examples herein.

The exemplary screen shot 1400 includes a "Metaverse Object" indicator, which shows the metaverse object (e.g., core entity in a core area) linked to the connector (e.g., buffer entity in a buffer area) that is being deleted or disconnected, an "Object type" indicator, which shows the object type of the metaverse object (noting that object deletion rules are, for example, scoped by metaverse object type), a "Rule type", which shows the type of rule specified for this object type wherein possible values are: Declared and Rules Extension, and a "Status" indicator, which shows a result of the evaluation of the object deletion rule, wherein possible values are: Metaverse object not deleted, Metaverse object deleted, and Error. A status details indicator may be a text field that can display additional details. For example, the following status details are optionally displayed:

1. The metaverse object deletion rule was satisfied and/or the metaverse object will be deleted. These statements indicate that the object should be deleted. For example, either a scripted rule indicated the object should be deleted or all of the conditions for a declarative rule were satisfied such that the object can be deleted.

2. The metaverse object deletion rule was not satisfied and/or this management agent is not authoritative for metaverse objects of this type. These indicators are for declarative rules. These statements indicate that the object should not be deleted because the disconnecting management agent is different than the one configured in the rules as the owner.

3. The metaverse object deletion rule was not satisfied and/or this is not the last connector from this management agent linked to the metaverse object. These indicators are for declarative rules. These statements indicate that the disconnection management agent is the configured 'owner', but that the object should not be deleted because there are other existing connectors to the object from that management agent.

4. The metaverse object deletion rule was not satisfied and/or the rules extension declined to delete the metaverse object. These indicators are for scripted rules. These statements indicate that a script indicated that the object should not be deleted.

5. Error. This indicate the occurrence of an error.

Attribute Recall and Repopulation

An "Attribute Recall and Repopulation" page may be displayed in cases where a connector, either the object being previewed or another object that is connected to the same metaverse object (e.g., a core entity in a core area) are disconnected and the metaverse object remains. When an object is disconnected from the metaverse (e.g., core area), the attribute values that it contributed to the metaverse object are removed, or "recalled". This can be overridden with this option in a management agent's Deprovisioning property page. Again, a management agent is a service that may be configured according to a particular data source, etc.

In a default configuration, attribute values contributed to a core entity (e.g., a metaverse object) by a disconnecting object will be removed. If any Import Attribute Flow rules exist for these attributes (e.g., configured on other management agents who have connectors linked to this metaverse object), these will be evaluated in an order according to precedence settings to "repopulate" the metaverse (e.g., the core area) with values for these attributes. Execution of rules in one or more processes acts to process all of the connectors (e.g., buffer entities having links to core entities) until the attributes are repopulated or the available connectors are exhausted.

Figure 15:
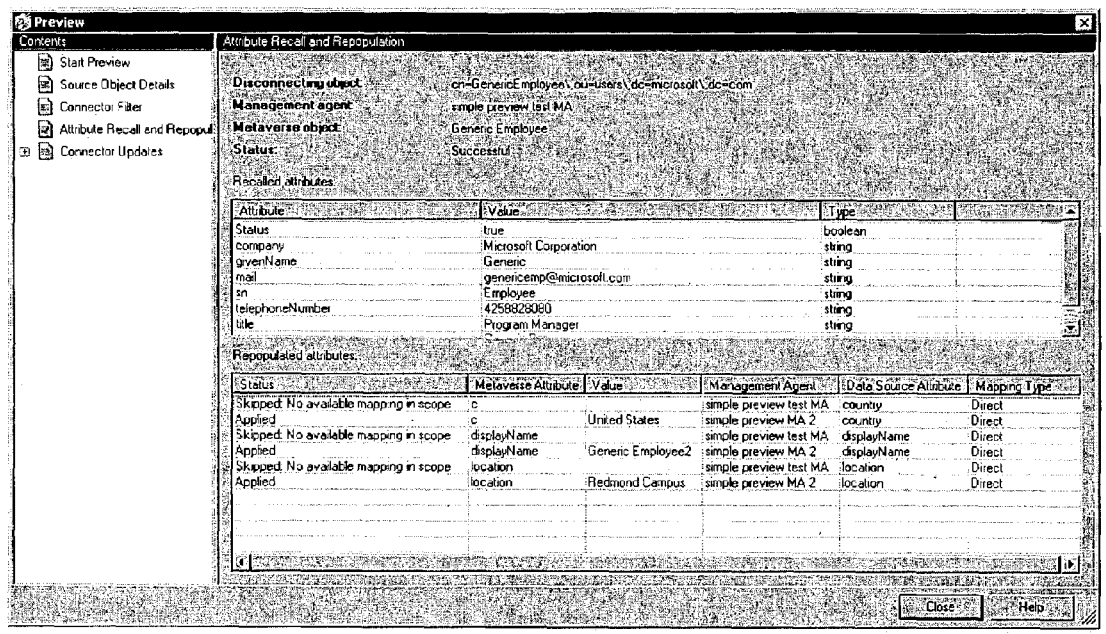
FIG. 15 is an exemplary screen shot generated by an exemplary metadirectory showing a Attribute Recall and Repopulation window.

FIG. 15 shows an exemplary screen shot 1500 generated by an exemplary metadirectory that includes a preview service (e.g., a preview module). The screen shot 1500 further exhibits an exemplary user interface. The exemplary screen shot 1500 includes two tables, wherein each table has one or more rows and one or more columns. A first table is entitled "Recalled attributes" and a second table is entitled "Repopulated attributes". The Recalled attributes table can display information about the attributes that will be recalled from the metaverse object, while the Repopulated attributes table can display information about the attributes that will be repopulated (Import attribute flow from other connected objects) for the metaverse object (e.g., core entity).

The Attribute Recall and Repopulation window also includes a "Disconnecting Object" indicator, which may give a distinguished name (DN) of an object being disconnected. In this example, the DN is "cn=GenericEmployee\, ou=users\,dc=Microsoft\,dc=com". This indicator could be for an object being previewed or another connecter being disconnected from the same metaverse object (e.g., a core entity in a core area) as a result of applying appropriate synchronization rules. The window also includes a "Management agent' indicator, which indicates which management agent is associated with the object being disconnected; a "Metaverse object" indicator, which lists the displayName or GUID of the metaverse object (e.g., of a core entity) that the connector (e.g., linked buffer entity) is being disconnected from; a "Status" indicator that indicates whether this particular synchronization related sub-process was a success or encountered an error. The example window in screen shot 1500 further includes a status column in the Repopulated attributes table that can displays the result of the operation for an attribute. Possible status values include raw and/or "friendly" indicators. A friendly indicator may be based on a raw indicator that can include or relate to semantic information in a language such as XML. In the example screen shot 1500, the friendly indicator is a string that appears in the user interface and the raw indicatory includes values contained in XML.

Exemplary raw and friendly indicators (friendly indicators in parentheses) may include the following:

1. Applied ("Applied"), which indicates that the rule was successfully executed. The attribute flow specified by the rule was successfully performed.

2. Applied-delete ("Applied Delete"), which indicates that the flow was configured as "scripted" and the last source attribute of the flow was deleted. In this case, the destination attribute will be automatically deleted without consulting the script. In this case, source attributes typically have to be deleted.

3. Applied-empty-dest ("Applied Delete"), which indicates that the rule caused the destination attribute to be deleted. This will cause Import Attribute Flow to execute a "repopulation operation" in an attempt to populate the destination attribute, so an <import-flow> element with a status of "applied-empty-dest" will always be followed by a <repopulation-operation> element. Note that a user interface can special-case this particular status and show that the destination attribute was deleted, noting that the <values> element that may hold one or more deltas for the destination attribute may not contain the delete since it may be "overwritten" by a flow during the repopulation operation.

4. Not-satisfied ("Not Applied"), which indicates that the rule was not executed because at least one of the source attributes referenced by the rule did not exist on the buffer entity (e.g., connector space object) or, when executing in a delta mode, either the mapping had no source attribute (such mappings are typically not executed in delta mode) or none of the source attributes had changed. In general, this is not considered an error and the rule may be ignored in this case.

5. skipped-not-precedent ("Skipped: Not Precedent"), which indicates that the rule was not executed because a pre-existing destination attribute on the core entity (e.g., metaverse object) was created by some other rule with a higher precedence. In general, this is not considered an error and the rule may be ignored in this case.

6. script-declined ("Declined"), which indicates that the rule was scripted and the script declined the mapping (elected to allow it to be skipped by throwing an instance of DeclineMappingException). In general, this is not considered an error and the rule may be ignored in this case.

7. skipped-former-populator ("Skipped: previous mapping"), which indicates that the rule was skipped during a repopulation operation because it was the rule that was previously populating the destination attribute and was found to be deficient (causing the repopulation operation to be executed). Here, deficient could mean (i) the rule was being recalled, or (ii) the rule was no longer satisfied or declined to fire, or (iii) the rule just flowed a NULL (delete or empty attribute) to the destination attribute. Note that this status is typically found only on <import-flow> elements within a <repopulation-operation> element.

8. skipped-no-suitable-connector ("Skipped: No available mapping in scope"), which indicates that the rule was skipped during a repopulation operation because none of the destination metaverse object's connectors satisfied the scoping requirements of the rule (i.e., a match did not exist for the rule's source management agent or object type). Note that this status is typically found only on <import-flow> elements within a <repopulation-operation> element.

9. error ("Error"), which indicates that some error occurred that will abort the processing of the Import Attribute Flow rules. If this status value appears, then the <import flow> that it applies to will always be the last one present in the list. This is because even if there were additional import flows, the error condition will prevent them form being processed. Also note that if this status value appears, then the <error> element will also appear in the <import attribute flow> which gives more details as to the particular error.

Other columns of the Repopulated attributes table may include "Metaverse Attribute", which is the attribute on the metaverse object (e.g., an attribute of a core entity) attempting to repopulate; "Value", which is the value which is applied to the metaverse object (e.g., the core entity). This will only appear on for flow rules with status of "Applied"; "Management Agent", which is the management agent associated with the import attribute flow (IAF) rule being evaluated by the repopulation operation; "Data Source Attribute", which is the name of the source attributes for the import attribute flow (IAF) rule being evaluated by the repopulation operation; "Mapping Type" or "Rule Type", which the rule type for the import attribute flow (e.g., Direct, Rules Extension, DN Component, Constant, etc.).

Join

If join rules are configured, and the object being previewed is a disconnector, an exemplary preview service can cause a "Join and Projection" page to appear. The details of the Projection section of the page will be discussed in a subsequent section, further below. A Join page can display all of the Join rules configured for the object type that corresponds to the type of object being previewed. The upper portion of the Join section of the page can display information about the highlighted join rule below.

Figure 16:
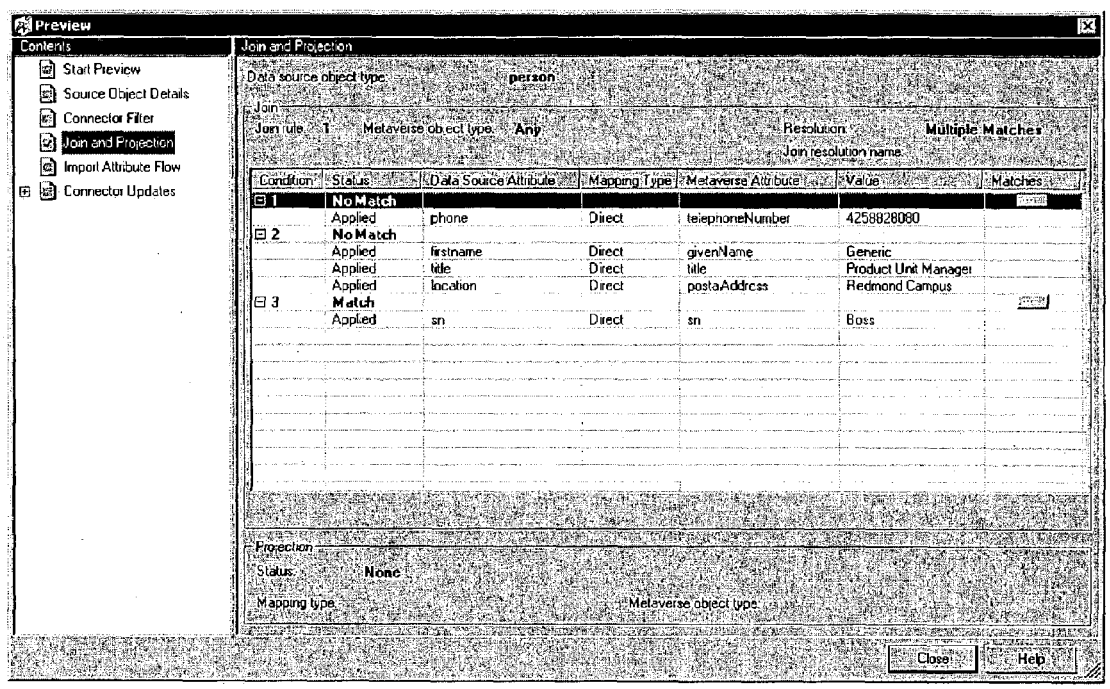
FIG. 16 is an exemplary screen shot generated by an exemplary metadirectory showing a Join and Projection window.

FIG. 16 shows an exemplary screen shot 1600 generated by an exemplary metadirectory that includes a preview service (e.g., a preview module). The screen shot 1600 further exhibits an exemplary user interface. In this example of a Join and Projection page, a scenario is shown wherein multiple join rules were configured and the last one found a unique match (see, e.g., status column of table in screen shot 1600).

The exemplary screen shot 1600 includes indicators such as "Data source object type", which indicates the object type for the object being previewed. Additional indicators about a selected join rule include "Join Rule", which indicates the number of the rule selected; and "Metaverse Object Type", which indicates the scoping of the join rule as defined in, for example, a UI when the rule was created. This could be "Any" or a specific object type such as "Person". The join search will typically be scoped by this value when searching for matching objects in the metaverse (e.g., matching entities in a core area). Other additional indicators include "Join Resolution Name", wherein if a Join Resolution Rules Extension is configured, this indicates the name of the rule; and "Resolution". With respect to Resolution, the following values may appear, optionally with a raw and/or a friendly indicator:

1. found-match ("Match"), which indicates that a single metaverse object (e.g., core entity) was successfully determined. This may occur if there was only a single value in the search results, or if there were multiple values and a resolution script chose a winner.

2. zero-matches ("No Match"), which indicates that the search resulted in no unique matches (i.e. the <search-results> element was empty). Processing will continue on to the next join condition, if any.

3. ambiguous ("Multiple Matches"), which indicates that the search produced multiple matches, but no scripted resolution handler was specified (i.e. resolution type="none"). Processing will continue on to the next join condition, if any.

4. script-no-decision ("Declined"), which indicates that there were one or more matches, and there was a scripted resolution handler, but that the script declined to choose. Processing will continue on to the next join condition, if any.

5. error ("Error"), which indicates a fatal error has occurred that will abort the process of not only the current join condition, but the entire join rule (i.e. subsequent join conditions, if any, will not be processed).

With respect to "Status" indicators in the exemplary table of the screen shot 1600, there are two pieces of information that may be displayed in the Status column: (i) the status of the join rule search and (ii) the status of each condition of the join rule. The value of the "status" attribute for a join rule will typically be one of the following values:

1. "Match", which indicates that the processing of the join condition resulted in a single matching metaverse object (e.g., core entity), wherein, since a suitable match was found, no additional join rules will be processed or displayed in the exemplary user interface.

2. "No Match", which indicates that the join condition failed to produce a match, wherein possibilities include an unsatisfied mapping, a script producing no matching values, and/or an ambiguous result that was not resolved. If there are more join rules then processing will generally continue until a match is found or all of the join rules have been processed.

3. "Error", which indicates that a fatal error has occurred that will cause the rules engine to abort the entire join process.

The value of the "status" attribute for the condition elements may be one of the following values:

1. "Applied", which indicates that the condition was successfully executed and that it has contributed some value(s) to the search condition.

2. "Not Applied", which indicates that a source attribute referenced by the mapping was not present in the connector space object (e.g., a buffer entity). A mapping with this status type will typically abort the processing of the current join rule. Execution of rules will process the next join rule if there is one available.

3. "Declined", which is for scripted mappings, indicates that the script declined to produce values for the search condition. This will typically abort the processing of the current join rule. Execution of rules will typically process the next join rule if there is one available.

4. "Extension No Value", which is for scripted mappings, indicates that the script failed to produce any values for the search condition. This will typically abort the processing of the current join rule. Execution of rules will typically process the next join rule if there is one available.

5. "Error", indicates a fatal error has occurred that will typically abort the process of not only the current join condition, but the entire join sub-process.

A "Matches" column can display a user selectable button if there are any matches for a rule. If there is a single match, clicking on the button will display the corresponding metaverse object (e.g., core entity) properties page. If there are multiple matches, then a "Join Results" window may appear wherein each match has a corresponding indicator (e.g., a GUID, DN, etc.) and the indicator may be selectable to thereby cause a display of the corresponding metaverse object (e.g., core entity).

Projection

If there are Projection rules configured for the object type matching the type of the object being previewed and there were no successful join rules applied, an exemplary preview service can display a Projection portion of a Join and Projection page that contains details of the particular rule. In comparison to join, projection rules are typically less complex; therefore, there is typically not as much information to display. For example, a projection page or projection section of a Join and Project page may include a "Status" indicator that displays the result of evaluating the Projection rule for this object wherein possible values could be: (i) "Projected", which indicates that the rule successfully determined the object type that should be used for the projected metaverse object (note that declarative rules will always have this status value); (ii) "Declined", for the scripted case, which indicates that the script declined to choose an metaverse object type and that the object should not be projected; and (iii) "Error", which indicates a fatal error case.

A Projection page may also display "Mapping Type" or "Rule Type", wherein this indicators displays the type of rule defined for this object type. Possible values include: "Declared" and "Rules Extension". Further, such a page may display a "Metaverse Object Type" indicator that indicates the object type of a newly created metaverse object (e.g., a core entity) based on a Projection rule configuration.

Metaverse Object Type

An exemplary preview service may cause display of a "Metaverse Object Type" change page if an object type of a metaverse object (e.g., core entity) is changed when a connector space object (e.g., buffer entity) is joined to it. This is typically accomplished by a rules extension join rule. During this operation, all of the Import Attribute Flow (IAF) rules for this object are repopulated based on the new object type. The page can display the results of the repopulation operation.

Figure 17:
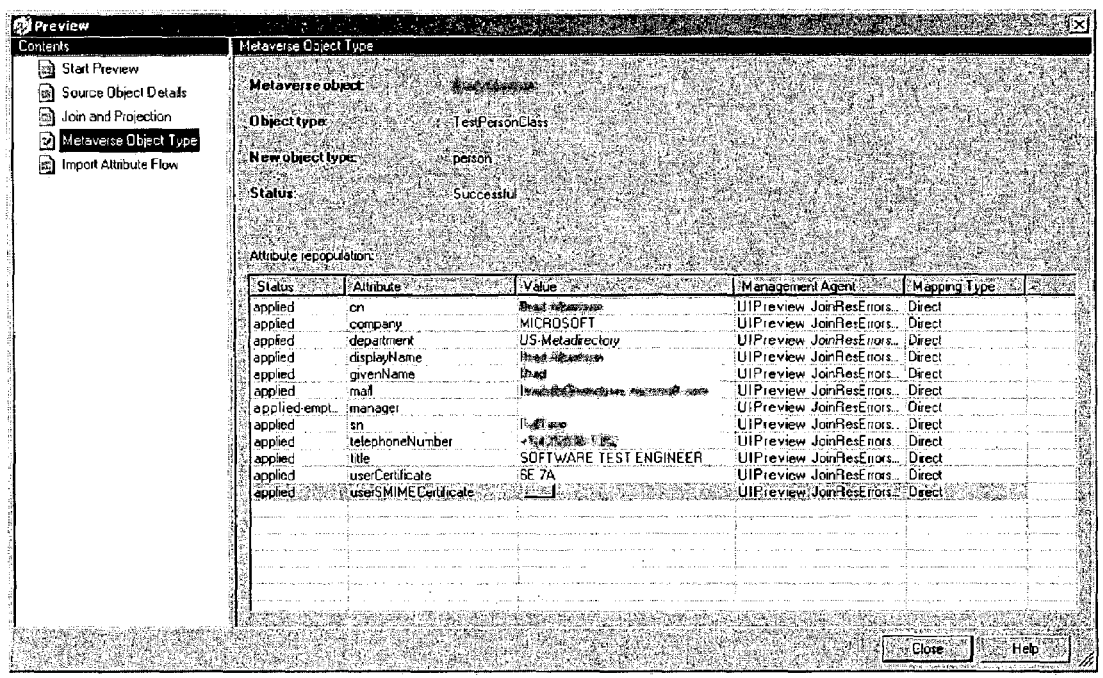
FIG. 17 is an exemplary screen shot generated by an exemplary metadirectory showing a Metaverse Object Type window.

FIG. 17 shows an exemplary screen shot 1700 generated by an exemplary metadirectory that includes a preview service (e.g., a preview module). The screen shot 1700 further exhibits an exemplary user interface. In this example of a "Metaverse Object Type" page, the following indicators may be displayed: "Metaverse Object", which is a display name, distinguished name, GUID, or other identifier of the linked metaverse object (e.g., core entity); "Object Type", which is an original object type of the metaverse object (e.g., core entity); "New Object Type", which indicates the object type of the metaverse object after the change; "Status", which displays the status of the evaluation of this rule, wherein possible values include "Successful" and "Error"; and "Attribute repopulation", which may be a section the page that shows results of a repopulation operation (see, e.g., repopulation described above). The exemplary screen shot 1700 shows columns of an "Attribute repopulation" table that include "Status", "Attribute", "Value", "Management Agent", and "Mapping Type". Of course, other column indicators may be shown as appropriate.

Import Attribute Flow (IAF)

An exemplary preview service can allow for an "Import Attribute Flow" preview page that includes results of applying import attribute flow rules for the object type that matches the object being previewed (again, considering preview of a single object). Such a page may list all of the flow mapping rules that have been defined in an Attribute Flow management agent Property page or other appropriate page. Such a page may include an indicator for mode, for example, import flow mode. In import flow mode, the page may display manners in which rules and synchronization related process are executing on an engine. For example, as already described, a synchronization process may proceed in a Full mode or Delta mode. In general, this mode will usually match the mode of the preview service; however, there may be cases where these will differ, such as, (i) "Reference retry", wherein if the object is in a state where an execution engine has, in a synchronization related process, marked at as requiring reference retry to fix up the reference values; and (ii) "Delta mode on a disconnector", wherein if the object is currently a disconnector, then it will be treated as full mode during the Attribute flow phase since by a definition all attributes may have deltas on them.

In general, any error information is reported in a status bar at the bottom of an Import Attribute Flow page. If an error is related to a Rules Extension, a Stack Trace button may appear to allow for display of additional information about the error.

Figure 18:
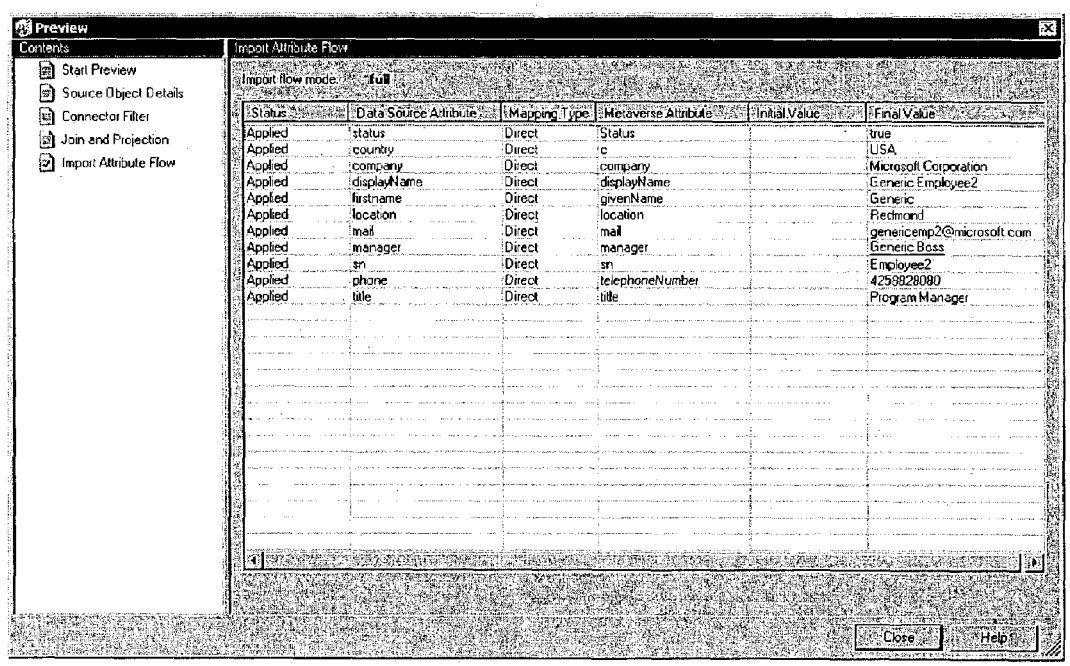
FIG. 18 is an exemplary screen shot generated by an exemplary metadirectory showing an Import Attribute Flow window.

FIG. 18 shows an exemplary screen shot 1800 generated by an exemplary metadirectory that includes a preview service (e.g., a preview module). The screen shot 1800 further exhibits an exemplary user interface. In this example of an Import Attribute Flow page, columns include "Status", "Data Source Attribute", "Mapping Type" or "Rule Type", "Metaverse Attribute", Initial Value" and "Final Value". As described elsewhere, Status may include a friendly and/or a raw indicator. In general, status indicates, for a synchronization process (or sub-process) information pertaining to a specific flow rule. Possible status indicators may include:

1. Applied ("Applied"), which indicates that the rule was successfully executed. The attribute flow specified by the rule was successfully performed.

2. Applied-delete ("Applied Delete"), which indicates that the flow was configured as "scripted" and the last source attribute of the flow was deleted. In this case, the destination attribute will be automatically deleted without consulting the script. Note that the source attributes literally have to be deleted (e.g., it can differ from Export Attribute Flow (EAF) where flow may occur for "nothingness" or simply empty/non-existent attributes).

3. Applied-empty-dest ("Applied Delete"), which indicates that the rule caused the destination attribute to be deleted. This will cause IAF to execute a "repopulation operation" in an attempt to populate the destination attribute, so an <import-flow> element with a status of "applied-empty-dest" will always be followed by a <repopulation-operation> element. Note that a user interface should special-case this status and show that the destination attribute was deleted. For example, the <values> element that normally holds one or more deltas for the destination attribute may not contain the delete since it may be "overwritten" by a flow during the repopulation operation.

4. Not-satisfied ("Not Applied"), which indicates that the rule was not executed because at least one of the source attributes referenced by the rule did not exist on the connector space object (e.g., buffer entity) or, when executing in a delta mode, either the mapping had no source attribute (such mappings are typically not executed in delta mode) or none of the source attributes had changed. In general, this is not considered an error and the rule may be ignored in this case.

5. skipped-not-precedent ("Skipped: Not Precedent"), which indicates that the rule was not executed because a pre-existing destination attribute on the MV object was created by some other rule with a higher precedence. In general, this is not considered an error and the rule may be ignored in this case.

6. script-declined ("Declined"), which indicates that the rule was scripted and the script declined the mapping (elected to allow it to be skipped by throwing an instance of DeclineMappingException). In general, this is not considered an error and the rule may be ignored in this case.

7. skipped-former-populator ("Skipped: previous mapping"), which indicates that the rule was skipped during a repopulation operation because it was the rule that was previously populating the destination attribute and was found to be deficient (causing the repopulation operation to be executed). Here, deficient could mean (1) the rule was being recalled, or (2) the rule was no longer satisfied or declined to fire, or (3) the rule just flowed a NULL (delete or empty attribute) to the destination attribute. Note that this status will typically be found on <import-flow> elements within a <repopulation-operation> element.

8. skipped-no-suitable-connector ("Skipped: No available mapping in scope"), which indicates that the rule was skipped during a repopulation operation because none of the destination metaverse object's (e.g., core entity's) connectors (linked buffer entities) satisfied the scoping requirements of the rule (i.e., a match did not occur for the rule's source management agent and/or object type). Note that this status will only be found on <import-flow> elements within a <repopulation-operation> element.

9. error ("Error"), which indicates that some error occurred that will abort the processing of the IAF rules. If this status value appears, then the <import flow> that it applies to will always be the last one present in the list. This is because even if there were additional import flows, the error condition will prevent them form being processed. Also not that if this status value appears, then the <error> element will also appear in the <import attribute flow> which gives more details as to the nature of the error.

An exemplary Import Attribute Flow screen may also display indicators such as "Data Source Attribute", which is the name of attribute(s) in the connector space (e.g., attribute name(s) of entities in buffer space) that are the source for this flow rule; "Mapping Type" or "Rule Type", which is the type of attribute flow rule, wherein possible values include (i) Declared, (ii) Rules Extension, (iii) Constant, and (iv) DN Component; "Metaverse Attribute", which is the name of the metaverse attribute that is the destination for this flow rule; "Initial Value", which is the value of the metaverse attribute before any changes are synchronized; "Final Value", which is the value of the metaverse attribute after any changes are synchronized. In the case of direct mappings, this will match the value in the connector space (e.g., buffer area). In scripted mappings this could be determined based on multiple connector space values (e.g., values in various buffer entities).

Provisioning Summary

An exemplary preview service can provide for a Provisioning Summary page that may be displayed each time a provisioning rules extension is invoked. In general, it is possible for a provisioning rules extension to be called multiple times in a given synchronization cycle. Such a page may display a summary line for each action taken by a provisioning rules extension.

Figure 19:
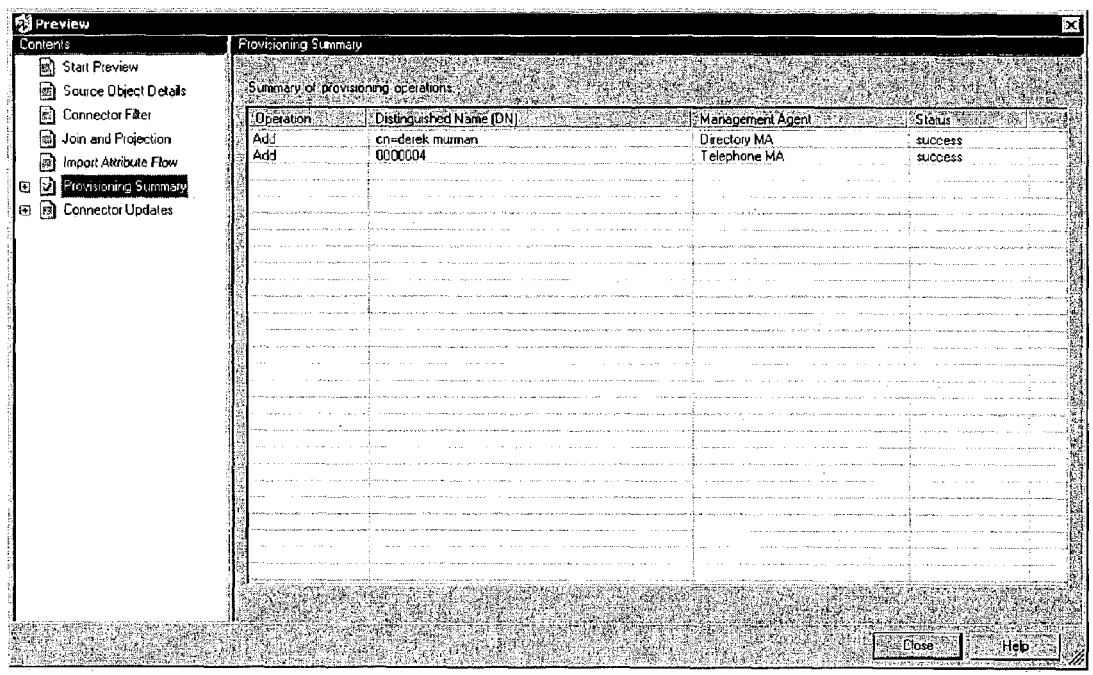
FIG. 19 is an exemplary screen shot generated by an exemplary metadirectory showing a Provisioning Summary window.

FIG. 19 shows an exemplary screen shot 1900 generated by an exemplary metadirectory that includes a preview service (e.g., a preview module). The screen shot 1900 further exhibits an exemplary user interface. In this example of a Provisioning Summary screen, information is displayed in a table that includes columns entitled "Operation", "Distinguished Name (DN)", "Management Agent" and "Status". With respect to these indicators, "Operation" indicates the provisioning operation performed by the rules extension during this invocation wherein possible values include "Add", "Rename" and "Deprovision"; "Distinguished Name (DN)" indicates the DN or Anchor value of the connector space object (e.g., buffer entity) for this provisioning action; "Management Agent" indicates the management agent associated with the object; and "Status" indicates a status of the operation wherein possible values include: "Success" and "Error".

An exemplary preview service may also display a Connector Provisioning Operation Details pages, for example, when a provisioning process is performed and listed in a Provisioning Summary page, an exemplary service can generate a corresponding details page for the process.

Connector Add

Figure 20:
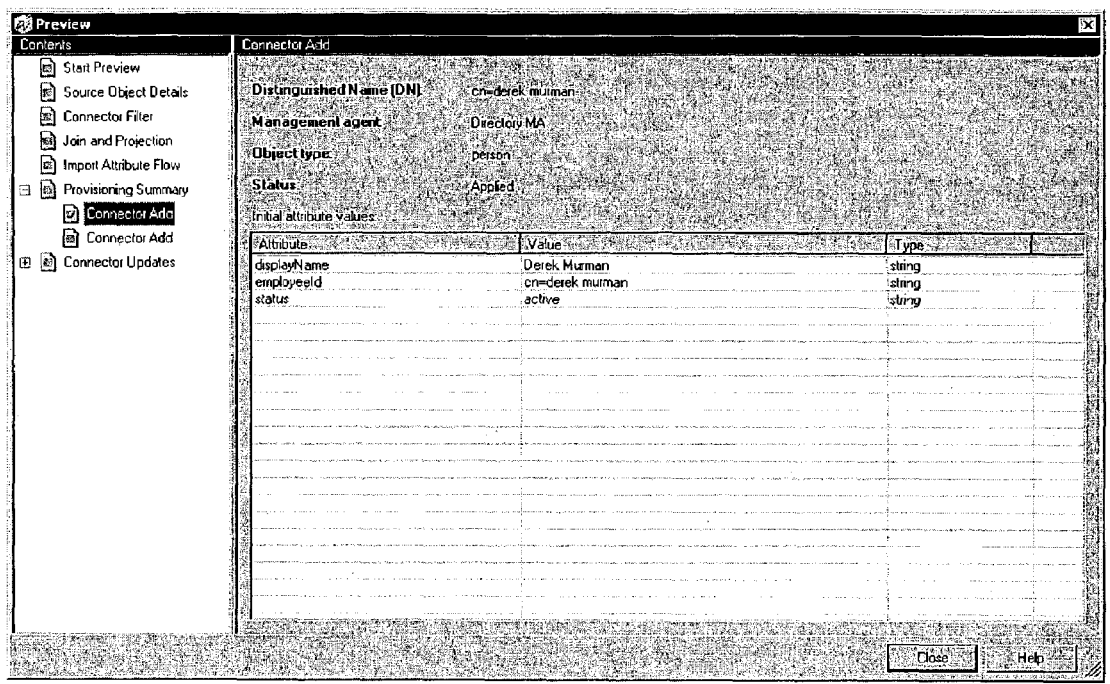
FIG. 20 is an exemplary screen shot generated by an exemplary metadirectory showing a Connector Add window.

An exemplary preview service can provide for a Connector Add page. FIG. 20 shows an exemplary screen shot 2000 generated by an exemplary metadirectory that includes a preview service (e.g., a preview module). The screen shot 2000 further exhibits an exemplary user interface. In this example of a Connector Add screen, indicators include "Distinguished Name (DN)", which is the DN of the connector space object (e.g., buffer entity) being added by the provisioning rules extension; "Management Agent" which indicates the management agent associated with the connector being added; "Object type", which is the object type of the connector being added by provisioning; "Status", which indicates a result(s) of evaluating this rule wherein possible values include "Applied" (e.g., the object was successfully added), "Failed: Duplicate Object" (e.g., the object could not be added as there was already another object in this connector space for the requested DN), "Failed: Filter Rejection" (e.g., the object could not be added as the new DN would be filtered out by exclusion and inclusion filters), "Failed: No Parent" (e.g., the object could not be added as the new DN's parent did not exist), and "Error" (e.g., the object could not be added as the target management agent was being deleted); and "Attributes", which during a provisioning process "add" operation, initial attribute values may be set.

Connector Rename

Figure 21:
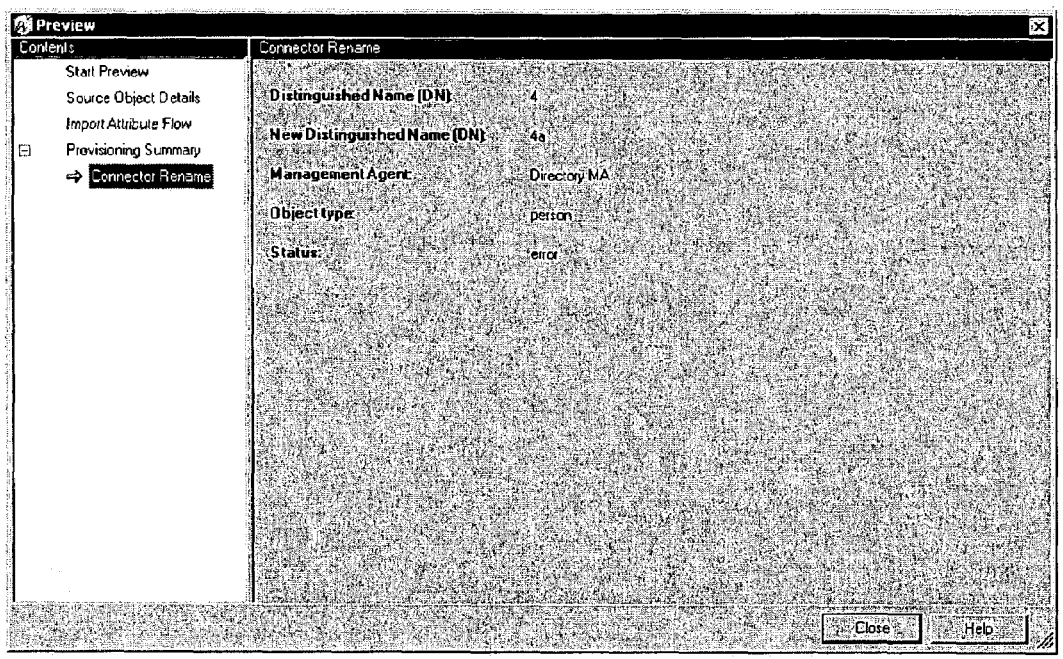
FIG. 21 is an exemplary screen shot generated by an exemplary metadirectory showing a Connector Rename window.

An exemplary preview service can provide for a Connector Rename page. FIG. 21 shows an exemplary screen shot 2100 generated by an exemplary metadirectory that includes a preview service (e.g., a preview module). The screen shot 2100 further exhibits an exemplary user interface. In this example of a Connector Rename screen, the following indicators are displayed: "Distinguished Name (DN)", which indicates the original DN of the connector space object being renamed by the provisioning rules extension; "New Distinguished Name (DN)", which indicates the new DN of the connector space object being renamed by the provisioning rules extension; "Management Agent", which indicates the management agent associated with the connector being renamed; "Object type:, which indicates the object type of the connector being renamed by provisioning; and "Status", which indicates a result(s) of evaluating this rule. Possible values for Status include:

1. "Applied", the object was successfully renamed.

2. "Unchanged", the rename operation was effectively ignored because the new DN matches the old DN. Note that, in general, the DN property on a connector space entry (e.g., a buffer entity) is case-insensitive, meaning if the DN were already "cn=foo" and it was set to "cn=FOO", the rename would be ignored and the status would be "no-change".

3. "Failed: Duplicate Object", the object could not be renamed as there was already another object in this connector space at the requested new DN.

4. "Failed: Filter Rejection", the object could not be renamed as the new DN would be filtered out by exclusion and inclusion filters.

5. "Failed: No Parent", the object could not be renamed as the new DN's parent did not exist.

6. "Error", the object could not be renamed as the target management agent was being deleted.

Connector Deprovisioned

Figure 22:
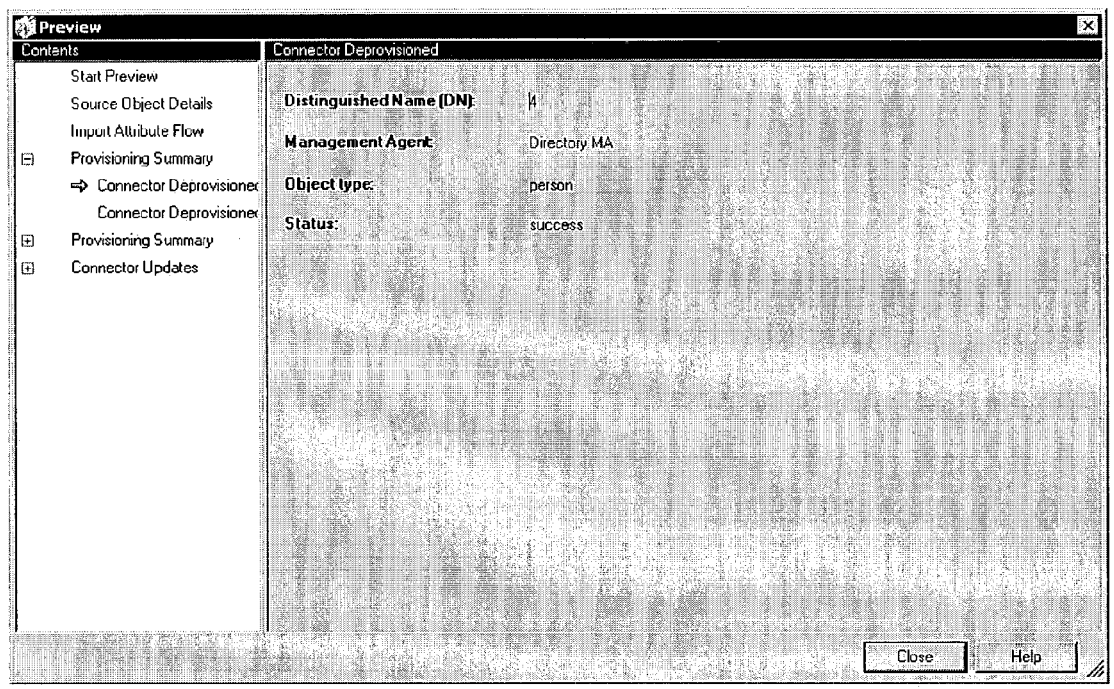
FIG. 22 is an exemplary screen shot generated by an exemplary metadirectory showing a Connector Deprovisioned window.

An exemplary preview service can provide for a Connector Deprovisioned page. FIG. 22 shows an exemplary screen shot 2200 generated by an exemplary metadirectory that includes a preview service (e.g., a preview module). The screen shot 2200 further exhibits an exemplary user interface. In this example of a Connector Deprovisioned screen, the following indicators are displayed: "Distinguished Name (DN)", which indicates the original DN of the connector space object being deprovisioned by the provisioning rules extension; "Management Agent", which indicates the management agent associated with the connector being deprovisioned; "Object type", which indicates the object type of the connector being deprovisioned by provisioning; and "Status" which indicates a result(s) of evaluating this rule. Possible Status values include: (i) "Applied", the object was successfully disconnected from the metaverse and deprovisioning rules will be consulted; (ii) "Failed: Already Deprovisioned", the object could not be disconnected as it already has been disconnected; and (iii) "Error", a fatal error occurred during this process.

Connector Summary

Figure 23:
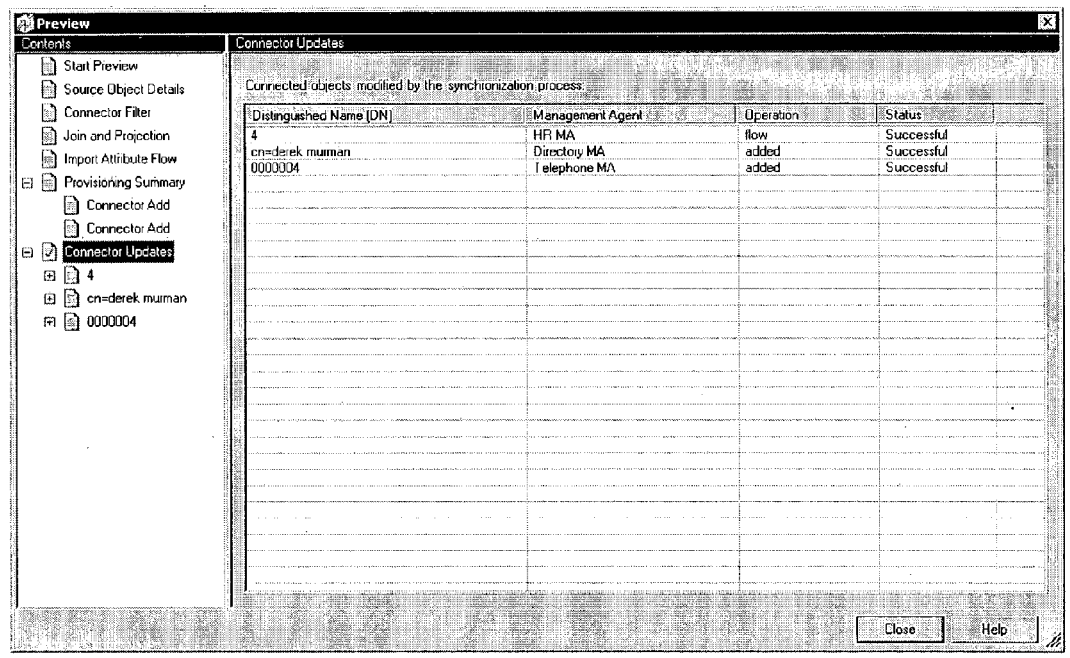
FIG. 23 is an exemplary screen shot generated by an exemplary metadirectory showing a Connector Updates window.

An exemplary preview service can provide for a Connector Summary page. A Connector Summary page may appear whenever there are any outbound synchronization operations as a result of processing this object. Similar to the Provisioning Summary page, the Connector Summary page will typically contain a line for each connector operation. FIG. 23 shows an exemplary screen shot 2300 generated by an exemplary metadirectory that includes a preview service (e.g., a preview module). The screen shot 2300 further exhibits an exemplary user interface. In this example of a Connector Summary screen, indicators include: "Distinguished Name (DN)", which indicates the DN or anchor value of the connector space object; "Management Agent", which indicates the management agent associated with the connector space object; "Operation", which indicates the operation that was performed on this connector space object; "Status", which indicates the status of the operation wherein possible values include "Successful" and "Error".

Export Attribute Flow (EAF)

Figure 24:
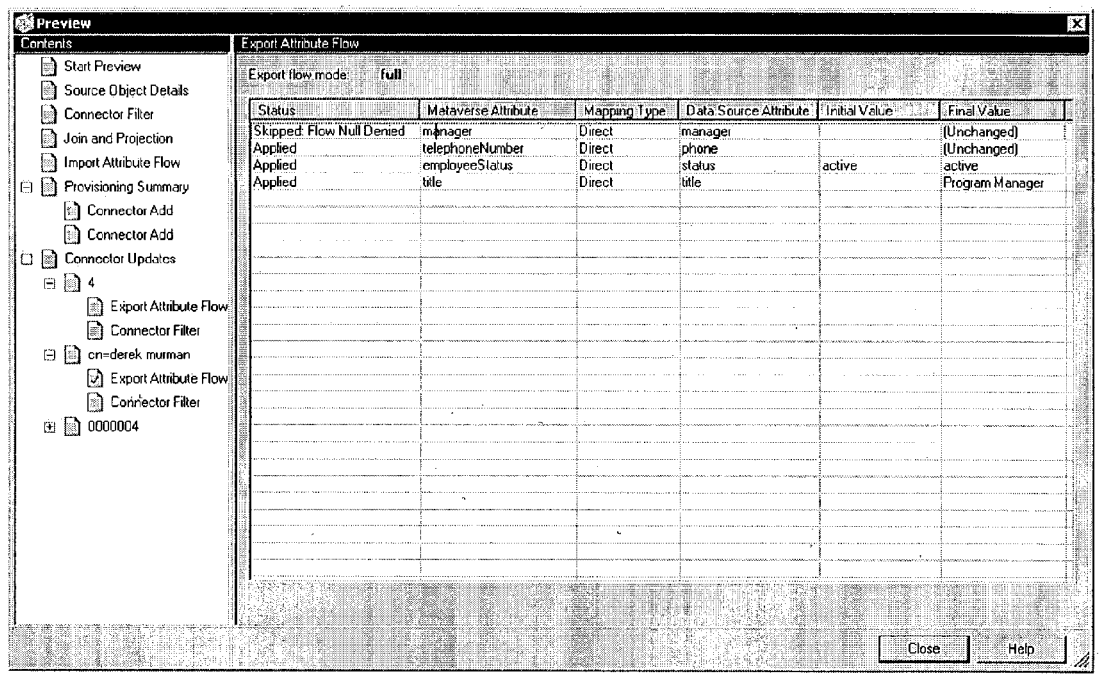
FIG. 24 is an exemplary screen shot generated by an exemplary metadirectory showing an Export Attribute Flow window.

An exemplary preview service can provide for an Export Attribute Flow page. For example, if there is Export Attribute Flow for a connector during the synchronization process, an exemplary preview service may provide a screen having such an Export Attribute Flow page. FIG. 24 shows an exemplary screen shot 2400 generated by an exemplary metadirectory that includes a preview service (e.g., a preview module). The screen shot 2400 further exhibits an exemplary user interface. In this example of an Export Attribute Flow page, indicators include "Status", "Metaverse Attribute", "Mapping Type" or "Rule Type", "Data Source Attribute", "Initial Value", and "Final Value".

The indicator Metaverse Attribute indicates the name of the metaverse attribute that is the destination for this flow rule; Mapping Type indicates the type of attribute flow rule wherein possible values include "Declared", "Rules Extension" and "Constant"; Data Source Attribute indicates the name of attribute(s) in the connector space (e.g., buffer area) that are the source for this flow rule; Initial Value indicates the value of the connector space attribute before any changes are synchronized; Final Value indicates the value of the connector space attribute after any changes are synchronized. In the case of direct mappings, this will match the value in the connector space. In scripted mappings this could be calculated based on multiple metaverse attributes.

With respect to Status, the following raw and/or friendly information may be displayable:

1. Applied ("Applied"), the flow was applied successfully.

2. Applied-delete ("Applied Delete"), this value indicates that the source object contained none of a rule's source attributes and so a delete was automatically flowed to the destination attribute. This is considered a successful flow.

3. not-satisfied ("Not Applied"), the flow was not applied.

4. skipped-suppressed-deletion ("Skipped: Flow Null Denied"), this value indicates that an attribute deletion was detected in the metaverse object (e.g., core entity) but that it was not pushed out to the connector space object (e.g., buffer entity) because it was suppressed. The default setting is to suppress all attribute deletions.

5. skipped-not-precedent ("Skipped: Not Precedent"), this value indicates that an metaverse attribute value (e.g., an attribute value of a core entity) was not pushed out to the connector space object (e.g., a buffer entity) because an "overlapping" IAF flow rule exists for the management agent with a precedence that is higher than that associated with the metaverse change (e.g., core area).

6. skipped-no-reference-source-attributes ("Skipped: No Reference Source Attributes"), this value indicates that a flow was not executed because none of the source metaverse attributes were reference attributes. This will only occur when executing a reference synchronization process.

7. script-declined ("Declined"), indicates that Rules extension defined for this flow declined to return a value.

8. error ("Error").

Connector Deprovisioning

Figure 25:
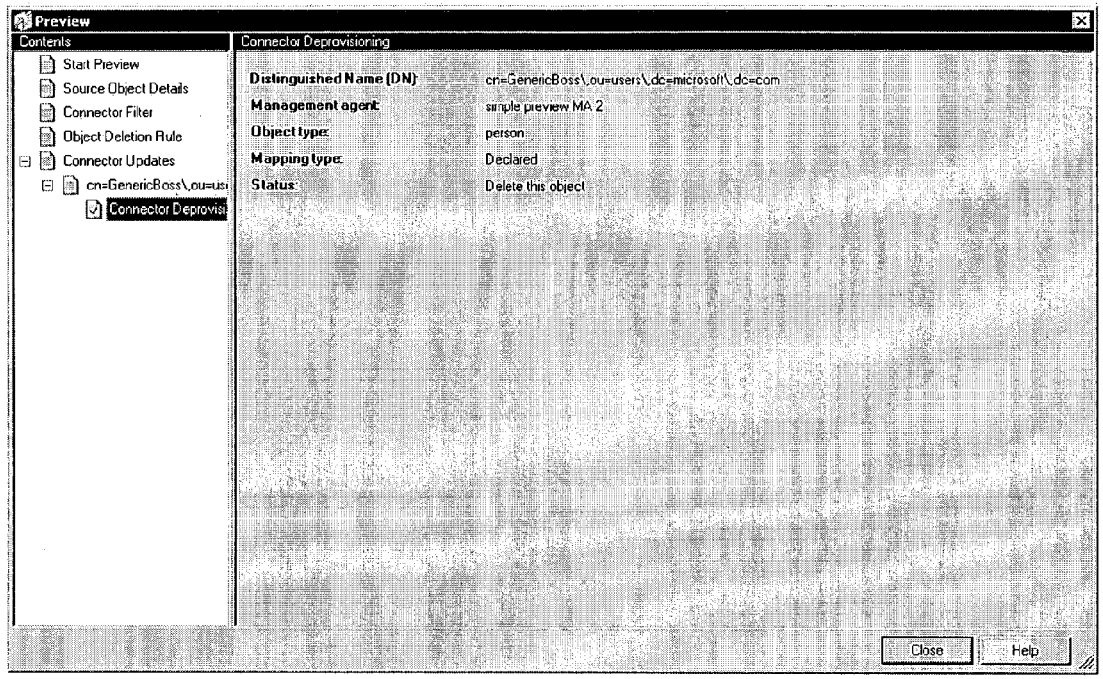
FIG. 25 is an exemplary screen shot generated by an exemplary metadirectory showing a Connector Deprovisioning window.

An exemplary preview service can provide for a Connector Deprovisioning page. A Connector Deprovisioning page may appear when a connector is disconnected from the metaverse (e.g., core area) either because the metaverse object (e.g., core entity) was deleted or because provisioning rules deprovisioned the object (e.g., entity). FIG. 25 shows an exemplary screen shot 2500 generated by an exemplary metadirectory that includes a preview service (e.g., a preview module). The screen shot 2500 further exhibits an exemplary user interface. In this example of a Connector Deprovisioning screen, indicators include: "Distinguished Name (DN)", which indicates the DN or anchor value of the connector space object; "Management Agent", which indicates the management agent associated with the connector space object; "Object type", which indicates the object type of the connector space object; "Mapping Type" or "Rule type", which indicates the type of rule wherein possible values include "Declared" and "Rules Extension"; and "Status", which indicates status of an operation wherein possible values include "Make this object a disconnector" (e.g., indicates that the object should be made a normal disconnector), "Make this object an explicit disconnector" (e.g., indicates the object should be made an explicit disconnector, which means it will not be considered for join or projection on the next Import or Synchronization run), "Delete this object" (e.g., indicates the object should be deleted), and "Error" (e.g., indicates an error). In addition, an Attributes indicator may appear if the rule is defined in a rule extension wherein it has an option to set attribute values on the object that will be exported once.

With respect to various error types mentioned in some of the examples, the "type" attribute of an <error> element can indicate a type of failure.

Some Examples of Some Semantic Information

Various exemplary screen shots and/or user interfaces optionally rely, to at least some degree, on emitted semantic information (see, e.g., emitted semantic information 770 of FIG. 7). In some instances, an exemplary user interface may be generated and/or driven by semantic information emitted during execution of one or more processes (see, e.g., various processes of the exemplary method 900 of FIG. 9). For example, an exemplary preview service module may (e.g., upon execution) use emitted semantic information to generate and/or drive a user interface. As mentioned, in various scenarios, some semantic information may be emitted in XML, or otherwise translated and/or formatted thereto. Some examples of some semantic information in XML are presented below. In these examples, the semantic information generally relates to processes involving some rules and/or various core and buffer entities. Again, while examples presented below use XML, semantic information may exist in any of a variety of forms. In addition, various abbreviations are used in the examples (e.g., "mv" for metaverse or core area and "cs" for connector space or buffer area) and may be generally understood with reference to various exemplary screen shots and/or other descriptions provided herein. Examples A, B, C, D and E appear below:

Example A

```
<preview>
    <cs-object cs-dn="cn=GenericEmployee\,ou=users\,dc=microsoft\,dc=com" id="{B7876FBE-CC99-4757-BBE8-698FA3261307}" object-type="person">
        <unapplied-export>
            <delta operation="none" dn="cn=GenericEmployee\,ou=users\,dc=microsoft\,dc=com">
                <anchor encoding="base64">YAAAAGMAbgA9AEcAZQBuAGUAcgBpAGMARQBtAHAAbABvAHkAZQBlACwAbwB1AD0AdQBzAGUAcgBzACwAZABjAD0AbQBpAGMAcgBvAHMAbwBmAHQALABkAGMAPQBjAG8AbQAAAA==</anchor>
            </delta>
        </unapplied-export>
        <escrowed-export>
```

```
        <delta operation="none"
dn="cn=GenericEmployee\,ou=users\,dc=microsoft\,dc=com">
            <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
        </delta>
    </escrowed-export>
    <unconfirmed-export>
        <delta operation="none"
dn="cn=GenericEmployee\,ou=users\,dc=microsoft\,dc=com">
            <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
        </delta>
    </unconfirmed-export>
    <pending-import>
        <delta operation="update"
dn="cn=GenericEmployee\,ou=users\,dc=microsoft\,dc=com">
```

```xml
<anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
    <attr name="status" operation="update" type="boolean" multivalued="false">
        <value operation="add">false</value>
        <value operation="delete">true</value>
    </attr>
</delta>
</pending-import>
<synchronized-hologram>
    <entry dn="cn=GenericEmployee\,ou=users\,dc=microsoft\,dc=com">
        <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
        <primary-objectclass>person</primary-objectclass>
        <objectclass>
            <oc-value>person</oc-value>
```

```xml
</objectclass>
<dn-attr name="manager" multivalued="false">
  <dn-value>
    <dn>cn=GenericBoss\,ou=users\,dc=microsoft\,dc=com</dn>
    <anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
  </dn-value>
</dn-attr>
<attr name="company" type="string" multivalued="false">
  <value>Microsoft Corporation</value>
</attr>
<attr name="country" type="string" multivalued="false">
  <value>USA</value>
</attr>
<attr name="displayName" type="string" multivalued="false">
  <value>Generic Employee</value>
</attr>
<attr name="dn" type="string" multivalued="false">
  <value>cn=GenericEmployee,ou=users,dc=microsoft,dc=com</value>
</attr>
```

```xml
<attr name="employeeID" type="integer" multivalued="false">
 <value>0x1</value>
</attr>

<attr name="firstname" type="string" multivalued="false">
 <value>Generic</value>
</attr>

<attr name="location" type="string" multivalued="false">
 <value>Redmond</value>
</attr>

<attr name="mail" type="string" multivalued="false">
 <value>genericemp@microsoft.com</value>
</attr>

<attr name="phone" type="string" multivalued="false">
 <value>4258828080</value>
</attr>

<attr name="sn" type="string" multivalued="false">
 <value>Employee</value>
</attr>

<attr name="status" type="boolean" multivalued="false">
 <value>true</value>
</attr>

<attr name="title" type="string" multivalued="false">
```

```xml
            <value>Program Manager</value>
          </attr>
        </entry>
      </synchronized-hologram>
      <unapplied-export-hologram>
        <entry dn="cn=GenericEmployee\,ou=users\,dc=microsoft\,dc=com">
          <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
          <primary-objectclass>person</primary-objectclass>
          <objectclass>
            <oc-value>person</oc-value>
          </objectclass>
          <dn-attr name="manager" multivalued="false">
            <dn-value>
              <dn>cn=GenericBoss\,ou=users\,dc=microsoft\,dc=com</dn>
              <anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
```

```xml
</dn-value>

</dn-attr>

<attr name="company" type="string" multivalued="false">

<value>Microsoft Corporation</value>

</attr>

<attr name="country" type="string" multivalued="false">

<value>USA</value>

</attr>

<attr name="displayName" type="string" multivalued="false">

<value>Generic Employee</value>

</attr>

<attr name="dn" type="string" multivalued="false">

<value>cn=GenericEmployee,ou=users,dc=microsoft,dc=com</value>

</attr>

<attr name="employeeID" type="integer" multivalued="false">

<value>0x1</value>

</attr>

<attr name="firstname" type="string" multivalued="false">

<value>Generic</value>

</attr>

<attr name="location" type="string" multivalued="false">

<value>Redmond</value>
```

```
</attr>

<attr name="mail" type="string" multivalued="false">

<value>genericemp@microsoft.com</value>

</attr>

<attr name="phone" type="string" multivalued="false">

<value>4258828080</value>

</attr>

<attr name="sn" type="string" multivalued="false">

<value>Employee</value>

</attr>

<attr name="status" type="boolean" multivalued="false">

<value>false</value>

</attr>

<attr name="title" type="string" multivalued="false">

<value>Program Manager</value>

</attr>

</entry>

</unapplied-export-hologram>

<escrowed-export-hologram>

<entry dn="cn=GenericEmployee\,ou=users\,dc=microsoft\,dc=com">

<anchor
encoding="base64">YAAAAGMAbgA9AEcAZQBuAGUAcgBpAGMARQBtA
```

HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>

\<primary-objectclass>person</primary-objectclass>

\<objectclass>

\<oc-value>person</oc-value>

</objectclass>

\<dn-attr name="manager" multivalued="false">

\<dn-value>

\<dn>cn=GenericBoss\,ou=users\,dc=microsoft\,dc=com</dn>

\<anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjBjAHIAb
wBzAG8AZgB0ACwAZABjAD0AYwBvAGOAAAA=</anchor>

</dn-value>

</dn-attr>

\<attr name="company" type="string" multivalued="false">

\<value>Microsoft Corporation</value>

</attr>

\<attr name="country" type="string" multivalued="false">

\<value>USA</value>

</attr>

```xml
<attr name="displayName" type="string" multivalued="false">
 <value>Generic Employee</value>
</attr>

<attr name="dn" type="string" multivalued="false">
 <value>cn=GenericEmployee,ou=users,dc=microsoft,dc=com</value>
</attr>

<attr name="employeeID" type="integer" multivalued="false">
 <value>0x1</value>
</attr>

<attr name="firstname" type="string" multivalued="false">
 <value>Generic</value>
</attr>

<attr name="location" type="string" multivalued="false">
 <value>Redmond</value>
</attr>

<attr name="mail" type="string" multivalued="false">
 <value>genericemp@microsoft.com</value>
</attr>

<attr name="phone" type="string" multivalued="false">
 <value>4258828080</value>
</attr>

<attr name="sn" type="string" multivalued="false">
```

```xml
    <value>Employee</value>

</attr>

<attr name="status" type="boolean" multivalued="false">

<value>false</value>

</attr>

<attr name="title" type="string" multivalued="false">

<value>Program Manager</value>

</attr>

</entry>
</escrowed-export-hologram>

<unconfirmed-export-hologram>

<entry dn="cn=GenericEmployee\,ou=users\,dc=microsoft\,dc=com">

<anchor encoding="base64">YAAAAGMAbgA9AEcAZQBuAGUAcgBpAGMARQBtA HAAbABvAHkAZQBlACwAbwB1AD0AdQBzAGUAcgBzACwAZABjAD0Ab QBpAGMAcgBvAHMAbwBmmAHQALABkAGMAPQBjAG8AbQAAAA==</anchor>

<primary-objectclass>person</primary-objectclass>

<objectclass>

<oc-value>person</oc-value>

</objectclass>

<dn-attr name="manager" multivalued="false">
```

```xml
<dn-value>
<dn>cn=GenericBoss\,ou=users\,dc=microsoft\,dc=com</dn>
<anchor encoding="base64">WAAAAGMAbgA9AEcAZQBuAGUAcgBpAGMAQgBvAHMAcwAsAG8AdQA9AHUAcwBlAHIAcwAsAGQAYwA9AG0AaQBjAHIAbwBzAG8AZgB0ACwAZABjAD0AYwBvAG0AAAA=</anchor>
</dn-value>
</dn-attr>
<attr name="company" type="string" multivalued="false">
 <value>Microsoft Corporation</value>
</attr>
<attr name="country" type="string" multivalued="false">
 <value>USA</value>
</attr>
<attr name="displayName" type="string" multivalued="false">
 <value>Generic Employee</value>
</attr>
<attr name="dn" type="string" multivalued="false">
 <value>cn=GenericEmployee,ou=users,dc=microsoft,dc=com</value>
</attr>
<attr name="employeeID" type="integer" multivalued="false">
 <value>0x1</value>
```

```
</attr>

<attr name="firstname" type="string" multivalued="false">

<value>Generic</value>

</attr>

<attr name="location" type="string" multivalued="false">

<value>Redmond</value>

</attr>

<attr name="mail" type="string" multivalued="false">

<value>genericemp@microsoft.com</value>

</attr>

<attr name="phone" type="string" multivalued="false">

<value>4258828080</value>

</attr>

<attr name="sn" type="string" multivalued="false">

<value>Employee</value>

</attr>

<attr name="status" type="boolean" multivalued="false">

<value>false</value>

</attr>

<attr name="title" type="string" multivalued="false">

<value>Program Manager</value>

</attr>
```

```
</entry>

</unconfirmed-export-hologram>

<pending-import-hologram>

<entry dn="cn=GenericEmployee\,ou=users\,dc=microsoft\,dc=com">

<anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>

<primary-objectclass>person</primary-objectclass>

<objectclass>

<oc-value>person</oc-value>

</objectclass>

<dn-attr name="manager" multivalued="false">

<dn-value>

<dn>cn=GenericBoss\,ou=users\,dc=microsoft\,dc=com</dn>

<anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>

</dn-value>

</dn-attr>
```

```xml
<attr name="company" type="string" multivalued="false">
  <value>Microsoft Corporation</value>
</attr>

<attr name="country" type="string" multivalued="false">
  <value>USA</value>
</attr>

<attr name="displayName" type="string" multivalued="false">
  <value>Generic Employee</value>
</attr>

<attr name="dn" type="string" multivalued="false">
  <value>cn=GenericEmployee,ou=users,dc=microsoft,dc=com</value>
</attr>

<attr name="employeeID" type="integer" multivalued="false">
  <value>0x1</value>
</attr>

<attr name="firstname" type="string" multivalued="false">
  <value>Generic</value>
</attr>

<attr name="location" type="string" multivalued="false">
  <value>Redmond</value>
</attr>

<attr name="mail" type="string" multivalued="false">
```

```
<value>genericemp@microsoft.com</value>

</attr>

<attr name="phone" type="string" multivalued="false">

<value>4258828080</value>

</attr>

<attr name="sn" type="string" multivalued="false">

<value>Employee</value>

</attr>

<attr name="status" type="boolean" multivalued="false">

<value>false</value>

</attr>

<attr name="title" type="string" multivalued="false">

<value>Program Manager</value>

</attr>

</entry>

</pending-import-hologram>

<connector>1</connector>

<connector-state>normal</connector-state>

<seen-by-import>1</seen-by-import>

<need-cd-full-import>0</need-cd-full-import>

<placeholder-parent>0</placeholder-parent>

<placeholder-link>0</placeholder-link>
```

```
<placeholder-delete>0</placeholder-delete>

<pending>1</pending>

<ref-retry>0</ref-retry>

<rename-retry>0</rename-retry>

<sequencers>

<current>

<batch-number>0</batch-number>

<sequence-number>0</sequence-number>

</current>

<unapplied>

<batch-number>0</batch-number>

<sequence-number>0</sequence-number>

</unapplied>

<original>

<batch-number>0</batch-number>

<sequence-number>0</sequence-number>

</original>

</sequencers>

<pending-ref-delete>0</pending-ref-delete>

<ma-id>{63B73C90-54C9-4F29-8174-CBB2C997D236}</ma-id>

<ma-name>simple preview test MA</ma-name>
```

```xml
<partition-id>{250757F7-A4DB-418D-A7F3-3E471E711351}</partition-id>
<mv-link lineage-id="{B48427B0-496E-4D05-81A3-D9CC311DDFFC}" lineage-type="projection-rules" lineage-time="200X-0X-0X 00:54:14.367">{B9D93FDC-B3B0-4ACE-AEAC-E023AB278C44}</mv-link>
<last-import-delta-time>200X-0X-0X 01:17:19.720</last-import-delta-time>
</cs-object>
<stay-disconnector-rules>
<stay-disconnector type="import" has-error="false">
<filter-set type="declared" status="satisfied">
<filter-alternative status="not-satisfied">
<condition cd-attribute="employeeID" intrinsic-attribute="false" operator="not-present" status="false">
<value/>
</condition>

</filter-alternative>
<filter-alternative status="not-satisfied">
<condition cd-attribute="employeeID" intrinsic-attribute="false" operator="not-present" status="false">
<value/>
```

```xml
</condition>

</filter-alternative>

<filter-alternative status="satisfied">

<condition cd-attribute="status" intrinsic-attribute="false" operator="equality" status="true">

<value>false</value>

</condition>

</filter-alternative>

</filter-set>
   </stay-disconnector>
  </stay-disconnector-rules>
  <cs-operation>disconnected</cs-operation>
  <mv>
   <mv-object id="{B9D93FDC-B3B0-4ACE-AEAC-E023AB278C44}">
    <cs-mv-links>
     <cs-mv-value lineage-id="{F4A7C3D6-87C9-459E-88FA-FA00357A0A16}" lineage-type="join-rules" lineage-time="200X-0X-0X 00:54:20.823">
```

```xml
<cs-dn>cn=GenericEmployee\,ou=users\,dc=microsoft\,dc=com</cs-dn>
<cs-guid>{B4500EE1-B273-4D4C-925F-32B7A3A109AF}</cs-guid>
<ma-name>simple preview MA 2</ma-name>
<ma-guid>{EE5A9216-2984-4B18-A8E0-8B95E5B5F7D8}</ma-guid>
</cs-mv-value>
<cs-mv-value lineage-id="{B48427B0-496E-4D05-81A3-D9CC311DDFFC}" lineage-type="projection-rules" lineage-time="200X-0X-0X 00:54:14.367">
<cs-dn>cn=GenericEmployee\,ou=users\,dc=microsoft\,dc=com</cs-dn>
<cs-guid>{B7876FBE-CC99-4757-BBE8-698FA3261307}</cs-guid>
<ma-name>simple preview test MA</ma-name>
<ma-guid>{63B73C90-54C9-4F29-8174-CBB2C997D236}</ma-guid>
</cs-mv-value>
</cs-mv-links>
<entry dn="{B9D93FDC-B3B0-4ACE-AEAC-E023AB278C44}">
<primary-objectclass lineage-id="{B48427B0-496E-4D05-81A3-D9CC311DDFFC}" lineage-ma-id="{63B73C90-54C9-4F29-8174-CBB2C997D236}" lineage-time="200X-0X-0X 00:54:14.367">person</primary-objectclass>
<objectclass>
```

```xml
<oc-value>person</oc-value>
</objectclass>
<dn-attr name="manager" multivalued="false">
<dn-value lineage-id="{92C6F29F-63C1-4819-9BA5-3D4615438ECB}" lineage-ma-id="{63B73C90-54C9-4F29-8174-CBB2C997D236}" lineage-time="200X-0X-0X 00:54:14.383">
<dn>{2E88393B-1D4E-4484-B495-D058AFC94384}</dn>
</dn-value>
</dn-attr>
<attr name="Status" type="boolean" multivalued="false">
<value lineage-id="{B7F2BB85-7518-426C-AC29-3724F6A93ACE}" lineage-ma-id="{63B73C90-54C9-4F29-8174-CBB2C997D236}" lineage-time="200X-0X-0X 00:54:14.383">true</value>
</attr>
<attr name="c" type="string" multivalued="false">
<value lineage-id="{2AA38304-7B4A-4B6B-A94E-D7C30D1356B3}" lineage-ma-id="{63B73C90-54C9-4F29-8174-CBB2C997D236}" lineage-time="200X-0X-0X 00:54:14.383">USA</value>
</attr>
<attr name="company" type="string" multivalued="false">
```

```xml
<value lineage-id="{84994F28-E1E0-4E06-91DF-614512E08D10}" lineage-ma-id="{63B73C90-54C9-4F29-8174-CBB2C997D236}" lineage-time="200X-0X-0X 00:54:14.383">Microsoft Corporation</value>
    </attr>
    <attr name="displayName" type="string" multivalued="false">
        <value lineage-id="{5FFD495F-10C3-47DB-8AEB-F8B08A18F13F}" lineage-ma-id="{63B73C90-54C9-4F29-8174-CBB2C997D236}" lineage-time="200X-0X-0X 00:54:14.383">Generic Employee</value>
    </attr>
    <attr name="givenName" type="string" multivalued="false">
        <value lineage-id="{38403CFE-1F5B-48EA-8548-ABDA6C59CA01}" lineage-ma-id="{63B73C90-54C9-4F29-8174-CBB2C997D236}" lineage-time="200X-0X-0X 00:54:14.383">Generic</value>
    </attr>
    <attr name="location" type="string" multivalued="false">
        <value lineage-id="{E94E3DEE-6D7B-469A-A1E9-7C1DA7801185}" lineage-ma-id="{63B73C90-54C9-4F29-8174-CBB2C997D236}" lineage-time="200X-0X-0X 00:54:14.383">Redmond</value>
    </attr>
    <attr name="mail" type="string" multivalued="false">
```

```xml
<value lineage-id="{DE0D930D-2131-4A67-82F4-9307DF9E2B5E}" lineage-ma-id="{63B73C90-54C9-4F29-8174-CBB2C997D236}" lineage-time="200X-0X-0X 00:54:14.383">genericemp@microsoft.com</value>
    </attr>
    <attr name="sn" type="string" multivalued="false">
<value lineage-id="{210E9AB8-ED49-4252-A76A-4D65DEE0BF5F}" lineage-ma-id="{63B73C90-54C9-4F29-8174-CBB2C997D236}" lineage-time="200X-0X-0X 00:54:14.383">Employee</value>
    </attr>
    <attr name="telephoneNumber" type="string" multivalued="false">
<value lineage-id="{7A8C4342-CB44-4249-BA2F-05BDFD7C65B8}" lineage-ma-id="{63B73C90-54C9-4F29-8174-CBB2C997D236}" lineage-time="200X-0X-0X 00:54:14.383">4258828080</value>
    </attr>
    <attr name="title" type="string" multivalued="false">
<value lineage-id="{426CF074-00C1-406C-8A2E-4E1ACE401115}" lineage-ma-id="{63B73C90-54C9-4F29-8174-CBB2C997D236}" lineage-time="200X-0X-0X 00:54:14.383">Program Manager</value>
    </attr>
  </entry>
</mv-object>
<mv-changes id="{B9D93FDC-B3B0-4ACE-AEAC-E023AB278C44}">
```

```xml
<delta operation="none" dn="{B9D93FDC-B3B0-4ACE-AEAC-E023AB278C44}">

</delta>

</mv-changes>

</mv>

<mv-deletion-rules>

<mv-deletion has-error="false">

</mv-deletion>

</mv-deletion-rules>

<mv-operation>disconnected</mv-operation>

<mv-recall>

<import-attribute-flow type="recall" has-error="false">

<repopulation-operation mv-attribute="Status">

<deleting-attribute mv-attribute="Status"/>

</repopulation-operation>

<repopulation-operation mv-attribute="c">

<deleting-attribute mv-attribute="c"/>

</repopulation-operation>

<repopulation-operation mv-attribute="company">

<deleting-attribute mv-attribute="company"/>

</repopulation-operation>

<repopulation-operation mv-attribute="displayName">
```

```xml
<deleting-attribute mv-attribute="displayName"/>

<import-flow mv-attribute="displayName" src-ma-id="{63B73C90-54C9-4F29-8174-CBB2C997D236}" status="skipped-no-suitable-connector">

<direct-mapping>

<src-attribute>displayName</src-attribute>

</direct-mapping>

</import-flow>

<import-flow mv-attribute="displayName" src-ma-id="{EE5A9216-2984-4B18-A8E0-8B95E5B5F7D8}" src-object-id="{B4500EE1-B273-4D4C-925F-32B7A3A109AF}" status="applied">

<direct-mapping>

<src-attribute>displayName</src-attribute>

</direct-mapping>

</import-flow>

</repopulation-operation>

<repopulation-operation mv-attribute="givenName">

<deleting-attribute mv-attribute="givenName"/>

</repopulation-operation>

<repopulation-operation mv-attribute="location">

<deleting-attribute mv-attribute="location"/>

<import-flow mv-attribute="location" src-ma-id="{63B73C90-54C9-4F29-8174-CBB2C997D236}" status="skipped-no-suitable-connector">
```

```xml
<direct-mapping>

<src-attribute>location</src-attribute>

</direct-mapping>

</import-flow>

<import-flow mv-attribute="location" src-ma-id="{EE5A9216-2984-4B18-A8E0-8B95E5B5F7D8}" src-object-id="{B4500EE1-B273-4D4C-925F-32B7A3A109AF}" status="applied">

<direct-mapping>

<src-attribute>location</src-attribute>

</direct-mapping>

</import-flow>

</repopulation-operation>

<repopulation-operation mv-attribute="mail">

<deleting-attribute mv-attribute="mail"/>

</repopulation-operation>

<repopulation-operation mv-attribute="manager">

<deleting-attribute mv-attribute="manager"/>

</repopulation-operation>

<repopulation-operation mv-attribute="sn">

<deleting-attribute mv-attribute="sn"/>

</repopulation-operation>

<repopulation-operation mv-attribute="telephoneNumber">
```

```xml
        <deleting-attribute mv-attribute="telephoneNumber"/>

</repopulation-operation>

<repopulation-operation mv-attribute="title">

<deleting-attribute mv-attribute="title"/>

</repopulation-operation>

<values>

<delta operation="update" dn="{B9D93FDC-B3B0-4ACE-AEAC-E023AB278C44}">

<dn-attr name="manager" operation="delete" multivalued="false">
            </dn-attr>

<attr name="Status" operation="delete" type="boolean" multivalued="false">
            </attr>

<attr name="c" operation="delete" type="string" multivalued="false">
            </attr>

<attr name="company" operation="delete" type="string" multivalued="false">
            </attr>

<attr name="displayName" operation="update" type="string" multivalued="false">

<value operation="delete">Generic Employee</value>
```

```xml
        <value operation="add" lineage-id="{8A8BD287-4829-4A1D-A3E6-89D734E4F21E}" lineage-ma-id="{EE5A9216-2984-4B18-A8E0-8B95E5B5F7D8}" lineage-time="200X-0X-0X 18:07:48.555">Generic Employee</value>
    </attr>
    <attr name="givenName" operation="delete" type="string" multivalued="false">
    </attr>
    <attr name="location" operation="update" type="string" multivalued="false">
        <value operation="delete">Redmond</value>
        <value operation="add" lineage-id="{7C061E9F-A96A-4405-8235-65D315E1BCF6}" lineage-ma-id="{EE5A9216-2984-4B18-A8E0-8B95E5B5F7D8}" lineage-time="200X-0X-0X 18:07:48.555">Redmond</value>
    </attr>
    <attr name="mail" operation="delete" type="string" multivalued="false">
    </attr>
    <attr name="sn" operation="delete" type="string" multivalued="false">
    </attr>
    <attr name="telephoneNumber" operation="delete" type="string" multivalued="false">
```

```
</attr>

<attr name="title" operation="delete" type="string" multivalued="false">

</attr>

</delta>

</values>

<referenced-connectors>

<cs-object cs-dn="cn=GenericEmployee\,ou=users\,dc=microsoft\,dc=com" id="{B4500EE1-B273-4D4C-925F-32B7A3A109AF}" object-type="person">

<unapplied-export>

<delta operation="none" dn="cn=GenericEmployee\,ou=users\,dc=microsoft\,dc=com">

<anchor encoding="base64">YAAAAGMAbgA9AEcAZQBuAGUAcgBpAGMARQBtAHAAbABvAHkAZQBlACwAbwB1AD0AdQBzAGUAcgBzACwAZABjAD0AbQBpAGMAcgBvAHMAbwBmAHQALABkAGMAPQBjAG8AbQAAAA==</anchor>

</delta>

</unapplied-export>

<escrowed-export>
```

```xml
<delta operation="none"
dn="cn=GenericEmployee\,ou=users\,dc=microsoft\,dc=com">
    <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
</delta>
</escrowed-export>
<unconfirmed-export>
<delta operation="none"
dn="cn=GenericEmployee\,ou=users\,dc=microsoft\,dc=com">
    <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
</delta>
</unconfirmed-export>
<pending-import>
<delta operation="none"
dn="cn=GenericEmployee\,ou=users\,dc=microsoft\,dc=com">
```

```
        <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
      </delta>
    </pending-import>
    <synchronized-hologram>
      <entry dn="cn=GenericEmployee\,ou=users\,dc=microsoft\,dc=com">
        <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
        <primary-objectclass>person</primary-objectclass>
        <objectclass>
          <oc-value>person</oc-value>
        </objectclass>
        <dn-attr name="manager" multivalued="false">
          <dn-value>
            <dn>cn=GenericBoss\,ou=users\,dc=microsoft\,dc=com</dn>
```

```xml
<anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
        </dn-value>
      </dn-attr>
      <attr name="company" type="string" multivalued="false">
        <value>Microsoft Corporation</value>
      </attr>
      <attr name="country" type="string" multivalued="false">
        <value>USA</value>
      </attr>
      <attr name="displayName" type="string" multivalued="false">
        <value>Generic Employee</value>
      </attr>
      <attr name="dn" type="string" multivalued="false">
        <value>cn=GenericEmployee,ou=users,dc=microsoft,dc=com</value>
      </attr>
      <attr name="employeeID" type="integer" multivalued="false">
        <value>0x1</value>
      </attr>
      <attr name="firstname" type="string" multivalued="false">
```

```xml
    <value>Generic</value>
</attr>
<attr name="location" type="string" multivalued="false">
 <value>Redmond</value>
</attr>
<attr name="mail" type="string" multivalued="false">
 <value>genericemp@microsoft.com</value>
</attr>
<attr name="phone" type="string" multivalued="false">
 <value>4258828080</value>
</attr>
<attr name="sn" type="string" multivalued="false">
 <value>Employee</value>
</attr>
<attr name="status" type="boolean" multivalued="false">
 <value>true</value>
</attr>
<attr name="title" type="string" multivalued="false">
 <value>Program Manager</value>
</attr>
</entry>
</synchronized-hologram>
```

```xml
<unapplied-export-hologram>
    <entry dn="cn=GenericEmployee\,ou=users\,dc=microsoft\,dc=com">
        <anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
        <primary-objectclass>person</primary-objectclass>
        <objectclass>
            <oc-value>person</oc-value>
        </objectclass>
        <dn-attr name="manager" multivalued="false">
            <dn-value>
                <dn>cn=GenericBoss\,ou=users\,dc=microsoft\,dc=com</dn>
                <anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
            </dn-value>
        </dn-attr>
        <attr name="company" type="string" multivalued="false">
            <value>Microsoft Corporation</value>
```

```xml
</attr>
<attr name="country" type="string" multivalued="false">
 <value>USA</value>
</attr>
<attr name="displayName" type="string" multivalued="false">
 <value>Generic Employee</value>
</attr>
<attr name="dn" type="string" multivalued="false">
 <value>cn=GenericEmployee,ou=users,dc=microsoft,dc=com</value>
</attr>
<attr name="employeeID" type="integer" multivalued="false">
 <value>0x1</value>
</attr>
<attr name="firstname" type="string" multivalued="false">
 <value>Generic</value>
</attr>
<attr name="location" type="string" multivalued="false">
 <value>Redmond</value>
</attr>
<attr name="mail" type="string" multivalued="false">
 <value>genericemp@microsoft.com</value>
</attr>
```

```xml
<attr name="phone" type="string" multivalued="false">
  <value>4258828080</value>
</attr>

<attr name="sn" type="string" multivalued="false">
  <value>Employee</value>
</attr>

<attr name="status" type="boolean" multivalued="false">
  <value>true</value>
</attr>

<attr name="title" type="string" multivalued="false">
  <value>Program Manager</value>
</attr>

</entry>
</unapplied-export-hologram>
<escrowed-export-hologram>
  <entry dn="cn=GenericEmployee\,ou=users\,dc=microsoft\,dc=com">
    <anchor encoding="base64">YAAAAGMAbgA9AEcAZQBuAGUAcgBpAGMARQBtAHAAbABvAHkAZQBlACwAbwB1AD0AdQBzAGUAcgBzACwAZABjAD0AbQBpAGMAcgBvAHMAbwBmAHQALABkAGMAPQBjAG8AbQAAAA==</anchor>
    <primary-objectclass>person</primary-objectclass>
```

```xml
<objectclass>
  <oc-value>person</oc-value>
</objectclass>
<dn-attr name="manager" multivalued="false">
  <dn-value>
    <dn>cn=GenericBoss\,ou=users\,dc=microsoft\,dc=com</dn>
    <anchor encoding="base64">WAAAAGMAbgA9AEcAZQBuAGUAcgBpAGMAQgBvA HMAcwAsAG8AdQA9AHUAcwBlAHIAcwAsAGQAYwA9AG0AaQBjAHIAb wBzAG8AZgB0ACwAZABjAD0AYwBvAG0AAAA=</anchor>
  </dn-value>
</dn-attr>
<attr name="company" type="string" multivalued="false">
  <value>Microsoft Corporation</value>
</attr>
<attr name="country" type="string" multivalued="false">
  <value>USA</value>
</attr>
<attr name="displayName" type="string" multivalued="false">
  <value>Generic Employee</value>
</attr>
<attr name="dn" type="string" multivalued="false">
```

```xml
<value>cn=GenericEmployee,ou=users,dc=microsoft,dc=com</value>
</attr>
<attr name="employeeID" type="integer" multivalued="false">
 <value>0x1</value>
</attr>
<attr name="firstname" type="string" multivalued="false">
 <value>Generic</value>
</attr>
<attr name="location" type="string" multivalued="false">
 <value>Redmond</value>
</attr>
<attr name="mail" type="string" multivalued="false">
 <value>genericemp@microsoft.com</value>
</attr>
<attr name="phone" type="string" multivalued="false">
 <value>4258828080</value>
</attr>
<attr name="sn" type="string" multivalued="false">
 <value>Employee</value>
</attr>
<attr name="status" type="boolean" multivalued="false">
 <value>true</value>
```

```
</attr>

<attr name="title" type="string" multivalued="false">

<value>Program Manager</value>

</attr>

</entry>

</escrowed-export-hologram>

<unconfirmed-export-hologram>

<entry dn="cn=GenericEmployee\,ou=users\,dc=microsoft\,dc=com">

<anchor encoding="base64">YAAAAGMAbgA9AEcAZQBuAGUAcgBpAGMARQBtAHAAbABvAHkAZQBlACwAbwB1AD0AdQBzAGUAcgBzACwAZABjAD0AbQBpAGMAcgBvAHMAbwBmAHQALABkAGMAPQBjAG8AbQAAAA==</anchor>

<primary-objectclass>person</primary-objectclass>

<objectclass>

<oc-value>person</oc-value>

</objectclass>

<dn-attr name="manager" multivalued="false">

<dn-value>

<dn>cn=GenericBoss\,ou=users\,dc=microsoft\,dc=com</dn>

<anchor encoding="base64">WAAAAGMAbgA9AEcAZQBuAGUAcgBpAGMAQgBvA
```

HMAcwAsAG8AdQA9AHUAcwBlAHIAcwAsAGQAYwA9AG0AaQBjAHIAb wBzAG8AZgB0ACwAZABjAD0AYwBvAG0AAAA=</anchor>

```xml
    </dn-value>

</dn-attr>

<attr name="company" type="string" multivalued="false">

<value>Microsoft Corporation</value>

</attr>

<attr name="country" type="string" multivalued="false">

<value>USA</value>

</attr>

<attr name="displayName" type="string" multivalued="false">

<value>Generic Employee</value>

</attr>

<attr name="dn" type="string" multivalued="false">

<value>cn=GenericEmployee,ou=users,dc=microsoft,dc=com</value>

</attr>

<attr name="employeeID" type="integer" multivalued="false">

<value>0x1</value>

</attr>

<attr name="firstname" type="string" multivalued="false">

<value>Generic</value>

</attr>
```

```xml
<attr name="location" type="string" multivalued="false">
  <value>Redmond</value>
</attr>
<attr name="mail" type="string" multivalued="false">
  <value>genericemp@microsoft.com</value>
</attr>
<attr name="phone" type="string" multivalued="false">
  <value>4258828080</value>
</attr>
<attr name="sn" type="string" multivalued="false">
  <value>Employee</value>
</attr>
<attr name="status" type="boolean" multivalued="false">
  <value>true</value>
</attr>
<attr name="title" type="string" multivalued="false">
  <value>Program Manager</value>
</attr>
</entry>
</unconfirmed-export-hologram>
<pending-import-hologram>
<entry dn="cn=GenericEmployee\,ou=users\,dc=microsoft\,dc=com">
```

```xml
<anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>
    <primary-objectclass>person</primary-objectclass>
    <objectclass>
      <oc-value>person</oc-value>
    </objectclass>
    <dn-attr name="manager" multivalued="false">
      <dn-value>
        <dn>cn=GenericBoss\,ou=users\,dc=microsoft\,dc=com</dn>
        <anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
      </dn-value>
    </dn-attr>
    <attr name="company" type="string" multivalued="false">
      <value>Microsoft Corporation</value>
    </attr>
    <attr name="country" type="string" multivalued="false">
```

```xml
<value>USA</value>

</attr>

<attr name="displayName" type="string" multivalued="false">

<value>Generic Employee</value>

</attr>

<attr name="dn" type="string" multivalued="false">

<value>cn=GenericEmployee,ou=users,dc=microsoft,dc=com</value>

</attr>

<attr name="employeeID" type="integer" multivalued="false">

<value>0x1</value>

</attr>

<attr name="firstname" type="string" multivalued="false">

<value>Generic</value>

</attr>

<attr name="location" type="string" multivalued="false">

<value>Redmond</value>

</attr>

<attr name="mail" type="string" multivalued="false">

<value>genericemp@microsoft.com</value>

</attr>

<attr name="phone" type="string" multivalued="false">

<value>4258828080</value>
```

```
</attr>

<attr name="sn" type="string" multivalued="false">

<value>Employee</value>

</attr>

<attr name="status" type="boolean" multivalued="false">

<value>true</value>

</attr>

<attr name="title" type="string" multivalued="false">

<value>Program Manager</value>

</attr>

</entry>

</pending-import-hologram>

<ma-id>{EE5A9216-2984-4B18-A8E0-8B95E5B5F7D8}</ma-id>

</cs-object>

</referenced-connectors>

</import-attribute-flow>

</mv-recall>

<mv-changes id="{B9D93FDC-B3B0-4ACE-AEAC-E023AB278C44}">

<delta operation="update" dn="{B9D93FDC-B3B0-4ACE-AEAC-E023AB278C44}">

<dn-attr name="manager" operation="delete" multivalued="false">
```

```xml
</dn-attr>

<attr name="Status" operation="delete" type="boolean" multivalued="false">

</attr>

<attr name="c" operation="delete" type="string" multivalued="false">

</attr>

<attr name="company" operation="delete" type="string" multivalued="false">

</attr>

<attr name="displayName" operation="update" type="string" multivalued="false">

<value operation="delete">Generic Employee</value>

<value operation="add" lineage-id="{8A8BD287-4829-4A1D-A3E6-89D734E4F21E}" lineage-time="200X-0X-0X 18:07:48.555">Generic Employee</value>

</attr>

<attr name="givenName" operation="delete" type="string" multivalued="false">

</attr>

<attr name="location" operation="update" type="string" multivalued="false">

<value operation="delete">Redmond</value>
```

```xml
<value operation="add" lineage-id="{7C061E9F-A96A-4405-8235-65D315E1BCF6}" lineage-time="200X-0X-0X 18:07:48.555">Redmond</value>
</attr>
<attr name="mail" operation="delete" type="string" multivalued="false">
</attr>
<attr name="sn" operation="delete" type="string" multivalued="false">
</attr>
<attr name="telephoneNumber" operation="delete" type="string" multivalued="false">
</attr>
<attr name="title" operation="delete" type="string" multivalued="false">
</attr>
</delta>
</mv-changes>
<cs-export>
<export-before-change id="{B4500EE1-B273-4D4C-925F-32B7A3A109AF}" ma-name="simple preview MA 2" ma-id="{EE5A9216-2984-4B18-A8E0-8B95E5B5F7D8}">
<cs-operation>flow</cs-operation>
<entry dn="cn=GenericEmployee\,ou=users\,dc=microsoft\,dc=com">
```

```xml
<anchor encoding="base64">YAAAAGMAbgA9AEcAZQBuAGUAcgBpAGMARQBtA
HAAbABvAHkAZQBlACwAbwB1AD0AdQBzAGUAcgBzACwAZABjAD0Ab
QBpAGMAcgBvAHMAbwBmAHQALABkAGMAPQBjAG8AbQAAAA==</anchor>

<primary-objectclass>person</primary-objectclass>
    <objectclass>
     <oc-value>person</oc-value>
    </objectclass>
    <dn-attr name="manager" multivalued="false">
     <dn-value>
      <dn>cn=GenericBoss\,ou=users\,dc=microsoft\,dc=com</dn>
      <anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
     </dn-value>
    </dn-attr>
    <attr name="company" type="string" multivalued="false">
     <value>Microsoft Corporation</value>
    </attr>
    <attr name="country" type="string" multivalued="false">
```

```
<value>USA</value>

</attr>

<attr name="displayName" type="string" multivalued="false">

<value>Generic Employee</value>

</attr>

<attr name="dn" type="string" multivalued="false">

<value>cn=GenericEmployee,ou=users,dc=microsoft,dc=com</value>

</attr>

<attr name="employeeID" type="integer" multivalued="false">

<value>0x1</value>

</attr>

<attr name="firstname" type="string" multivalued="false">

<value>Generic</value>

</attr>

<attr name="location" type="string" multivalued="false">

<value>Redmond</value>

</attr>

<attr name="mail" type="string" multivalued="false">

<value>genericemp@microsoft.com</value>

</attr>

<attr name="phone" type="string" multivalued="false">

<value>4258828080</value>
```

```
</attr>

<attr name="sn" type="string" multivalued="false">

<value>Employee</value>

</attr>

<attr name="status" type="boolean" multivalued="false">

<value>true</value>

</attr>

<attr name="title" type="string" multivalued="false">

<value>Program Manager</value>

</attr>

</entry>

</export-before-change>

<export-flow-rules>

<export-attribute-flow type="full" has-error="false">

<export-flow cd-attribute="status" status="skipped-suppressed-deletion">

<direct-mapping>

<src-attribute>Status</src-attribute>

</direct-mapping>

</export-flow>

<values>
```

```xml
        <delta operation="none" dn="cn=GenericEmployee\,ou=users\,dc=microsoft\,dc=com">
        </delta>
      </values>
    </export-attribute-flow>
  </export-flow-rules>
  <export-after-change id="{B4500EE1-B273-4D4C-925F-32B7A3A109AF}" ma-name="simple preview MA 2" ma-id="{EE5A9216-2984-4B18-A8E0-8B95E5B5F7D8}">
    <cs-operation>flow</cs-operation>
    <entry dn="cn=GenericEmployee\,ou=users\,dc=microsoft\,dc=com">
      <anchor encoding="base64">YAAAAGMAbgA9AEcAZQBuAGUAcgBpAGMARQBtAHAAbABvAHkAZQBlACwAbwB1AD0AdQBzAGUAcgBzACwAZABjAD0AbQBpAGMAcgBvAHMAbwBmAHQALABkAGMAPQBjAG8AbQAAAA==</anchor>
      <primary-objectclass>person</primary-objectclass>
      <objectclass>
        <oc-value>person</oc-value>
      </objectclass>
      <dn-attr name="manager" multivalued="false">
        <dn-value>
```

```xml
<dn>cn=GenericBoss\,ou=users\,dc=microsoft\,dc=com</dn>
<anchor encoding="base64">WAAAAGMAbgA9AEcAZQBuAGUAcgBpAGMAQgBvA
HMAcwAsAG8AdQA9AHUAcwBlAHIAcwAsAGQAYwA9AG0AaQBjAHIAb
wBzAG8AZgB0ACwAZABjAD0AYwBvAG0AAAA=</anchor>
</dn-value>
</dn-attr>
<attr name="company" type="string" multivalued="false">
<value>Microsoft Corporation</value>
</attr>
<attr name="country" type="string" multivalued="false">
<value>USA</value>
</attr>
<attr name="displayName" type="string" multivalued="false">
<value>Generic Employee</value>
</attr>
<attr name="dn" type="string" multivalued="false">
<value>cn=GenericEmployee,ou=users,dc=microsoft,dc=com</value>
</attr>
<attr name="employeeID" type="integer" multivalued="false">
<value>0x1</value>
</attr>
```

```xml
<attr name="firstname" type="string" multivalued="false">
  <value>Generic</value>
</attr>

<attr name="location" type="string" multivalued="false">
  <value>Redmond</value>
</attr>

<attr name="mail" type="string" multivalued="false">
  <value>genericemp@microsoft.com</value>
</attr>

<attr name="phone" type="string" multivalued="false">
  <value>4258828080</value>
</attr>

<attr name="sn" type="string" multivalued="false">
  <value>Employee</value>
</attr>

<attr name="status" type="boolean" multivalued="false">
  <value>true</value>
</attr>

<attr name="title" type="string" multivalued="false">
  <value>Program Manager</value>
</attr>
</entry>
```

```xml
</export-after-change>
<stay-disconnector-rules>
<stay-disconnector type="export" has-error="false">
<filter-set type="declared" status="not-satisfied">
<filter-alternative status="not-satisfied">
<condition cd-attribute="status" intrinsic-attribute="false" operator="equality" status="false">
<value>false</value>
</condition>

</filter-alternative>
</filter-set>
</stay-disconnector>
</stay-disconnector-rules>
</cs-export>
</preview>
```

Example B (e.g., top level aspects)

```xml
<preview>
<cs-object cs-dn="CN=Name 0,OU=JENWU-D_5840c218_29290,DC=sync-bvt,DC=nttest,DC=microsoft,DC=com" id="{687660AD-CF01-44FD-9B99-FB3E2E71B6FC}" transient="false">
```

```xml
</cs-object>

<stay-disconnector-rules>

</stay-disconnector-rules>

<cs-operation>attempt-join-prejection | disconnected | deleted | no-delta</cs-operation>

<!-- stay disconnect -->

<mv-recall>

</mv-recall>

<!-- cs deletion -->

<mv-deletion-rules>

</mv-deletion-rules>

<import-recall>

</import-recall>

<!-- join -->

<join-rules>

</join-rules>

<mv-type-change>

</mv-type-change>

<!-- project -->

<projection-rules>

<projection-mapping has-error="false">

</projection-mapping>
```

```xml
</projection-rules>

<mv-operation>disconnected|deleted|no-delta</mv-operation>

<mv>

<mv-object id="{7AB54164-56E8-410F-8059-E19874C1309C}">

</mv-object>

<mv-changes id="{7AB54164-56E8-410F-8059-E19874C1309C}">

</mv-changes>

</mv>

<import-flow-rules>

</import-flow-rules>

<mv-changes id="{7AB54164-56E8-410F-8059-E19874C1309C}">

<delta operation="none" dn="{7AB54164-56E8-410F-8059-E19874C1309C}">

</delta>

</mv-changes>

<provisioning-rules></provisioning-rules>

<cs-export>

<export-before-flow cs-id="{687660AD-CF01-44FD-9B99-FB3E2E71B6FC}" ma-id="{F0481D86-ED4E-4924-9BC7-8B23059095FB}">

</export-before-flow>

<cs-operation>add|deprovision|delete|auto-delete</cs-operation>

<!-- export flow + stay disconnect -->
```

```
<export-flow-rules>

</export-flow-rules>

<stay-disconnector-rules>

</stay-disconnector-rules>

<!-- mv recall + deprovisioning -->

<mv-recall>

</mv-recall>

<de-provisioning>

</de-provisioning>

</cs-export>

<mv-operation>deleted</mv-operation>

<error type="unexpected-error" code="0x80230405">

<diagnosis>Staging failed 0x80230405: [CN=Name 0,OU=JENWU-D_5840c218_29290,DC=sync-bvt,DC=nttest,DC=microsoft,DC=com]

</diagnosis>

</error>

</preview>
```

Example C (e.g., metaverse or core area attribute recall)

```
<preview>

<cs-object cs-dn="00000003" id="{DA584C86-31BE-4F92-81E3-3EDCA8261DB0}" transient="false">
```

```
<unapplied-export>

<delta operation="none" dn="00000003">

</delta>

</unapplied-export>

<escrowed-export>

<delta operation="none" dn="00000003">

</delta>

</escrowed-export>

<unconfirmed-export>

<delta operation="none" dn="00000003">

</delta>

</unconfirmed-export>

<pending-import>

<delta operation="delete" dn="00000003">

<anchor encoding="base64">EgAAADAAMAAwADAAMAAwADAAMwAAAA==</anchor>

</delta>

</pending-import>

<hologram>

<entry dn="00000003">
```

```xml
<anchor encoding="base64">EgAAADAAMAAwADAAMAAwADAAMwAAA==</anchor>
        <primary-objectclass>person</primary-objectclass>
        <objectclass>
         <oc-value>person</oc-value>
        </objectclass>
        <dn-attr name="reportTo" multivalued="true">
         <dn-value>
          <dn>00000001</dn>
         </dn-value>
         <dn-value>
          <dn>00000002</dn>
         </dn-value>
        </dn-attr>
        <attr name="employeeID" type="string" multivalued="false">
         <value>00000003</value>
        </attr>
       </entry>
      </hologram>
      <export-hologram>
       <entry dn="00000003">
```

```xml
    </entry>

</export-hologram>

<escrowed-export-hologram>

<entry dn="00000003">

</entry>

</escrowed-export-hologram>

<unconfirmed-export-hologram>

<entry dn="00000003">

</entry>

</unconfirmed-export-hologram>

<import-hologram>

<entry dn="00000003">

</entry>

</import-hologram>

<connector>1</connector>

<connector-state>normal</connector-state>

<seen-by-import>1</seen-by-import>

<need-cd-full-import>0</need-cd-full-import>

<phantom-parent>0</phantom-parent>

<phantom-link>0</phantom-link>

<phantom-delete>0</phantom-delete>

<pending>1</pending>
```

```xml
<ref-retry>0</ref-retry>
<rename-retry>0</rename-retry>
<sequencers>
 <current>
  <batch-number>0</batch-number>
  <sequence-number>0</sequence-number>
 </current>
 <unapplied>
  <batch-number>0</batch-number>
  <sequence-number>0</sequence-number>
 </unapplied>
 <original>
  <batch-number>0</batch-number>
  <sequence-number>0</sequence-number>
 </original>
</sequencers>
<ma-id>{EBC55F13-6DDC-4B5B-B7DD-98F83AD55A8D}</ma-id>
<ma-name>MA1</ma-name>
<partition-id>{6672DCD6-A2F5-4036-A865-954289564218}</partition-id>
```

```xml
<mv-link lineage-id="{2FFC1480-7637-43A3-B219-9A581C1A1195}" lineage-type="projection-rules" lineage-time="200X-0X-0X 22:23:52.530">{257AB26E-1AD1-4478-918E-5DAE2BD83DB6}</mv-link>
    <last-import-delta-time>200X-0X-0X 22:24:14.043</last-import-delta-time>
  </cs-object>
  <cs-operation>deleted</cs-operation>
  <mv>
    <mv-object id="{257AB26E-1AD1-4478-918E-5DAE2BD83DB6}">
      <cs-mv-links>
        <cs-mv-value lineage-id="{2FFC1480-7637-43A3-B219-9A581C1A1195}" lineage-type="projection-rules" lineage-time="200X-0X-0X 22:23:52.530">
          <cs-dn>00000003</cs-dn>
          <cs-guid>{DA584C86-31BE-4F92-81E3-3EDCA8261DB0}</cs-guid>
          <ma-name>MA1</ma-name>
          <ma-guid>{EBC55F13-6DDC-4B5B-B7DD-98F83AD55A8D}</ma-guid>
        </cs-mv-value>
        <cs-mv-value lineage-id="{1658279E-CB46-4975-8BB1-BBE83D1668EC}" lineage-type="join-rules" lineage-time="200X-0X-0X 22:23:56.873">
```

```xml
<cs-dn>00000003</cs-dn>

<cs-guid>{CEEC6EF1-D03F-4881-A9A4-C9739D3FE533}</cs-guid>

<ma-name>MA2</ma-name>

<ma-guid>{D0EE5B24-E4BB-4AC3-86EA-2FFB95A5F474}</ma-guid>

</cs-mv-value>

</cs-mv-links>

<entry dn="{257AB26E-1AD1-4478-918E-5DAE2BD83DB6}">

<primary-objectclass lineage-id="{2FFC1480-7637-43A3-B219-9A581C1A1195}" lineage-ma-id="{EBC55F13-6DDC-4B5B-B7DD-98F83AD55A8D}" lineage-time="200X-0X-0X 22:23:52.530">person</primary-objectclass>

<objectclass>

<oc-value>person</oc-value>

</objectclass>

<dn-attr name="multiReference" multivalued="true">

<dn-value lineage-id="{D4DA8BAC-CE0B-4431-AC80-146D62AD34BF}" lineage-ma-id="{EBC55F13-6DDC-4B5B-B7DD-98F83AD55A8D}" lineage-time="200X-0X-0X 22:23:52.000">

<dn>{45192F07-3729-48E4-B522-AE91B283F90B}</dn>

</dn-value>
```

```xml
<dn-value lineage-id="{D4DA8BAC-CE0B-4431-AC80-146D62AD34BF}" lineage-ma-id="{EBC55F13-6DDC-4B5B-B7DD-98F83AD55A8D}" lineage-time="200X-0X-0X 22:23:52.000">
    <dn>{AE081F11-7795-4007-BA21-060B3DA96CC2}</dn>
</dn-value>
</dn-attr>
<attr name="employeeID" type="string" multivalued="false">
    <value lineage-id="{EB15E3C1-1AC0-45B5-BF60-A840E365B4F9}" lineage-ma-id="{EBC55F13-6DDC-4B5B-B7DD-98F83AD55A8D}" lineage-time="200X-0X-0X 22:23:52.530">00000003</value>
</attr>
</entry>
</mv-object>
<mv-changes id="{257AB26E-1AD1-4478-918E-5DAE2BD83DB6}">
    <delta operation="none" dn="{257AB26E-1AD1-4478-918E-5DAE2BD83DB6}">
    </delta>
</mv-changes>
</mv>
<mv-deletion-rules>
<mv-deletion has-error="false">
</mv-deletion>
```

```xml
</mv-deletion-rules>

<mv-operation>disconnected</mv-operation>

<mv-recall>

<import-attribute-flow type="recall" has-error="false">

<repopulation-operation mv-attribute="employeeID">

<deleting-attribute mv-attribute="employeeID"/>

</repopulation-operation>

<repopulation-operation mv-attribute="multiReference">

<deleting-attribute mv-attribute="multiReference"/>

</repopulation-operation>

<values>

<delta operation="update" dn="{257AB26E-1AD1-4478-918E-5DAE2BD83DB6}">

<dn-attr name="multiReference" operation="delete" multivalued="true">

</dn-attr>

<attr name="employeeID" operation="delete" type="string" multivalued="false">

</attr>

</delta>

</values>
```

```xml
</import-attribute-flow>

</mv-recall>

<mv-changes id="{257AB26E-1AD1-4478-918E-5DAE2BD83DB6}">

<delta operation="update" dn="{257AB26E-1AD1-4478-918E-5DAE2BD83DB6}">

<dn-attr name="multiReference" operation="delete" multivalued="true">

</dn-attr>

<attr name="employeeID" operation="delete" type="string" multivalued="false">

</attr>

</delta>

</mv-changes>

<cs-export>

<export-before-change id="{CEEC6EF1-D03F-4881-A9A4-C9739D3FE533}" ma-name="MA2" ma-id="{D0EE5B24-E4BB-4AC3-86EA-2FFB95A5F474}">

<cs-operation>flow</cs-operation>

<entry dn="00000003">

<anchor encoding="base64">EgAAADAAMAAwADAAMAAwADAAMwAAAA==</anchor>

<primary-objectclass>person</primary-objectclass>
```

```xml
<objectclass>
  <oc-value>person</oc-value>
</objectclass>
<dn-attr name="REPORTTO" multivalued="true">
  <dn-value>
    <dn>00000001</dn>
    <anchor encoding="base64">EgAAADAAMAAwADAAMAAwADAAMQAAAA==</anchor>
  </dn-value>
  <dn-value>
    <dn>00000002</dn>
    <anchor encoding="base64">EgAAADAAMAAwADAAMAAwADAAMgAAAA==</anchor>
  </dn-value>
</dn-attr>
<attr name="EMPLOYEEID" type="string" multivalued="false">
  <value>00000003</value>
</attr>
</entry>
</export-before-change>
```

```xml
<export-flow-rules>
    <export-attribute-flow type="full" has-error="false">
        <export-flow cd-attribute="REPORTTO" status="skipped-suppressed-deletion">
            <direct-mapping>
                <src-attribute>multiReference</src-attribute>
            </direct-mapping>
        </export-flow>
        <values>
            <delta operation="update" dn="00000003">
                <dn-attr name="REPORTTO" operation="add" multivalued="true">
                    <dn-value>
                        <dn>00000001</dn>
                        <anchor encoding="base64">EgAAADAAMAAwADAAMAAwADAAMQAAAA==</anchor>
                    </dn-value>
                    <dn-value>
                        <dn>00000002</dn>
                        <anchor encoding="base64">EgAAADAAMAAwADAAMAAwADAAMgAAAA==</anchor>
```

```
        </dn-value>

</dn-attr>

</delta>

</values>

</export-attribute-flow>

</export-flow-rules>

<export-after-change id="{CEEC6EF1-D03F-4881-A9A4-C9739D3FE533}" ma-name="MA2" ma-id="{D0EE5B24-E4BB-4AC3-86EA-2FFB95A5F474}">

<cs-operation>flow</cs-operation>

<entry dn="00000003">

<anchor encoding="base64">EgAAADAAMAAwADAAMAAwADAAMwAAAA==</anchor>

<primary-objectclass>person</primary-objectclass>

<objectclass>

<oc-value>person</oc-value>

</objectclass>

<dn-attr name="REPORTTO" multivalued="true">

<dn-value>

<dn>00000001</dn>
```

```xml
        <anchor encoding="base64">EgAAADAAMAAwADAAMAAwADAAMQAAAA==</anchor>
      </dn-value>
      <dn-value>
        <dn>00000002</dn>
        <anchor encoding="base64">EgAAADAAMAAwADAAMAAwADAAMgAAAA==</anchor>
      </dn-value>
    </dn-attr>
    <attr name="EMPLOYEEID" type="string" multivalued="false">
      <value>00000003</value>
    </attr>
   </entry>
  </export-after-change>
  <stay-disconnector-rules>
  </stay-disconnector-rules>
 </cs-export>
</preview>
```

Example D (e.g., join, attribute flow, provisioning, error handling, etc.)

```xml
<preview>
    <cs-object cs-dn="CN=dup dup,OU=jen-target,DC=mms-gal1-win2k,DC=nttest,DC=microsoft,DC=com" id="{B93984B9-FB5A-4BA4-A187-3B878683677C}" transient="false">
        <unapplied-export>
            <delta operation="none" dn="CN=dup dup,OU=jen-target,DC=mms-gal1-win2k,DC=nttest,DC=microsoft,DC=com">
                <anchor encoding="base64">nCHTrMMdcEm2N5ee25PRqA==</anchor>
            </delta>
        </unapplied-export>
        <escrowed-export>
            <delta operation="none" dn="CN=dup dup,OU=jen-target,DC=mms-gal1-win2k,DC=nttest,DC=microsoft,DC=com">
                <anchor encoding="base64">nCHTrMMdcEm2N5ee25PRqA==</anchor>
            </delta>
        </escrowed-export>
        <unconfirmed-export>
            <delta operation="none" dn="CN=dup dup,OU=jen-target,DC=mms-gal1-win2k,DC=nttest,DC=microsoft,DC=com">
```

```xml
    <anchor encoding="base64">nCHTrMMdcEm2N5ee25PRqA==</anchor>
   </delta>
  </unconfirmed-export>
  <pending-import>
   <delta operation="add" dn="CN=dup dup,OU=jen-target,DC=mms-gal1-win2k,DC=nttest,DC=microsoft,DC=com">
    <anchor encoding="base64">nCHTrMMdcEm2N5ee25PRqA==</anchor>
    <parent-anchor encoding="base64">GsEP5USvIEquf5vdS+RIFQ==</parent-anchor>
    <primary-objectclass>contact</primary-objectclass>
    <objectclass>
     <oc-value>top</oc-value>
     <oc-value>person</oc-value>
     <oc-value>organizationalPerson</oc-value>
     <oc-value>contact</oc-value>
    </objectclass>
    <attr name="cn" type="string" multivalued="false">
     <value>dup dup</value>
    </attr>
    <attr name="displayName" type="string" multivalued="false">
```

```xml
  <value>dup dup</value>
</attr>
<attr name="givenName" type="string" multivalued="false">
  <value>dup</value>
</attr>
<attr name="legacyExchangeDN" type="string" multivalued="false">
  <value>/o=First Organization/ou=First Administrative Group/cn=Recipients/cn=dupdup</value>
</attr>
<attr name="mAPIRecipient" type="boolean" multivalued="false">
  <value>false</value>
</attr>
<attr name="mail" type="string" multivalued="false">
  <value>aaa@bbb</value>
</attr>
<attr name="mailNickname" type="string" multivalued="false">
  <value>dupdup</value>
</attr>
<attr name="name" type="string" multivalued="false">
  <value>dup dup</value>
</attr>
<attr name="proxyAddresses" type="string" multivalued="true">
```

```xml
<value>SMTP:aaa@bbb</value>

<value>X400:c=us;a= ;p=First Organizati;o=Exchange;s=dup;g=dup;</value>

</attr>

<attr name="sn" type="string" multivalued="false">

<value>dup</value>

</attr>

<attr name="targetAddress" type="string" multivalued="false">

<value>SMTP:dup@mms-gal1-dotnet.nttest.microsoft.com</value>

</attr>

</delta>

</pending-import>

<hologram>

</hologram>

<export-hologram>

<entry dn="CN=dup dup,OU=jen-target,DC=mms-gal1-win2k,DC=nttest,DC=microsoft,DC=com">

<anchor encoding="base64">nCHTrMMdcEm2N5ee25PRqA==</anchor>

<parent-anchor encoding="base64">GsEP5USvIEquf5vdS+RIFQ==</parent-anchor>

<primary-objectclass>contact</primary-objectclass>
```

```xml
<objectclass>
 <oc-value>top</oc-value>
 <oc-value>person</oc-value>
 <oc-value>organizationalPerson</oc-value>
 <oc-value>contact</oc-value>
</objectclass>
<attr name="cn" type="string" multivalued="false">
 <value>dup dup</value>
</attr>
<attr name="displayName" type="string" multivalued="false">
 <value>dup dup</value>
</attr>
<attr name="givenName" type="string" multivalued="false">
 <value>dup</value>
</attr>
<attr name="legacyExchangeDN" type="string" multivalued="false">
 <value>/o=First Organization/ou=First Administrative Group/cn=Recipients/cn=dupdup</value>
</attr>
<attr name="mAPIRecipient" type="boolean" multivalued="false">
 <value>false</value>
</attr>
```

```xml
<attr name="mail" type="string" multivalued="false">
    <value>aaa@bbb</value>
</attr>
<attr name="mailNickname" type="string" multivalued="false">
    <value>dupdup</value>
</attr>
<attr name="name" type="string" multivalued="false">
    <value>dup dup</value>
</attr>
<attr name="proxyAddresses" type="string" multivalued="true">
    <value>SMTP:aaa@bbb</value>
    <value>X400:c=us;a= ;p=First Organizati;o=Exchange;s=dup;g=dup;</value>
</attr>
<attr name="sn" type="string" multivalued="false">
    <value>dup</value>
</attr>
<attr name="targetAddress" type="string" multivalued="false">
    <value>SMTP:dup@mms-gal1-dotnet.nttest.microsoft.com</value>
</attr>
</entry>
</export-hologram>
```

```xml
<escrowed-export-hologram>
    <entry dn="CN=dup dup,OU=jen-target,DC=mms-gal1-win2k,DC=nttest,DC=microsoft,DC=com">
        <anchor encoding="base64">nCHTrMMdcEm2N5ee25PRqA==</anchor>
        <parent-anchor encoding="base64">GsEP5USvIEquf5vdS+RIFQ==</parent-anchor>
        <primary-objectclass>contact</primary-objectclass>
        <objectclass>
            <oc-value>top</oc-value>
            <oc-value>person</oc-value>
            <oc-value>organizationalPerson</oc-value>
            <oc-value>contact</oc-value>
        </objectclass>
        <attr name="cn" type="string" multivalued="false">
            <value>dup dup</value>
        </attr>
        <attr name="displayName" type="string" multivalued="false">
            <value>dup dup</value>
        </attr>
        <attr name="givenName" type="string" multivalued="false">
            <value>dup</value>
```

```
</attr>

<attr name="legacyExchangeDN" type="string" multivalued="false">

<value>/o=First Organization/ou=First Administrative Group/cn=Recipients/cn=dupdup</value>

</attr>

<attr name="mAPIRecipient" type="boolean" multivalued="false">

<value>false</value>

</attr>

<attr name="mail" type="string" multivalued="false">

<value>aaa@bbb</value>

</attr>

<attr name="mailNickname" type="string" multivalued="false">

<value>dupdup</value>

</attr>

<attr name="name" type="string" multivalued="false">

<value>dup dup</value>

</attr>

<attr name="proxyAddresses" type="string" multivalued="true">

<value>SMTP:aaa@bbb</value>

<value>X400:c=us;a= ;p=First Organizati;o=Exchange;s=dup;g=dup;</value>

</attr>
```

```xml
<attr name="sn" type="string" multivalued="false">

<value>dup</value>

</attr>

<attr name="targetAddress" type="string" multivalued="false">

<value>SMTP:dup@mms-gal1-dotnet.nttest.microsoft.com</value>

</attr>

</entry>

</escrowed-export-hologram>

<unconfirmed-export-hologram>

<entry dn="CN=dup dup,OU=jen-target,DC=mms-gal1-win2k,DC=nttest,DC=microsoft,DC=com">

<anchor encoding="base64">nCHTrMMdcEm2N5ee25PRqA==</anchor>

<parent-anchor encoding="base64">GsEP5USvIEquf5vdS+RIFQ==</parent-anchor>

<primary-objectclass>contact</primary-objectclass>

<objectclass>

<oc-value>top</oc-value>

<oc-value>person</oc-value>

<oc-value>organizationalPerson</oc-value>

<oc-value>contact</oc-value>

</objectclass>
```

```xml
<attr name="cn" type="string" multivalued="false">
  <value>dup dup</value>
</attr>
<attr name="displayName" type="string" multivalued="false">
  <value>dup dup</value>
</attr>
<attr name="givenName" type="string" multivalued="false">
  <value>dup</value>
</attr>
<attr name="legacyExchangeDN" type="string" multivalued="false">
  <value>/o=First Organization/ou=First Administrative Group/cn=Recipients/cn=dupdup</value>
</attr>
<attr name="mAPIRecipient" type="boolean" multivalued="false">
  <value>false</value>
</attr>
<attr name="mail" type="string" multivalued="false">
  <value>aaa@bbb</value>
</attr>
<attr name="mailNickname" type="string" multivalued="false">
  <value>dupdup</value>
</attr>
```

```xml
<attr name="name" type="string" multivalued="false">
    <value>dup dup</value>
</attr>
<attr name="proxyAddresses" type="string" multivalued="true">
    <value>SMTP:aaa@bbb</value>
    <value>X400:c=us;a= ;p=First Organizati;o=Exchange;s=dup;g=dup;</value>
</attr>
<attr name="sn" type="string" multivalued="false">
    <value>dup</value>
</attr>
<attr name="targetAddress" type="string" multivalued="false">
    <value>SMTP:dup@mms-gal1-dotnet.nttest.microsoft.com</value>
</attr>
</entry>
</unconfirmed-export-hologram>
<import-hologram>
<entry dn="CN=dup dup,OU=jen-target,DC=mms-gal1-win2k,DC=nttest,DC=microsoft,DC=com">
    <anchor encoding="base64">nCHTrMMdcEm2N5ee25PRqA==</anchor>
```

```xml
<parent-anchor encoding="base64">GsEP5USvIEquf5vdS+RIFQ==</parent-anchor>
<primary-objectclass>contact</primary-objectclass>
<objectclass>
  <oc-value>top</oc-value>
  <oc-value>person</oc-value>
  <oc-value>organizationalPerson</oc-value>
  <oc-value>contact</oc-value>
</objectclass>
<attr name="cn" type="string" multivalued="false">
  <value>dup dup</value>
</attr>
<attr name="displayName" type="string" multivalued="false">
  <value>dup dup</value>
</attr>
<attr name="givenName" type="string" multivalued="false">
  <value>dup</value>
</attr>
<attr name="legacyExchangeDN" type="string" multivalued="false">
  <value>/o=First Organization/ou=First Administrative Group/cn=Recipients/cn=dupdup</value>
</attr>
```

```xml
<attr name="mAPIRecipient" type="boolean" multivalued="false">
    <value>false</value>
</attr>

<attr name="mail" type="string" multivalued="false">
    <value>aaa@bbb</value>
</attr>

<attr name="mailNickname" type="string" multivalued="false">
    <value>dupdup</value>
</attr>

<attr name="name" type="string" multivalued="false">
    <value>dup dup</value>
</attr>

<attr name="proxyAddresses" type="string" multivalued="true">
    <value>SMTP:aaa@bbb</value>
    <value>X400:c=us;a= ;p=First Organizati;o=Exchange;s=dup;g=dup;</value>
</attr>

<attr name="sn" type="string" multivalued="false">
    <value>dup</value>
</attr>

<attr name="targetAddress" type="string" multivalued="false">
    <value>SMTP:dup@mms-gal1-dotnet.nttest.microsoft.com</value>
```

```xml
    </attr>
   </entry>
  </import-hologram>
  <connector>0</connector>
  <connector-state>normal</connector-state>
  <seen-by-import>1</seen-by-import>
  <need-cd-full-import>0</need-cd-full-import>
  <phantom-parent>0</phantom-parent>
  <phantom-link>0</phantom-link>
  <phantom-delete>0</phantom-delete>
  <pending>1</pending>
  <ref-retry>0</ref-retry>
  <rename-retry>0</rename-retry>
  <sequencers>
   <current>
    <batch-number>0</batch-number>
    <sequence-number>0</sequence-number>
   </current>
   <unapplied>
    <batch-number>0</batch-number>
    <sequence-number>0</sequence-number>
   </unapplied>
```

```xml
<original>
  <batch-number>0</batch-number>
  <sequence-number>0</sequence-number>
</original>
</sequencers>
<ma-id>{339D5BD0-1E51-44F3-A79E-2793EA7416BC}</ma-id>
<ma-name>win2k</ma-name>
<partition-id>{BD214D63-5E3D-45B2-9584-85F099D3D2BB}</partition-id>
<last-import-delta-time>200X-0X-XX 20:04:46.700</last-import-delta-time>
</cs-object>
<stay-disconnector-rules>
  <stay-disconnector type="import" has-error="false">
    <filter-set type="scripted" status="not-satisfied">
    </filter-set>
  </stay-disconnector>
</stay-disconnector-rules>
<join-rules>
  <join has-error="false">
    <join-criterion status="found-match">
      <search>
```

```xml
<attribute-mapping mv-attribute="targetAddress" status="success">
  <direct-mapping>
    <src-attribute>targetAddress</src-attribute>
  </direct-mapping>
</attribute-mapping>
</search>
<search-values>
<entry>
  <attr name="targetAddress" type="string" multivalued="false">
    <value>SMTP:dup@mms-gal1-dotnet.nttest.microsoft.com</value>
  </attr>
</entry>
</search-values>
<search-results>
<mv-object id="{6421DF0B-5DA5-4FB1-842C-AB5482989B1C}">
  <entry dn="{6421DF0B-5DA5-4FB1-842C-AB5482989B1C}">
    <primary-objectclass lineage-id="{B45BE28C-A59E-4B79-874D-A5FF6509CFB7}" lineage-time="200X-0X-XX 19:56:03.423">person</primary-objectclass>
    <attr name="MapiRecipient" type="boolean" multivalued="false">
      <value lineage-id="{6EADB26C-CB0F-4E82-8C3D-B907AE4EDD6E}" lineage-time="200X-0X-XX 19:56:03.453">true</value>
```

```xml
</attr>

<attr name="cn" type="string" multivalued="false">

<value lineage-id="{EF184F20-C260-4E62-9E56-8428C572BC31}" lineage-time="200X-0X-XX 19:56:03.423">dup dup</value>

</attr>

<attr name="displayName" type="string" multivalued="false">

<value lineage-id="{D4082CF8-3FF4-490B-A547-90BDD627EA7D}" lineage-time="200X-0X-XX 19:56:03.423">dup dup</value>

</attr>

<attr name="givenName" type="string" multivalued="false">

<value lineage-id="{ACA5527D-744F-436F-B7C6-FA22664E9BC0}" lineage-time="200X-0X-XX 19:56:03.423">dup</value>

</attr>

<attr name="legacyExchangeDN" type="string" multivalued="true">

<value lineage-id="{602B64E6-5B60-4040-B89F-AFB6D21E64F9}" lineage-time="200X-0X-XX 19:56:03.483">/o=8First Organization8/ou=8First Administrative Group8/cn=Recipients/cn=dup</value>

</attr>

<attr name="mail" type="string" multivalued="false">

<value lineage-id="{1F34769F-6275-4539-A2C4-7C346CA40D23}" lineage-time="200X-0X-XX 19:56:03.423">dup@mms-gal1-dotnet.nttest.microsoft.com</value>
```

</attr>

<attr name="mailNickname" type="string" multivalued="false">

<value lineage-id="{4E34737E-F811-4D2A-92E1-8DA500BB7913}" lineage-time="200X-0X-XX 19:56:03.423">dup</value>

</attr>

<attr name="msExchHomeServerName" type="string" multivalued="false">

<value lineage-id="{901A8A34-9486-4852-B372-203184541A95}" lineage-time="200X-0X-XX 19:56:03.423">/o=8First Organization8/ou=8First Administrative Group8/cn=Configuration/cn=Servers/cn=GAL-SYNC-1</value>

</attr>

<attr name="msExchMailboxSecurityDescriptor" type="binary" multivalued="false">

<value lineage-id="{1832000F-626F-47C8-9692-4D418CAFF0E7}" lineage-time="200X-0X-XX 19:56:03.423" encoding="base64">AQAEgHgAAACUAAAAAAAABQAAAAEAGQAAQA AAAACFAADAAIAAQEAAAAAAAUKAAAAAAAAHMAbwBmAHQALw BkAGMAPQAAAQAAAAEAAAEAAAgAAAAYwA9AG0AbQBzACOAZwB hAGwAMQAtAGQAbwB0AG4AZQB0AAAAAQUAAAAAAAUVAAAA2TH4 QvRQunQH5Tsr9AEAAAEFAAAAAAAFFQAAANkx+EL0ULp0B+U7K/QBA AA=</value>

</attr>

```xml
<attr name="proxyAddresses" type="string" multivalued="true">
    <value lineage-id="{AB71A4F4-37DE-4628-89C3-26430969E751}" lineage-time="200X-0X-XX 19:56:03.423">SMTP:dup@mms-gal1-dotnet.nttest.microsoft.com</value>
    <value lineage-id="{AB71A4F4-37DE-4628-89C3-26430969E751}" lineage-time="200X-0X-XX 19:56:03.423">X400:c=US;a= ;p=8First Organizat;o=Exchange;s=dup;g=dup;</value>
</attr>
<attr name="sn" type="string" multivalued="false">
    <value lineage-id="{4C03AC8F-27FF-4EE0-9AD3-7A1779E11126}" lineage-time="200X-0X-XX 19:56:03.423">dup</value>
</attr>
<attr name="targetAddress" type="string" multivalued="false">
    <value lineage-id="{1F763173-399D-4F31-9B1A-C965BE08FD3E}" lineage-time="200X-0X-XX 19:56:03.500">SMTP:dup@mms-gal1-dotnet.nttest.microsoft.com</value>
</attr>
</entry>
</mv-object>
</search-results>
<resolution status="found-match">
<script-context>TargetAddress</script-context>
```

```xml
</resolution>

</join-criterion>

<join-result object-id="{6421DF0B-5DA5-4FB1-842C-AB5482989B1C}" new-type="person"/>

</join>

</join-rules>

<cs-operation>joined</cs-operation>

<mv>

<mv-object id="{6421DF0B-5DA5-4FB1-842C-AB5482989B1C}">

<cs-mv-links>

<cs-mv-value lineage-id="{B45BE28C-A59E-4B79-874D-A5FF6509CFB7}" lineage-type="projection-rules" lineage-time="200X-0X-XX 19:56:03.423">

<cs-dn>CN=dup dup,OU=jen,DC=mms-gal1-dotnet,DC=nttest,DC=microsoft,DC=com</cs-dn>

<cs-guid>{993144BB-DF79-403A-854C-A8FC59835165}</cs-guid>

<ma-name>dotnet</ma-name>

<ma-guid>{DE6607C4-6124-422B-BC18-775506BF5A37}</ma-guid>

</cs-mv-value>

<cs-mv-value lineage-id="{F434C74C-B9B8-4BCD-858B-B221447E1FC7}" lineage-type="provisioning-rules" lineage-time="200X-0X-XX 20:06:32.347">
```

```xml
<cs-dn>CN=dup dup (1),OU=jen-target,DC=mms-gal1-win2k,DC=nttest,DC=microsoft,DC=com</cs-dn>
    <cs-guid>{5632D262-5807-4F8E-A6B2-7B961C557DD2}</cs-guid>
    <ma-name>win2k</ma-name>
    <ma-guid>{339D5BD0-1E51-44F3-A79E-2793EA7416BC}</ma-guid>
    </cs-mv-value>
    </cs-mv-links>
    <entry dn="{6421DF0B-5DA5-4FB1-842C-AB5482989B1C}">
    <primary-objectclass lineage-id="{B45BE28C-A59E-4B79-874D-A5FF6509CFB7}" lineage-ma-id="{DE6607C4-6124-422B-BC18-775506BF5A37}" lineage-time="200X-0X-XX 19:56:03.423">person</primary-objectclass>
    <objectclass>
    <oc-value>person</oc-value>
    </objectclass>
    <attr name="MapiRecipient" type="boolean" multivalued="false">
    <value lineage-id="{6EADB26C-CB0F-4E82-8C3D-B907AE4EDD6E}" lineage-ma-id="{DE6607C4-6124-422B-BC18-775506BF5A37}" lineage-time="200X-0X-XX 19:56:03.453">true</value>
    </attr>
    <attr name="cn" type="string" multivalued="false">
```

```xml
<value lineage-id="{EF184F20-C260-4E62-9E56-8428C572BC31}" lineage-ma-id="{DE6607C4-6124-422B-BC18-775506BF5A37}" lineage-time="200X-0X-XX 19:56:03.423">dup dup</value>
        </attr>
        <attr name="displayName" type="string" multivalued="false">
            <value lineage-id="{D4082CF8-3FF4-490B-A547-90BDD627EA7D}" lineage-ma-id="{DE6607C4-6124-422B-BC18-775506BF5A37}" lineage-time="200X-0X-XX 19:56:03.423">dup dup</value>
        </attr>
        <attr name="givenName" type="string" multivalued="false">
            <value lineage-id="{ACA5527D-744F-436F-B7C6-FA22664E9BC0}" lineage-ma-id="{DE6607C4-6124-422B-BC18-775506BF5A37}" lineage-time="200X-0X-XX 19:56:03.423">dup</value>
        </attr>
        <attr name="legacyExchangeDN" type="string" multivalued="true">
            <value lineage-id="{602B64E6-5B60-4040-B89F-AFB6D21E64F9}" lineage-ma-id="{DE6607C4-6124-422B-BC18-775506BF5A37}" lineage-time="200X-0X-XX 19:56:03.483">/o=8First Organization8/ou=8First Administrative Group8/cn=Recipients/cn=dup</value>
        </attr>
        <attr name="mail" type="string" multivalued="false">
```

```xml
<value lineage-id="{1F34769F-6275-4539-A2C4-7C346CA40D23}" lineage-ma-id="{DE6607C4-6124-422B-BC18-775506BF5A37}" lineage-time="200X-0X-XX 19:56:03.423">dup@mms-gal1-dotnet.nttest.microsoft.com</value>

</attr>

<attr name="mailNickname" type="string" multivalued="false">

<value lineage-id="{4E34737E-F811-4D2A-92E1-8DA500BB7913}" lineage-ma-id="{DE6607C4-6124-422B-BC18-775506BF5A37}" lineage-time="200X-0X-XX 19:56:03.423">dup</value>

</attr>

<attr name="msExchHomeServerName" type="string" multivalued="false">

<value lineage-id="{901A8A34-9486-4852-B372-203184541A95}" lineage-ma-id="{DE6607C4-6124-422B-BC18-775506BF5A37}" lineage-time="200X-0X-XX 19:56:03.423">/o=8First Organization8/ou=8First Administrative Group8/cn=Configuration/cn=Servers/cn=GAL-SYNC-1</value>

</attr>

<attr name="msExchMailboxSecurityDescriptor" type="binary" multivalued="false">

<value lineage-id="{1832000F-626F-47C8-9692-4D418CAFF0E7}" lineage-ma-id="{DE6607C4-6124-422B-BC18-775506BF5A37}" lineage-time="200X-0X-XX 19:56:03.423"
``` encoding="base64">AQAEgHgAAACUAAAAAAAABQAAAAEAGQAAQA
AAAACFAADAAIAAQEAAAAAAUKAAAAAAAAHMAbwBmAHQALw
BkAGMAPQAAAQAAAAEAAAEAAAgAAAAYwA9AG0AbQBzACOAZwB
hAGwAMQAtAGQAbwB0AG4AZQB0AAAAAQUAAAAAAAUVAAAA2TH4
QvRQunQH5Tsr9AEAAAEFAAAAAAFFQAAANkx+EL0ULp0B+U7K/QBA
AA=</value>

</attr>

<attr name="proxyAddresses" type="string" multivalued="true">

<value lineage-id="{AB71A4F4-37DE-4628-89C3-26430969E751}" lineage-ma-id="{DE6607C4-6124-422B-BC18-775506BF5A37}" lineage-time="200X-0X-XX 19:56:03.423">SMTP:dup@mms-gal1-dotnet.nttest.microsoft.com</value>

<value lineage-id="{AB71A4F4-37DE-4628-89C3-26430969E751}" lineage-ma-id="{DE6607C4-6124-422B-BC18-775506BF5A37}" lineage-time="200X-0X-XX 19:56:03.423">X400:c=US;a= ;p=8First Organizat;o=Exchange;s=dup;g=dup;</value>

</attr>

<attr name="sn" type="string" multivalued="false">

<value lineage-id="{4C03AC8F-27FF-4EE0-9AD3-7A1779E11126}" lineage-ma-id="{DE6607C4-6124-422B-BC18-775506BF5A37}" lineage-time="200X-0X-XX 19:56:03.423">dup</value>

</attr>

```xml
<attr name="targetAddress" type="string" multivalued="false">
    <value lineage-id="{1F763173-399D-4F31-9B1A-C965BE08FD3E}" lineage-ma-id="{DE6607C4-6124-422B-BC18-775506BF5A37}" lineage-time="200X-0X-XX 19:56:03.500">SMTP:dup@mms-gal1-dotnet.nttest.microsoft.com</value>
</attr>
</entry>
</mv-object>
<mv-changes id="{6421DF0B-5DA5-4FB1-842C-AB5482989B1C}">
    <delta operation="none" dn="{6421DF0B-5DA5-4FB1-842C-AB5482989B1C}">
    </delta>
</mv-changes>
</mv>
<mv-type-change>
    <mv-type-change new-object-type="person" has-error="false">
    </mv-type-change>
</mv-type-change>
<mv-operation>flow</mv-operation>
<import-flow-rules>
    <import-attribute-flow type="full" has-error="false">
        <import-flow mv-attribute="legacyExchangeDN" status="applied">
```

```xml
<scripted-mapping>
    <src-attribute>legacyExchangeDN</src-attribute>
    <script-context>LegacyExchangeDNMapping</script-context>
</scripted-mapping>
</import-flow>
<values>
<delta operation="update" dn="{6421DF0B-5DA5-4FB1-842C-AB5482989B1C}">
    <attr name="legacyExchangeDN" operation="update" type="string" multivalued="true">
        <value operation="delete">/o=8First Organization8/ou=8First Administrative Group8/cn=Recipients/cn=dup</value>
        <value operation="add" lineage-id="{8C53C2B7-6E64-4D5E-BA4E-CF1AE1FB5E0D}" lineage-ma-id="{339D5BD0-1E51-44F3-A79E-2793EA7416BC}" lineage-time="200X-0X-XX 20:07:29.303">/o=8First Organization8/ou=8First Administrative Group8/cn=Recipients/cn=dup</value>
        <value operation="add" lineage-id="{8C53C2B7-6E64-4D5E-BA4E-CF1AE1FB5E0D}" lineage-ma-id="{339D5BD0-1E51-44F3-A79E-2793EA7416BC}" lineage-time="200X-0X-XX 20:07:29.303">/o=First Organization/ou=First Administrative Group/cn=Recipients/cn=dupdup</value>
    </attr>
</delta>
```

```xml
</values>
</import-attribute-flow>
</import-flow-rules>
<mv-changes id="{6421DF0B-5DA5-4FB1-842C-AB5482989B1C}">
<delta operation="update" dn="{6421DF0B-5DA5-4FB1-842C-AB5482989B1C}">
<attr name="legacyExchangeDN" operation="update" type="string" multivalued="true">
<value operation="delete">/o=8First Organization8/ou=8First Administrative Group8/cn=Recipients/cn=dup</value>
<value operation="add" lineage-id="{8C53C2B7-6E64-4D5E-BA4E-CF1AE1FB5E0D}" lineage-time="200X-0X-XX 20:07:29.303">/o=8First Organization8/ou=8First Administrative Group8/cn=Recipients/cn=dup</value>
<value operation="add" lineage-id="{8C53C2B7-6E64-4D5E-BA4E-CF1AE1FB5E0D}" lineage-time="200X-0X-XX 20:07:29.303">/o=First Organization/ou=First Administrative Group/cn=Recipients/cn=dupdup</value>
</attr>
</delta>
</mv-changes>
<provisioning-rules>
<provisioning has-error="true">
<disconnect status="success">
```

```xml
<ma-guid>{339D5BD0-1E51-44F3-A79E-2793EA7416BC}</ma-guid>
<ma-name>win2k</ma-name>
<dn>CN=dup dup (1),OU=jen-target,DC=mms-gal1-win2k,DC=nttest,DC=microsoft,DC=com</dn>
<object-id>{5632D262-5807-4F8E-A6B2-7B961C557DD2}</object-id>
<primary-objectclass>contact</primary-objectclass>
</disconnect>
  <error type="extension-dll-exception">
    <extension-error-info>
<extension-name>GALSync.dll</extension-name>
<extension-callsite>provisioning</extension-callsite>
<call-stack>System.InvalidOperationException: collection was modified
   at Microsoft.MetadirectoryServices.Impl.ConnectorCollectionEnumeratorImpl.MoveNext() in f:\nt\ds\mms\src\main\30\scrhost\ObjectModelImpl.cs:line 2072
   at Microsoft.MetadirectoryServices.GALSync.MVSynchronizer.Provision(MVEntry mventry) in F:\nt\ds\mms\src\main\30\Extensions\GALSync\GALMV.vb:line 116
</call-stack>
    </extension-error-info>
  </error>
</provisioning>
```

```
</provisioning-rules>

<error type="extension-dll-exception" code="0x80230703">

<diagnosis>CS to MV to CS synchronization failed 0x80230703:
[CN=dup dup,OU=jen-target,DC=mms-gal1-
win2k,DC=nttest,DC=microsoft,DC=com]</diagnosis>

</error>

</preview>
```

Example E (e.g., connector filter, etc.)

```
<preview>

<cs-object cs-dn="CN=B" id="{CA7FDA3C-3C35-49C8-B5B5-
70BDF7263655}" object-type="Person">

<unapplied-export>

<delta operation="none" dn="CN=B">

<anchor encoding="base64">CAAAADAAMAAwAAAA</anchor>

</delta>

</unapplied-export>

<escrowed-export>

<delta operation="none" dn="CN=B">

<anchor encoding="base64">CAAAADAAMAAwAAAA</anchor>

</delta>

</escrowed-export>
```

```xml
<unconfirmed-export>
  <delta operation="none" dn="CN=B">
   <anchor encoding="base64">CAAAADAAMAAwAAAA</anchor>
  </delta>
</unconfirmed-export>
<pending-import>
  <delta operation="update" dn="CN=B">
   <anchor encoding="base64">CAAAADAAMAAwAAAA</anchor>
   <attr name="Name" operation="delete" type="string" multivalued="false">
   </attr>
  </delta>
</pending-import>
<synchronized-hologram>
  <entry dn="CN=B">
   <anchor encoding="base64">CAAAADAAMAAwAAAA</anchor>
   <primary-objectclass>Person</primary-objectclass>
   <objectclass>
    <oc-value>Person</oc-value>
   </objectclass>
   <dn-attr name="Manager" multivalued="false">
    <dn-value>
```

```xml
<dn>CN=C</dn>
<anchor encoding="base64">CAAAADAAMAAxAAAA</anchor>
</dn-value>
</dn-attr>
<attr name="EmpID" type="string" multivalued="false">
<value>000</value>
</attr>
<attr name="Name" type="string" multivalued="false">
<value>Foo</value>
</attr>
<attr name="singleNumber" type="integer" multivalued="false">
<value>0x3e8</value>
</attr>
</entry>
</synchronized-hologram>
<unapplied-export-hologram>
<entry dn="CN=B">
<anchor encoding="base64">CAAAADAAMAAwAAAA</anchor>
<primary-objectclass>Person</primary-objectclass>
<objectclass>
<oc-value>Person</oc-value>
</objectclass>
```

```xml
<dn-attr name="Manager" multivalued="false">
 <dn-value>
  <dn>CN=C</dn>
  <anchor encoding="base64">CAAAADAAMAAxAAAA</anchor>
 </dn-value>
</dn-attr>
<attr name="EmpID" type="string" multivalued="false">
 <value>000</value>
</attr>
<attr name="singleNumber" type="integer" multivalued="false">
 <value>0x3e8</value>
</attr>
</entry>
</unapplied-export-hologram>
<escrowed-export-hologram>
<entry dn="CN=B">
 <anchor encoding="base64">CAAAADAAMAAwAAAA</anchor>
 <primary-objectclass>Person</primary-objectclass>
 <objectclass>
  <oc-value>Person</oc-value>
 </objectclass>
 <dn-attr name="Manager" multivalued="false">
```

```
<dn-value>
 <dn>CN=C</dn>
 <anchor encoding="base64">CAAAADAAMAAxAAAA</anchor>
</dn-value>
</dn-attr>
<attr name="EmpID" type="string" multivalued="false">
 <value>000</value>
</attr>
<attr name="singleNumber" type="integer" multivalued="false">
 <value>0x3e8</value>
</attr>
</entry>
</escrowed-export-hologram>
<unconfirmed-export-hologram>
<entry dn="CN=B">
 <anchor encoding="base64">CAAAADAAMAAwAAAA</anchor>
 <primary-objectclass>Person</primary-objectclass>
 <objectclass>
  <oc-value>Person</oc-value>
 </objectclass>
 <dn-attr name="Manager" multivalued="false">
  <dn-value>
```

```xml
<dn>CN=C</dn>
<anchor encoding="base64">CAAAADAAMAAxAAAA</anchor>
</dn-value>
</dn-attr>
<attr name="EmpID" type="string" multivalued="false">
<value>000</value>
</attr>
<attr name="singleNumber" type="integer" multivalued="false">
<value>0x3e8</value>
</attr>
</entry>
</unconfirmed-export-hologram>
<pending-import-hologram>
<entry dn="CN=B">
<anchor encoding="base64">CAAAADAAMAAwAAAA</anchor>
<primary-objectclass>Person</primary-objectclass>
<objectclass>
<oc-value>Person</oc-value>
</objectclass>
<dn-attr name="Manager" multivalued="false">
<dn-value>
<dn>CN=C</dn>
```

```xml
<anchor encoding="base64">CAAAADAAMAAxAAAA</anchor>
</dn-value>
</dn-attr>
<attr name="EmpID" type="string" multivalued="false">
<value>000</value>
</attr>
<attr name="singleNumber" type="integer" multivalued="false">
<value>0x3e8</value>
</attr>
</entry>
</pending-import-hologram>
<connector>1</connector>
<connector-state>normal</connector-state>
<seen-by-import>1</seen-by-import>
<need-cd-full-import>0</need-cd-full-import>
<placeholder-parent>0</placeholder-parent>
<placeholder-link>0</placeholder-link>
<placeholder-delete>0</placeholder-delete>
<pending>1</pending>
<ref-retry>0</ref-retry>
<rename-retry>0</rename-retry>
<sequencers>
```

```xml
<current>
  <batch-number>0</batch-number>
  <sequence-number>0</sequence-number>
</current>
<unapplied>
  <batch-number>0</batch-number>
  <sequence-number>0</sequence-number>
</unapplied>
<original>
  <batch-number>0</batch-number>
  <sequence-number>0</sequence-number>
</original>
</sequencers>
<pending-ref-delete>0</pending-ref-delete>
<ma-id>{5E45EB8A-839A-4656-8D3F-9AA28F9773FA}</ma-id>
<ma-name>MA1</ma-name>
<partition-id>{45BC78D6-0E46-4E7D-9602-4E68D4C4C373}</partition-id>
<import-errordetail first-occurred="200X-0X-0X 20:27:04.837" date-occurred="200X-0X-0X 20:27:05.103" retry-count="1" error-type="unexpected-error">
  <import-status>
```

```xml
<algorithm-step ma-id="{89A7FD6C-906A-47A1-895E-BE7D4FD99FBA}" dn="CN=B">export-flow</algorithm-step>
        <extension-error-info>
          <extension-name>MA2Extension093.dll</extension-name>
          <extension-callsite>export-flow</extension-callsite>
        </extension-error-info>
      </import-status>
    </import-errordetail>
    <mv-link lineage-id="{A86C8EB0-75E3-4457-A4AD-72AC1D06606D}" lineage-type="projection-rules" lineage-time="200X-0X-0X 20:10:12.387">{8C8EA71C-E144-4831-856B-D35FFF17D027}</mv-link>
       <last-import-delta-time>200X-0X-0X 20:27:04.837</last-import-delta-time>
  </cs-object>
  <stay-disconnector-rules>
    <stay-disconnector type="import" has-error="false">
      <filter-set type="declared" status="not-satisfied">
        <filter-alternative status="not-satisfied">
          <condition cd-attribute="singleNumber" intrinsic-attribute="false" operator="less-than-or-equal" status="false">
            <value ui-radix="10">0x3e7</value>
          </condition>
```

```xml
        </filter-alternative>
      </filter-set>
     </stay-disconnector>
   </stay-disconnector-rules>
   <cs-operation>flow</cs-operation>
   <mv-operation>flow</mv-operation>
   <mv>
     <mv-object id="{8C8EA71C-E144-4831-856B-D35FFF17D027}">
       <cs-mv-links>
         <cs-mv-value lineage-id="{F434C74C-B9B8-4BCD-858B-B221447E1FC7}" lineage-type="provisioning-rules" lineage-time="200X-0X-0X 20:23:01.540">
           <cs-dn>CN=B</cs-dn>
           <cs-guid>{E0E7DC1C-D0D5-4A12-A0B0-D90437B713F9}</cs-guid>
           <ma-name>MA2</ma-name>
           <ma-guid>{89A7FD6C-906A-47A1-895E-BE7D4FD99FBA}</ma-guid>
         </cs-mv-value>
         <cs-mv-value lineage-id="{A86C8EB0-75E3-4457-A4AD-72AC1D06606D}" lineage-type="projection-rules" lineage-time="200X-0X-0X 20:10:12.387">
           <cs-dn>CN=B</cs-dn>
```

```xml
<cs-guid>{CA7FDA3C-3C35-49C8-B5B5-70BDF7263655}</cs-guid>

<ma-name>MA1</ma-name>

<ma-guid>{5E45EB8A-839A-4656-8D3F-9AA28F9773FA}</ma-guid>

</cs-mv-value>

</cs-mv-links>

<entry dn="{8C8EA71C-E144-4831-856B-D35FFF17D027}">

<primary-objectclass lineage-id="{A86C8EB0-75E3-4457-A4AD-72AC1D06606D}" lineage-ma-id="{5E45EB8A-839A-4656-8D3F-9AA28F9773FA}" lineage-time="200X-0X-0X 20:10:12.387">person</primary-objectclass>

<objectclass>
 <oc-value>person</oc-value>
</objectclass>

<dn-attr name="manager" multivalued="false">

<dn-value lineage-id="{36DAC5EF-9E95-43E6-8F54-0DCD6A6458E0}" lineage-ma-id="{5E45EB8A-839A-4656-8D3F-9AA28F9773FA}" lineage-time="200X-0X-0X 20:10:12.950">

<dn>{36AD94F9-C197-4845-8E02-8308CDD2CCC6}</dn>
</dn-value>

</dn-attr>

<attr name="cn" type="string" multivalued="false">
```

```xml
<value lineage-id="{5F785B7D-FC93-453D-99C4-7A6D7B38EFAC}"
lineage-ma-id="{5E45EB8A-839A-4656-8D3F-9AA28F9773FA}" lineage-
time="200X-0X-0X 20:10:12.450">CN=B</value>

</attr>

<attr name="displayName" type="string" multivalued="false">

<value lineage-id="{EA454E6B-BB97-478F-92CC-15AE52ACDB65}"
lineage-ma-id="{5E45EB8A-839A-4656-8D3F-9AA28F9773FA}" lineage-
time="200X-0X-0X 20:23:01.193">Foo</value>

</attr>

<attr name="employeeID" type="string" multivalued="false">

<value lineage-id="{1260F054-3EBF-4C83-8C1A-627051BF3C9A}"
lineage-ma-id="{5E45EB8A-839A-4656-8D3F-9AA28F9773FA}" lineage-
time="200X-0X-0X 20:10:12.450">000</value>

</attr>

<attr name="singleNumber" type="integer" multivalued="false">

<value lineage-id="{18DDFF2C-FE3A-4C1C-B9D5-09E233A421E0}"
lineage-ma-id="{5E45EB8A-839A-4656-8D3F-9AA28F9773FA}" lineage-
time="200X-0X-0X 20:10:12.450">0x3e8</value>

</attr>
</entry>
</mv-object>

<mv-changes id="{8C8EA71C-E144-4831-856B-D35FFF17D027}">
```

```
<delta operation="none" dn="{8C8EA71C-E144-4831-856B-D35FFF17D027}">

</delta>

</mv-changes>

</mv>

<import-flow-rules>

<import-attribute-flow type="full" has-error="false">

<import-flow mv-attribute="cn" status="applied">

<direct-mapping>

<src-attribute intrinsic="true">dn</src-attribute>

</direct-mapping>

</import-flow>

<import-flow mv-attribute="displayName" status="applied-empty-dest">

<direct-mapping>

<src-attribute>Name</src-attribute>

</direct-mapping>

</import-flow>

<import-flow mv-attribute="employeeID" status="applied">

<direct-mapping>

<src-attribute>EmpID</src-attribute>

</direct-mapping>

</import-flow>
```

```xml
<import-flow mv-attribute="manager" status="applied">
  <direct-mapping>
   <src-attribute>Manager</src-attribute>
  </direct-mapping>
</import-flow>
<import-flow mv-attribute="singleNumber" status="applied">
  <direct-mapping>
   <src-attribute>singleNumber</src-attribute>
  </direct-mapping>
</import-flow>
<repopulation-operation mv-attribute="displayName">
<import-flow mv-attribute="displayName" src-ma-id="{5E45EB8A-839A-4656-8D3F-9AA28F9773FA}" status="skipped-former-populator">
   <direct-mapping>
    <src-attribute>Name</src-attribute>
   </direct-mapping>
</import-flow>
<import-flow mv-attribute="displayName" src-ma-id="{89A7FD6C-906A-47A1-895E-BE7D4FD99FBA}" status="skipped-no-suitable-connector">
   <direct-mapping>
    <src-attribute>Name</src-attribute>
   </direct-mapping>
```

```xml
</import-flow>

</repopulation-operation>

<values>

<delta operation="update" dn="{8C8EA71C-E144-4831-856B-D35FFF17D027}">

<attr name="displayName" operation="delete" type="string" multivalued="false">

</attr>

</delta>

</values>

</import-attribute-flow>

</import-flow-rules>

<mv-changes id="{8C8EA71C-E144-4831-856B-D35FFF17D027}">

<delta operation="update" dn="{8C8EA71C-E144-4831-856B-D35FFF17D027}">

<attr name="displayName" operation="delete" type="string" multivalued="false">

</attr>

</delta>

</mv-changes>

<provisioning-rules>

<provisioning has-error="false">
```

```xml
</provisioning>
</provisioning-rules>
<cs-export>
<export-before-change id="{E0E7DC1C-D0D5-4A12-A0B0-D90437B713F9}" ma-name="MA2" ma-id="{89A7FD6C-906A-47A1-895E-BE7D4FD99FBA}">
  <cs-operation>flow</cs-operation>
  <entry dn="CN=B">
   <anchor encoding="base64">CAAAADAAMAAwAAAA</anchor>
   <primary-objectclass>Person</primary-objectclass>
   <objectclass>
    <oc-value>Person</oc-value>
   </objectclass>
   <dn-attr name="Manager" multivalued="false">
    <dn-value>
     <dn>CN=C</dn>
     <anchor encoding="base64">CAAAADAAMAAxAAAA</anchor>
    </dn-value>
   </dn-attr>
   <dn-attr name="seeAlso" multivalued="true">
    <dn-value>
     <dn>CN=MyLinkPhantom</dn>
```

```xml
</dn-value>
</dn-attr>
<attr name="EmpID" type="string" multivalued="false">
<value>000</value>
</attr>
<attr name="Name" type="string" multivalued="false">
<value>Foo</value>
</attr>
<attr name="singleNumber" type="integer" multivalued="false">
<value>0x3e8</value>
</attr>
</entry>
</export-before-change>
<export-flow-rules>
<export-attribute-flow type="full" has-error="true">
<export-flow cd-attribute="Name" status="applied">
<direct-mapping>
<src-attribute>displayName</src-attribute>
</direct-mapping>
</export-flow>
<export-flow cd-attribute="singleNumber" status="applied">
<direct-mapping>
```

```xml
    <src-attribute>singleNumber</src-attribute>
   </direct-mapping>
  </export-flow>
    <values>
     <delta operation="none" dn="CN=B">
     </delta>
    </values>
    <error type="unexpected-error" code="0x80230306">
     <extension-error-info>
<extension-name>MA2Extension093.dll</extension-name>
<extension-callsite>export-flow</extension-callsite>
</extension-error-info>
    </error>
   </export-attribute-flow>
  </export-flow-rules>
  <error type="unexpected-error" code="0x80230306">
  </error>
 </cs-export>
 <error type="unexpected-error" code="0x80230306">
  <diagnosis>CS to MV to CS synchronization failed 0x80230306: [CN=B]</diagnosis>
 </error>
```

</preview>

</preview>

Additional Exemplary Features

Additional exemplary features related to or included in an exemplary preview service include: specifying test attribute values, specifying test object level operations, testing new rules in a preview, synchronizing a previewed entity or entities, viewing from a buffer area perspective, a core area perspective and/or a data source perspective. For example, with respect to specifying test attribute values, such a feature can allow a user will be able to alter any of the values of attributes on an object being previewed within the context of a preview service. In addition, in the user can insert any additional attributes and values that are valid for that object based on the schema discovered from a data source. Such a feature can enhance the testing capabilities of a preview service by allowing a user to simulate different possible attribute values and scenarios without having to create them in the connected system and import them into the metadirectory. With respect to specifying test object level operations, a user can simulate object level operations such as Add, Rename or Delete. With respect to testing new rules, a user can change the rules in the context of a preview service without impacting the rest of the system. After tweaking these rules and achieving the desired results, these rules changes can be committed to the system. With respect to synchronizing only previewed entities or objects, a user can synchronize just one object being previewed. According to this feature, an administrator can experiment with rules until a desired effect is achieved and then push the single object through the system without, for example, having to do a normal run of a management agent. Of course, multiple or grouped entities may be handled in a similar manner. In general, this particular exemplary feature allows an administrator a fine level of control over the troubleshooting process. With respect to previewing a complete run, an administrator can simulate the results of a complete run (e.g., multiple entities from/to one or more data sources) without committing it. With respect to metaverse object details, an exemplary preview service allows a user to select a perspective and then, for example, through use of a preview UI, examine processes and/or sub-processes from the selected perspective. Such a feature can provide a step by step summary of the state of a core object and/or a buffer object at each point in a process. A user may optionally select a data source perspective; however, some aspects of such a perspective (e.g., outside the metadirectory) may require simulation; whereas, core and buffer perspectives generally do not require any simulation—i.e., results are the same in preview or in a non-preview run.

Exemplary services optionally include statistical analysis services. Such services may be implemented in conjunction with aforementioned exemplary preview services. For example, a preview module may call a statistics module and thereby allow a user to view statistics in conjunction with other forms of information. An exemplary statistics module may also execute on an engine operating in a mode that emits semantic information. Thereafter, a preview service may allow a user to view the semantic information emitted during execution of the statistics module. Where such information is in the form of a self-defining language, such as XML, a preview services module may cause an engine to execute at least some portions of the information, for example, to generate and/or display statistics.

Figure 26:
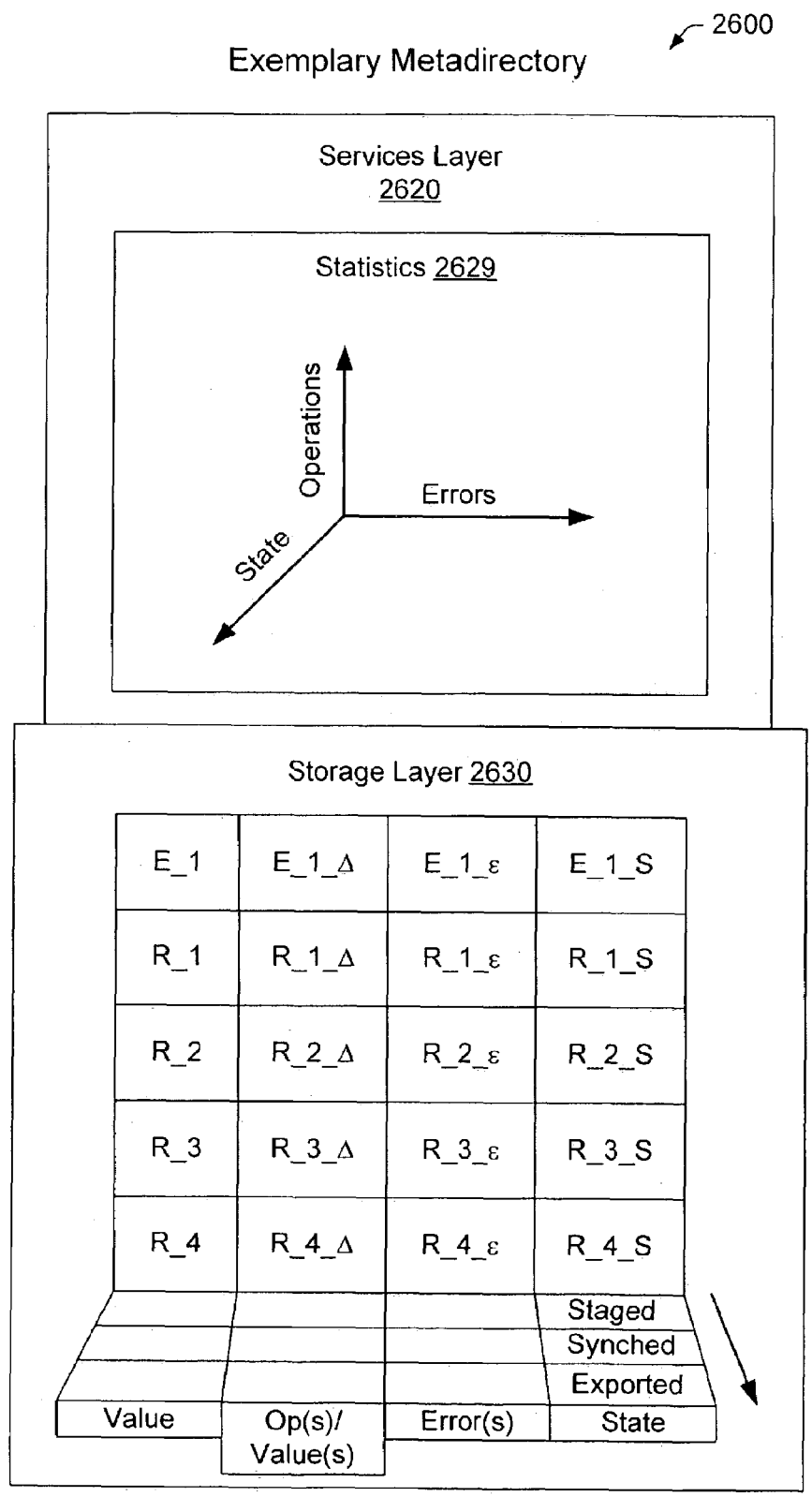
FIG. 26 is a block diagram of an exemplary method of using an analysis module to generate statistics.

FIG. 26 shows an exemplary metadirectory 2600 that includes a services layer 2620 and a storage layer 2630. The storage layer 730 includes an entity and various records associated with additional information. For example, at the entity level, entity $E\_1$ has associated delta or operation information $E\_1\_\Delta$, associated error information $E\_1\_\epsilon$ and/or associated state information $E\_1\_S$; whereas, at the record level, record $R\_1$ has associated delta or operation information $R\_1\_\Delta$, associated error information $R\_1\_\epsilon$ and/or associated state information $R\_1\_S$. Such additional information is optionally associated with appropriate directory information, for example, on an object level, an attribute level, etc. Further, such information may be stored in a metadirectory for one or more states. For example, an object having an attribute represented by record $R\_1$ may have associated error information for staging, synchronizing and/or exporting. Such additional information is optionally stored in a metadirectory in a language such as XML. In the service layer 1020, a service module may execute on a service engine to provide statistics for one or more such objects. An exemplary three-dimensional plot is shown wherein state information, operation information and error information form axes. Of course, any of a variety of analyses or representations may be possible. An administrator or other user of such an exemplary metadirectory may execute such an analysis module to determine what operations may occur or have occurred and/or to determine what errors may occur or have occurred and to determine what operations and/or errors are associated with particular states. Such statistics may allow an administrator or other user to manage the exemplary metadirectory more effectively.

State information can allow for administration of an exemplary metadirectory in a state-based manner. State-based administration can be particularly beneficial when information is received from a plurality of data sources and such information pertains to common entries in directory hierarchies of the plurality of data sources. As described with reference to FIG. 9, an exemplary metadirectory may allow for staging, synchronizing and exporting. Such processes may define states and benefit from state information. For example, staging may compare incoming information with information already staged in a buffer area (e.g., a connector space). With state information, the staging process can ascertain the state of information staged in a buffer area and make appropriate decisions to ensure that appropriate processing proceeds only on information that has not been processed.

With state information, synchronizing may differentiate between information updates and information that has already been processed via a synchronizing process. Such an exemplary metadirectory allows for both processing updates only and reprocessing a complete set of information available for an object, as appropriate, e.g., based on requirements of a synchronizing process. As long as there are no changes applied to synchronization logic it is usually sufficient to process only incoming updates for subsequent process runs. Noting that changes applied to the synchronization logic may require a complete set of information to be reprocessed because the changes may produce different synchronization results.

Exporting may also benefit from state information. In general, exporting pushes out information that may be flagged and/or staged for export to one or more data source. In some instances, such flagged and/or staged information includes information that has not been pushed out as well as information that requires a push out retry. To be efficient exporting should only attempt to apply only the required minimum amount of information to a data source. For example, a minimum amount of information may relate to an update for a single attribute of a directory.

An exemplary metadirectory accomplishes state-based administration by storing a combination of a complete representation of information for an object in a buffer area and associated delta information as required to calculate each state of a metadirectory process (e.g., staging and sub-processes, synchronizing and sub-processes, exporting and sub-processes, etc.).

In an exemplary metadirectory, a complete representation of information for an entity or an object is referred to as a "hologram" while change or delta information for the object is referred to as a "delta". Further, using this terminology, application of a delta to a hologram can result in another hologram, which may be referred to as a post-process hologram. The hologram prior to application of the delta may be referred to as a pre-process hologram. Thus, a "triple" may be formed by a pre-process hologram, a delta and a post-process hologram. An exemplary metadirectory optionally uses one or more deltas and one or more holograms.

An exemplary metadirectory may generate output information (e.g., the output information 780 of FIGS. 7 and 8) and emit semantic information (e.g., the emitted semantic information 770 of FIGS. 7 and 8) germane to at least some of the output information. For example, during execution, a process or processes may generate output that includes delta information (e.g., for a pending import delta, an unconfirmed export delta, an escrowed export delta, an unapplied export delta, etc.). Such delta information may relate to one or more holograms (e.g., pending import hologram, unconfirmed export hologram, escrowed export hologram, unapplied export hologram, etc.). During the process or processes, emission of semantic information may occur wherein the semantic information is related to the delta information and/or to the holograms. An exemplary preview services module may use such semantic information to allow a user to understand better various aspects of the delta information and/or the holograms. For example, in the examples of semantic information presented above, various examples include various delta operations (e.g., with operation commands such as "none", "update", etc.) that may be associated with various deltas (e.g., "pending-import", "unconfirmed-export", "escrowed-export", "unapplied-export", etc.), which typically relate at an entity or object level. The example semantic information also includes various value operations (e.g., with operation commands such as "add", "delete", etc.), which typically relate at a record or attribute level. Various examples of semantic information also include various holograms (e.g., "pending-import-hologram", "unconfirmed-export-hologram", "escrowed-export-hologram", "unapplied-export-hologram", etc.), which typically relate at an entity or object level. Use of such exemplary definitions (e.g., hologram and delta definitions, etc.), for example, together with an exemplary preview service (e.g., one that relies at least partially on emitted semantic information, etc.), can beneficially impact administration and/or information integrity in information environments that may include directories and/or metadirectories. Again, according to various examples, an exemplary preview service may allow a user to understand better results, processes and/or other information related thereto wherein the exemplary preview service relies at least in part on semantic information emitted during one or more processes, wherein the one or more processes typically aim to achieve one or more results. Various example, allow for a "preview" of such results, processes and/or other information related thereto prior to committing one or more of the results. In some instances, an exemplary preview service allows for user interaction (e.g., changing information, rules, scenarios, etc.), which may occur during execution of one or more processes. Various exemplary preview services allow for roll-forward and/or rollback of one or more processes.

Figure 27:
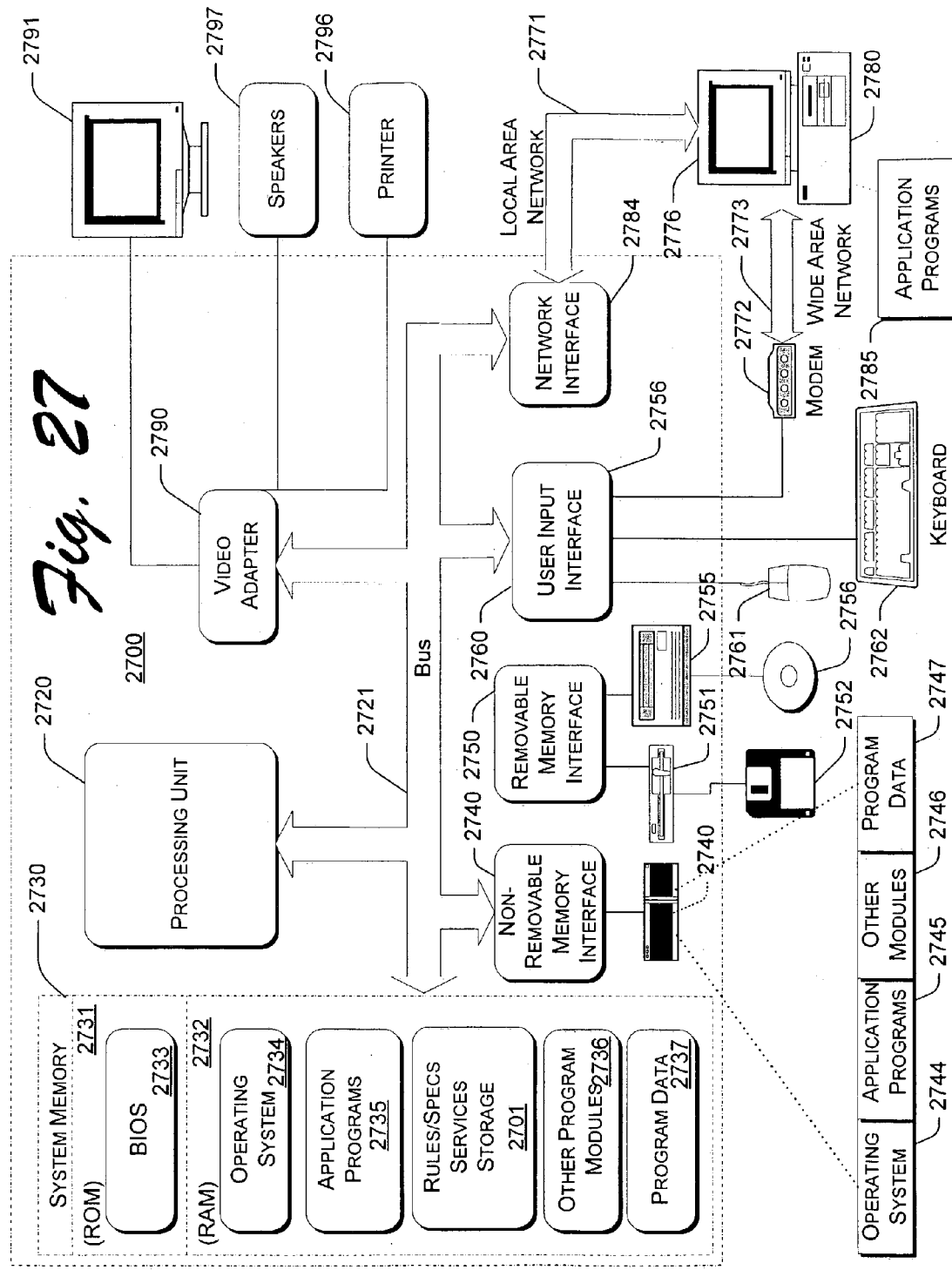
FIG. 27 is a block diagram of an exemplary computing device suitable for use with various subject matter disclosed herein.

FIG. 27 shows an exemplary computer 2700 suitable as an environment for practicing various aspects of subject matter disclosed herein. Components of computer 2700 may include, but are not limited to, a processing unit 2720, a system memory 2730, and a system bus 2721 that couples various system components including the system memory 2730 to the processing unit 2720. The system bus 2721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computer 2700 typically includes a variety of computer-readable media. Computer-readable media can be any available media that can be accessed by computer 2700 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 2700. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computer readable media.

The system memory 2730 includes computer storage media in the form of volatile and/or nonvolatile memory such as read only memory (ROM) 2731 and random access memory (RAM) 2732. A basic input/output system 2733 (BIOS), containing the basic routines that help to transfer information between elements within computer 2700, such as during start-up, is typically stored in ROM 2731. RAM 2732 typically contains data and/or program modules that are immediately accessible to and/or presently being operated on by processing unit 2720. By way of example, and not limitation, FIG. 27 illustrates operating system 2734, the exemplary rules/specifications, services, storage 2701 (e.g., storage may occur in RAM or other memory), application programs 2735, other program modules 2736, and program data 2737. Although the exemplary rules/specifications, services and/or storage 2701 are depicted as software in random access memory 2732, other implementations may include hardware or combinations of software and hardware.

The exemplary computer 2700 may also include other removable/non-removable, volatile/nonvolatile computer storage media. By way of example only, FIG. 27 illustrates a hard disk drive 2741 that reads from or writes to non-removable, nonvolatile magnetic media, a magnetic disk drive 2751 that reads from or writes to a removable, nonvolatile magnetic disk 2752, and an optical disk drive 2755 that reads from or writes to a removable, nonvolatile optical disk 2756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2741 is typically connected to the system bus 2721 through a non-removable memory interface such as interface 2740, and magnetic disk drive 2751 and optical disk drive 2755 are typically connected to the system bus 2721 by a removable memory interface such as interface 2750.

The drives and their associated computer storage media discussed above and illustrated in FIG. 27 provide storage of computer-readable instructions, data structures, program modules, and other data for computer 2700. In FIG. 27, for example, hard disk drive 2741 is illustrated as storing operating system 2744, application programs 2745, other program modules 2746, and program data 2747. Note that these components can either be the same as or different from operating system 2734, application programs 2735, other program modules 2736, and program data 2737. Operating system 2744, application programs 2745, other program modules 2746, and program data 2747 are given different numbers here to illustrate that, at a minimum, they are different copies. A user may enter commands and information into the exemplary computer 2700 through input devices such as a keyboard 2762 and pointing device 2761, commonly referred to as a mouse, trackball, or touch pad. Other input devices (not shown) may include a microphone, joystick, game pad, satellite dish, scanner, or the like. These and other input devices are often connected to the processing unit 2720 through a user input interface 2760 that is coupled to the system bus, but may be connected by other interface and bus structures, such as a parallel port, game port, or a universal serial bus (USB). A monitor 2791 or other type of display device is also connected to the system bus 2721 via an interface, such as a video interface 2790. In addition to the monitor 2791, computers may also include other peripheral output devices such as speakers 2797 and printer 2796, which may be connected through an output peripheral interface 2795.

The exemplary computer 2700 may operate in a networked environment using logical connections to one or more remote computers, such as a remote computer 2780. The remote computer 2780 may be a personal computer, a server, a router, a network PC, a peer device or other common network node, and typically includes many or all of the elements described above relative to computer 2700, although only a memory storage device 2781 has been illustrated in FIG. 27. The logical connections depicted in FIG. 27 include a local area network (LAN) 2771 and a wide area network (WAN) 2773, but may also include other networks. Such networking environments are commonplace in offices, enterprise-wide computer networks, intranets, and the Internet.

When used in a LAN networking environment, the exemplary computer 2700 is connected to the LAN 2771 through a network interface or adapter 2770. When used in a WAN networking environment, the exemplary computer 2700 typically includes a modem 2772 or other means for establishing communications over the WAN 2773, such as the Internet. The modem 2772, which may be internal or external, may be connected to the system bus 2721 via the user input interface 2760, or other appropriate mechanism. In a networked environment, program modules depicted relative to the exemplary computer 2700, or portions thereof, may be stored in the remote memory storage device. By way of example, and not limitation, FIG. 27 illustrates remote application programs 2785 as residing on memory device 2781. It will be appreciated that the network connections shown are exemplary and other means of establishing a communications link between the computers may be used.

The subject matter described above can be implemented in hardware, in software, or in both hardware and software. In certain implementations, the exemplary flexible rules, identity information management processes, engines, and related methods may be described in the general context of computer-executable instructions, such as program modules, being executed by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The invention claimed is:

1. A method for noncommittal analysis of a metadirectory service by graphically previewing to a display information, implemented at least in part by a machine, the method comprising:
   executing a metadirectory services software module on an execution engine, wherein the software module comprises a service module whose execution by the execution engine implements a metadirectory;
   operating the execution engine in an emit mode and in a non-commit mode;
   emitting semantic information that describes metadirectory operations of the executing services software module; and
   receiving the semantic information and analyzing the executing using the emitted semantic information, wherein the analyzing comprises executing a graphical preview module on the execution engine, the graphical preview engine displaying indicia of the metadirectory operations before the metadirectory operations are committed to the metadirectory.

2. The method of claim 1, wherein the software module comprises instructions to synchronize information in a directory with information in a metadirectory.

3. The method of claim 1, wherein the emitting emits the semantic information in a self-defining language.

4. The method of claim 3, wherein the self-defining language comprises a markup language.

5. The method of claim 4, wherein the markup language includes markup tags.

6. The method of claim 3, wherein the language comprises an extensible markup language.

7. The method of claim 3, wherein the language comprises XML.

8. The method of claim 1, wherein the analyzing comprises executing at least some of the semantic information using the execution engine.

9. The method of claim 1, wherein the execution engine comprises an execution engine for metadirectory services.

10. The method of claim 1, wherein the executing generates output information.

11. The method of claim 10, wherein the method does not commit the output information.

12. The method of claim 10, further comprising committing the output information based at least in part on the analyzing.

13. The method of claim 1, wherein the software module comprises at least one metadirectory service module selected from the group consisting of read modules, join modules, project modules, and flow modules.

14. The method of claim 1, wherein the analyzing includes displaying information on a screen.

15. The method of claim 1, wherein the analyzing includes executing semantic information in XML.

16. The method of claim 15, wherein the executing semantic information in XML displays at least some information on a computer screen.

17. The method of claim 1, wherein the semantic information pertains to one or more objects in a directory hierarchy.

18. The method of claim 1, wherein the semantic information pertains to at least one member selected from the group consisting of rules, operations, values and errors.

19. One or more computer readable storage media containing instructions that are executable by a computer to perform actions, comprising:

executing a metadirectory services software module on an execution engine, wherein the software module comprises a service module whose execution by the execution engine implements a metadirectory;

operating the execution engine in an emit mode and in a non-commit mode;

emitting semantic information that describes metadirectory operations of the executing services software module; and receiving the semantic information and analyzing the executing using the emitted semantic information, wherein the analyzing comprises executing a graphical preview module on the execution engine, the graphical preview engine displaying indicia of the metadirectory operations before the metadirectory operations are committed to the metadirectory.

20. An apparatus comprising:

means for graphically previewing to a display information;

means for executing a metadirectory services software module on an execution engine, wherein the software module comprises a service module whose execution by the execution engine implements a metadirectory;

means for operating the execution engine in an emit mode and in a non-commit mode;

means for emitting semantic information that describes metadirectory operations of the executing service software module; and means for receiving the semantic information and analyzing the executing using the emitted semantic information, wherein the analyzing comprises executing a graphical preview module on the execution engine, the graphical preview engine displaying indicia of the metadirectory operations before the metadirectory operations are committed to the metadirectory.

21. The apparatus of claim 20, wherein the means for executing comprises an execution engine associated with a metadirectory.

22. The apparatus of claim 20, wherein the means for emitting semantic information emits semantic information in XML.

23. The apparatus of claim 20, wherein the means for emitting semantic information comprises an execution engine associated with a metadirectory.

24. The apparatus of claim 20, wherein the means for analyzing comprises an execution engine associated with a metadirectory.

* * * * *